(12) United States Patent
Yang et al.

(10) Patent No.: US 11,732,942 B2
(45) Date of Patent: Aug. 22, 2023

(54) BUILDING SYSTEM WITH AUTOMATIC CHILLER ANTI-SURGE CONTROL

(71) Applicant: Johnson Controls Technology Company, Auburn Hills, MI (US)

(72) Inventors: Liming Yang, Mequon, WI (US); Thomas M. Seneczko, Milwaukee, WI (US); Curtis C. Crane, York, PA (US); Justin P. Kauffman, York, PA (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 252 days.

(21) Appl. No.: 16/805,365

(22) Filed: Feb. 28, 2020

(65) Prior Publication Data

US 2021/0270510 A1 Sep. 2, 2021

(51) Int. Cl.
*F25B 49/02* (2006.01)
*F24F 11/64* (2018.01)
*F04D 27/02* (2006.01)

(52) U.S. Cl.
CPC ........ *F25B 49/022* (2013.01); *F04D 27/0246* (2013.01); *F04D 27/0261* (2013.01); *F04D 27/0284* (2013.01); *F24F 11/64* (2018.01); *F05B 2270/404* (2013.01); *F05B 2270/709* (2013.01); *F25B 2500/06* (2013.01); *F25B 2500/12* (2013.01); *F25B 2600/0253* (2013.01)

(58) Field of Classification Search
CPC ............... F25B 49/022; F25B 2500/06; F25B 2500/12; F25B 2600/0253; F25B 25/005; F25B 19/02; F25B 2339/047; F25B 2500/13; F25B 1/053; F05B 2270/404; F05B 2270/709; F04D 27/0246; F04D 27/0261; F04D 27/0284; F24F 11/64; Y02B 30/70
See application file for complete search history.

(56) References Cited

U.S. PATENT DOCUMENTS

| 4,151,725 | A |   | 5/1979 | Kountz et al. |
|---|---|---|---|---|
| 4,608,833 | A | * | 9/1986 | Kountz ................. F25B 49/022 62/201 |
| 8,726,678 | B2 |   | 5/2014 | Turney et al. |
| 2005/0076656 | A1 | * | 4/2005 | Bodell ................ F04D 27/0207 62/206 |
| 2014/0026598 | A1 | * | 1/2014 | Trawicki ................. F04D 27/02 62/126 |

(Continued)

FOREIGN PATENT DOCUMENTS

EP  3 260 703 A  12/2017

OTHER PUBLICATIONS

International Search Report and Written Opinion on PCT/US2021/017327, dated May 25, 2021, 14 pages.

(Continued)

*Primary Examiner* — Larry L Furdge
(74) *Attorney, Agent, or Firm* — Fletcher Yoder, PC

(57) ABSTRACT

A method of operating a chiller includes applying chiller operating data associated with the chiller as an input to one or more machine learning models, generating a boundary for a controllable chiller variable based on an output of the one or more machine learning models, and affecting operation of the chiller based on the boundary.

20 Claims, 21 Drawing Sheets

(56) References Cited

U.S. PATENT DOCUMENTS

| | | |
|---|---|---|
| 2015/0260441 A1* | 9/2015 | Sibik .................. F24F 11/83 |
| | | 62/201 |
| 2018/0306459 A1 | 10/2018 | Turney |
| 2018/0364654 A1 | 12/2018 | Locke et al. |
| 2018/0372363 A1 | 12/2018 | Park et al. |
| 2019/0041811 A1 | 2/2019 | Drees |
| 2019/0123931 A1 | 4/2019 | Schuster et al. |
| 2019/0293494 A1 | 9/2019 | Mao et al. |
| 2019/0338973 A1 | 11/2019 | Turney et al. |
| 2019/0338974 A1 | 11/2019 | Turney et al. |
| 2019/0338977 A1 | 11/2019 | Turney et al. |
| 2019/0353377 A1 | 11/2019 | Mao et al. |
| 2019/0353775 A1 | 11/2019 | Kirsch et al. |
| 2019/0354071 A1 | 11/2019 | Turney et al. |
| 2019/0378020 A1 | 12/2019 | Camilus et al. |
| 2019/0384239 A1 | 12/2019 | Murugesan et al. |
| 2021/0215161 A1* | 7/2021 | Wang .................. F04D 27/02 |

OTHER PUBLICATIONS

U.S. Appl. No. 16/549,656, filed Aug. 23, 2019, Johnson Controls Technology Company.
U.S. Appl. No. 16/549,744, filed Aug. 23, 2019, Johnson Controls Technology Company.
U.S. Appl. No. 16/549,037, filed Aug. 23, 2019, Johnson Controls Technology Company.
U.S. Appl. No. 16/598,635, filed Oct. 10, 2019, Johnson Controls Technology Company.
U.S. Appl. No. 16/795,197, filed Feb. 19, 2020, Johnson Controls Technology Company.

* cited by examiner

BUILDING SYSTEM WITH AUTOMATIC CHILLER ANTI-SURGE CONTROL

BACKGROUND

The present disclosure relates generally to control systems for building heating, ventilation, or air conditioning (HVAC) equipment and more particularly to systems and methods for monitoring and controlling chillers in a building HVAC system. HVAC systems can include a chiller (e.g., a reciprocating chiller, a centrifugal chiller, a screw-driven chiller, an absorption chiller, etc.) that can be used to cool buildings. For a chiller to perform optimally, it may be desirable to operate the chiller at an operation point that is close to a surge state without entering it. A chiller may enter the surge state when a compressor of the chiller is not able to overcome a pressure difference between an inlet and an outlet of the compressor, causing the chiller to operate in the surge state and for refrigerant to move backwards through the compressor. The backward movement of the refrigerant can cause the chiller to vibrate and emit loud noises. If a chiller enters the surge state too often, the compressor and the bearings of the chiller may be damaged, shortening their life span.

SUMMARY

In one implementation of the present disclosure, a method of operating a chiller to avoid future surge events is described. The method may include applying chiller operating data associated with a chiller as an input to one or more machine learning models; and generating a threshold for a controllable chiller variable to prevent a future chiller surge event from occurring based on an output of the one or more machine learning models, further including affecting operation of the chiller based on the threshold to prevent the future chiller surge event from occurring.

In some embodiments, the method further includes generating the one or more machine learning models by creating a set of training data by detecting a past surge event in historical chiller operating data, and labeling a portion of the historical chiller operating data as surge chiller operating data associated with the past surge event; and training the one or more machine learning models with the set of training data.

In some embodiments, the surge chiller operating data include a timeseries including values of one or more variables of the historical chiller operating data associated with times before and during the past surge event.

In some embodiments, affecting operation of the chiller includes determining, based on the output of the one or more machine learning models, values of one or more controllable chiller variables that are predicted to prevent the future surge event, the one or more controllable chiller variables including at least one of a variable speed drive frequency; a pre-rotational vane position; or a variable geometry diffuser position.

In some embodiments, the controllable chiller variable is a first controllable chiller variable and affecting operation of the chiller further includes adjusting the first controllable chiller variable to affect a cooling capacity of the chiller until either the cooling capacity of the chiller reaches a desired cooling capacity; or the first controllable chiller variable reaches the threshold; and in response to the first controllable chiller variable reaching the threshold before the cooling capacity of the chiller reaches the desired cooling capacity, adjusting a second controllable chiller variable until the cooling capacity of the chiller reaches the desired cooling capacity.

In some embodiments, the chiller operating data includes at least one of a refrigerant type, a discharge pressure, a suction pressure, a stall voltage, an input current, a bearing position, a current variable speed drive frequency, a current pre-rotational vane position, or a current variable geometry diffuser position.

In some embodiments, the input to the one or more machine learning models includes a value of the controllable chiller variable and the output of the one or more machine learning models includes a probability that the future chiller surge event will occur if the value of the controllable chiller variable is used to operate the chiller, and wherein generating the threshold for the controllable chiller variable includes comparing the probability that the future chiller surge event will occur with a probability threshold; and setting the threshold for the controllable chiller variable to the value of the controllable chiller variable in response to determining that the probability that the future chiller surge event will occur does not violate the probability threshold.

In some embodiments, the input to the one or more machine learning models includes a probability that the future chiller surge event will occur, and wherein the output of the one or more machine learning models includes a value for the threshold for the controllable chiller variable.

In some embodiments, the one or more machine learning models include at least one of a neural network, random forest, or a support vector machine.

In some embodiments, the output of the one or more machine learning models includes probabilities for a plurality of values for the controllable chiller variable, and wherein generating the threshold for the controllable chiller variable includes selecting one of the plurality of values for the controllable chiller variable based on the probabilities for the plurality of values for the controllable chiller variable.

In yet another implementation of the present disclosure, a system is described. The system may include one or more memory devices storing instructions thereon that, when executed by one or more processors, cause the one or more processors to provide chiller operating data associated with a chiller as an input to one or more machine learning models; and provide a threshold for a controllable chiller variable to prevent a future chiller surge event from occurring using the one or more machine learning models.

In some embodiments, the instructions cause the one or more processors to generate the one or more machine learning models by creating a set of training data by detecting a past surge event in historical chiller operating data, and labeling a portion of the historical chiller operating data as surge chiller operating data associated with the past surge event. The instructions may further cause the one or more processors to generate the one or more machine learning models by training the one or more machine learning models with the set of training data.

In some embodiments, the input to the one or more machine learning models includes a value of the controllable chiller variable and the output of the one or more machine learning models includes a probability that the future chiller surge event will occur if the value of the controllable chiller variable is used to operate the chiller, and wherein the instructions cause the one or more processors to generate the threshold for the controllable chiller variable by comparing the probability that the future chiller surge event will occur with a probability threshold; and setting the threshold for the controllable chiller variable to the value of the controllable chiller variable in response to determining that the probability that the future chiller surge event will occur does not violate the probability threshold.

In some embodiments, the instructions cause the one or more processors to affect operation of the chiller to avoid applying a control signal with a value that exceeds the threshold.

In some embodiments, the controllable chiller variable is a first controllable chiller variable and wherein the instructions cause the one or more processors to affect operation of the chiller by adjusting the first controllable chiller variable to affect a cooling capacity of the chiller until either the cooling capacity of the chiller reaches a desired cooling capacity; or the first controllable chiller variable reaches the threshold; and in response to the first controllable chiller variable reaching the threshold before the cooling capacity of the chiller reaches the desired cooling capacity, adjusting a second controllable chiller variable until the cooling capacity of the chiller reaches the desired cooling capacity.

In yet another implementation a method of operating a chiller is described. The method may include generating a first threshold for a first controllable chiller variable corresponding to a probability of a future chiller surge event occurring based on an output of one or more machine learning models; determining whether a chiller can handle a cooling capacity based on the first threshold for the first controllable chiller variable; based on determining that the chiller would not be able to handle the cooling capacity based on the first threshold for the first controllable chiller variable, generating a second threshold for a second controllable chiller variable corresponding to the probability of the future chiller surge event occurring based on a second output of the one or more machine learning models; and affecting operation of the chiller based on the first threshold and the second threshold.

In some embodiments, the first controllable chiller variable is a pre-rotational vane position or a variable geometry diffuser position and the first threshold is a first upper boundary corresponding to the probability of the future chiller surge event occurring, and wherein the second controllable chiller variable is a variable speed drive frequency and the second threshold is a second upper boundary corresponding to the probability of the future chiller surge event occurring.

In some embodiments, the first controllable chiller variable is a variable speed drive frequency and the first threshold is a first lower boundary corresponding to the probability of the future chiller surge event occurring, and wherein the second controllable chiller variable is a pre-rotational vane position or a variable geometry diffuser position and the second threshold is a second lower boundary corresponding to the probability of the future chiller surge event occurring.

In some embodiments, the probability is a first probability, and wherein generating the first threshold for the first controllable chiller variable corresponding to the probability of the future chiller surge event occurring includes obtaining a first output from the one or more machine learning models indicating a second probability that a surge will occur; based on a first difference between the second probability and the first probability exceeding a third threshold, updating a value for the first controllable chiller variable of the chiller operating data to obtain updated chiller operating data; providing the updated chiller operating data to the one or more machine learning models to obtain a third probability; and based on a second difference between the third probability and the first probability being less than the third threshold, generating the first threshold for the first controllable chiller variable based on the updated value.

In some embodiments, the controllable chiller variable is a first controllable chiller variable and affecting operation of the chiller further includes adjusting the first controllable chiller variable to affect a cooling capacity of the chiller until either: the cooling capacity of the chiller reaches a desired cooling capacity; or the first controllable chiller variable reaches the threshold; and in response to the first controllable chiller variable reaching the threshold before the cooling capacity of the chiller reaches the desired cooling capacity, adjusting a second controllable chiller variable until the cooling capacity of the chiller reaches the desired cooling capacity.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
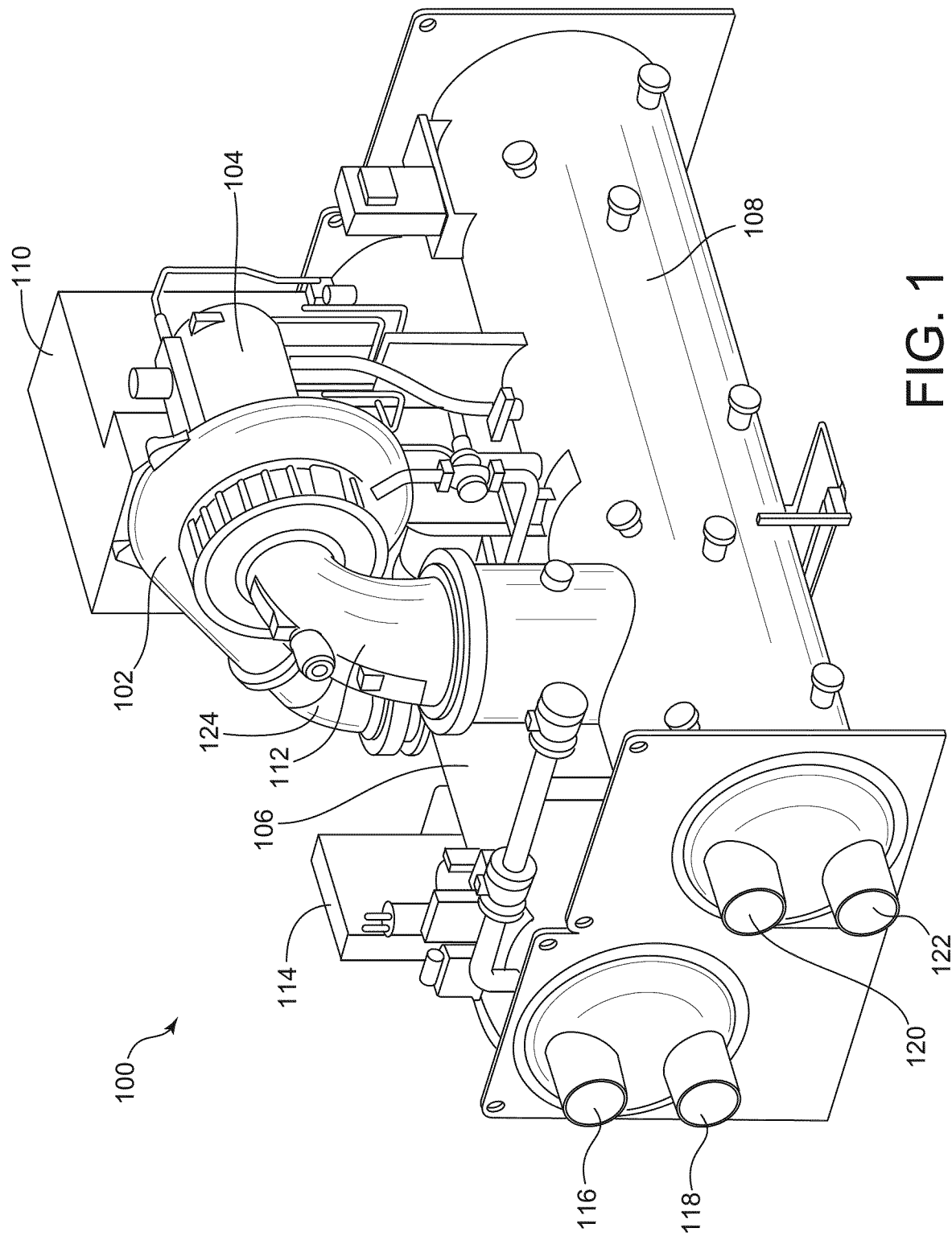
FIG. 1 is a perspective view of an example chiller, according to some embodiments.

Referring generally to the FIGURES, systems and methods for monitoring chiller variables to predict controllable chiller variable boundaries or thresholds and controlling chiller inputs to stay within such boundaries or thresholds is shown, according to various embodiments. A chiller can experience a surge when a compressor of the chiller is not able to overcome a pressure difference between an inlet and an outlet of the compressor. The pressure difference may cause refrigerant to move backwards into a discharge line and back through the compressor and cause the chiller to vibrate and emit loud noises. The amount of current that is necessary to drive the chiller may also swing more while the chiller experiences a surge than during normal operation. If a chiller enters the surge state too often, the compressor and bearings of the chiller may be damaged, shortening their life span and, in some cases, the life span of the chiller itself. By actively monitoring chiller variables and determining boundaries of chiller operation, a controller may apply control signals to avoid such surges, which can increase the life span of the chiller and decrease its energy consumption by avoiding large current swings.

In some embodiments, a machine learning model is generated (e.g., trained) using chiller operating data and used to generate thresholds for various controllable chiller variables to avoid exceeding to avoid potential surge events. The chiller operating data used to train the machine learning model can include a variety of operating parameters, measured variables, or other data that characterize the performance and/or state of the chiller. For example, the chiller operating data can include discharge pressure, suction pressure, stall voltage, bearing position, input current, or any other type of data (e.g., measured variables, calculated variables, control variables, etc.) associated with chiller operation. Such chiller operating data may be associated with times in which the chiller is operating close to (e.g., within a threshold) a surge state. The chiller operating data can include historical data collected from a cloud database and/or a local database and/or live data collected from the chillers in real-time. In some embodiments, the machine learning model is continuously trained via live data collected from sensors that detect various values of variables (e.g., characteristics) of chillers while the chillers operate and, in some cases, responsive to a surge occurring.

Advantageously, the machine learning model can be used to identify controllable chiller variable boundaries that enable the chiller to operate within a surge probability threshold. For example, once the machine learning model has been generated, real-time values of the chiller operating data can be provided as inputs to the machine learning model. Based on the real-time values, the machine learning model can provide outputs indicating a probability that such a surge will occur based on the inputs. The surge probability can be compared to the probability threshold, and, if the probability is close enough to the surge probability threshold (e.g., within a predetermined range), controllable chiller variable boundaries may be generated based on the inputs. A chiller controller can use the boundaries and generate and transmit control signals to control a motor and/or actuators that operate a compressor of the chiller. By operating the compressor, the chiller controller can control the cooling capacity of the chiller and avoid a surge. Furthermore, because implementing the systems and methods described herein may enable the chiller to operate without entering a surge state or otherwise minimize the risk of entering the surge state, the chiller may operate more efficiently and require less repairs.

Further, by using the systems and methods described herein, the chiller controller may cause the chiller to operate close to the surge state without entering it. Such operating points may enable the chiller to operate more efficiently. For example, in some instances, the closer the chiller operates to a surge state, the more efficiently the chiller may run. Because systems not implementing the systems and methods described herein could not accurately predict chiller operating points in which surges would occur, such systems often caused chillers to operate within a safe zone far away from the surge state to ensure the chiller did not enter the surge state. By using the systems and methods described herein, the chiller can operate closer to the surge state without crossing into it and consequently operate more efficiently.

Referring now to FIG. 1, an example embodiment of a chiller 100 is depicted. Chiller 100 is shown to include a compressor 102 driven by a motor 104, a condenser 106, and an evaporator 108. A refrigerant can be circulated through chiller 100 in a vapor compression cycle. Chiller 100 can also include a control panel 114 to control operation of the vapor compression cycle performed by chiller 100.

Motor 104 can be powered by a variable speed drive (VSD) 110. VSD 110 receives alternating current (AC) power having a particular fixed line voltage and fixed line frequency from an AC power source (not shown) and provides power having a variable voltage and frequency to motor 104. Motor 104 can be any type of electric motor that can be powered by a VSD 110. For example, motor 104 can be a high speed induction motor. Compressor 102 is driven by motor 104 to compress a refrigerant vapor received from evaporator 108 through suction line 112 and to deliver refrigerant vapor to condenser 106 through a discharge line 124. Compressor 102 can be a centrifugal compressor, a screw compressor, a scroll compressor, a turbine compressor, or any other type of suitable compressor.

Compressor 102 may operate close to a surge state to operate efficiently. Whether compressor 102 enters a surge state may be a function of a flow of liquid through compressor 102 and a pressure ratio between the inlet and the outlet of compressor 102. In some instances, the higher the flow rate, the higher the pressure ratio can be before the chiller enters the surge state. For example, compressor 102 may experience a surge when a pressure ratio is too high for a corresponding amount of liquid flowing through compressor 102. In general and in some cases, the closer compressor 102 operates to the surge state without entering it, the more efficiently compressor 102 may operate.

Evaporator 108 can include an internal tube bundle, a supply line 120, and a return line 122 for supplying and removing a process fluid to the internal tube bundle. The supply line 120 and the return line 122 can be in fluid communication with a component within a HVAC system (e.g., an air handler) via conduits that circulate the process fluid. The process fluid is a chilled liquid for cooling a building and can be, but is not limited to, water, ethylene glycol, calcium chloride brine, sodium chloride brine, or any other suitable liquid. Evaporator 108 is configured to lower the temperature of the process fluid as the process fluid passes through the tube bundle of evaporator 108 and exchanges heat with the refrigerant. Refrigerant vapor is formed in evaporator 108 by the refrigerant liquid delivered to the evaporator 108 exchanging heat with the process fluid and undergoing a phase change to refrigerant vapor.

Refrigerant vapor delivered by compressor 102 to condenser 106 transfers heat to a fluid. Refrigerant vapor condenses to refrigerant liquid in condenser 106 as a result of heat transfer with the fluid. The refrigerant liquid from condenser 106 flows through an expansion device (not shown) and is returned to evaporator 108 to complete the refrigerant cycle of the chiller 100. Condenser 106 includes a supply line 116 and a return line 118 for circulating fluid between the condenser 106 and an external component of the HVAC system (e.g., a cooling tower). Fluid supplied to the condenser 106 via return line 118 exchanges heat with the refrigerant in the condenser 106 and is removed from the condenser 106 via supply line 116 to complete the cycle. The fluid circulating through the condenser 106 can be water or any other suitable liquid.

The refrigerant can have an operating pressure of less than 400 kPa or approximately 58 psi. For example, the refrigerant can be R1233zd. R1233zd is a non-flammable fluorinated gas with low Global Warming Potential (GWP) relative to other refrigerants utilized in commercial chiller assemblies. GWP is a metric developed to allow comparisons of the global warming impacts of different gases, by quantifying how much energy the emissions of 1 ton of a gas will absorb over a given period of time, relative to the emissions of 1 ton of carbon dioxide.

In some embodiments, sensors (not shown) of chiller 100 generate chiller operating data for chiller 100 based on the operation of chiller 100. Chiller operating data may also include a refrigerant type. This chiller operating data may be useful in predicting whether chiller 100 may enter into a surge state soon or imminently. As described herein, soon or imminently may be any amount of time into the future such as, for example, one second, five seconds, 10 seconds, one minute, five minutes, 10 minutes, 30 minutes, an hour, etc. Examples of types of chiller operating data that the sensors can generate include, but are not limited to, refrigerant type, discharge pressure (Pd), suction pressure (Ps), stall voltage, stall current, input current, and bearing position. Discharge pressure may be pressure that is generated at the output of compressor 102. Refrigerant type may be the type of refrigerant that is currently flowing through compressor 102. Suction pressure may be pressure that is generated at the input of compressor 102. A large difference between the discharge pressure and the suction pressure may cause a surge in the chiller to occur as the difference in pressure can cause coolant to flow backwards into compressor 102. Stall voltage and stall current may be the voltage and current, respectively, across motor 104 when motor 104 is stalling. The stall voltage and stall current may be fixed values that may affect when chiller 100 surges. Input current may be the amount of current that is currently driving motor 104. A sudden rise or decrease in input current may indicate a surge is occurring or will occur soon. Bearing position may be a position of various bearings on a shaft with which motor 104 drives compressor 102. If the position bearings of chiller 100 are out of position by too much, chiller 100 may surge.

In some embodiments, the chiller operating data may be useful in determining that a surge would occur if a VSD frequency is lower or higher than a threshold value, if a VGD position is greater or lower than a threshold value, and/or if a PRV position is greater or lower than a threshold value. Once any of these values are determined, control signals may be implemented to avoid causing the VSD frequency, the VGD position, or the PRV position to exceed or go lower than the associated threshold. In some embodiments, the thresholds are associated with a probability of a surge occurring. For example, an administrator may input a surge probability threshold of 40%. Thresholds may be generated that enable the chiller 100 to operate with a surge probability of 40%.

Figure 2:
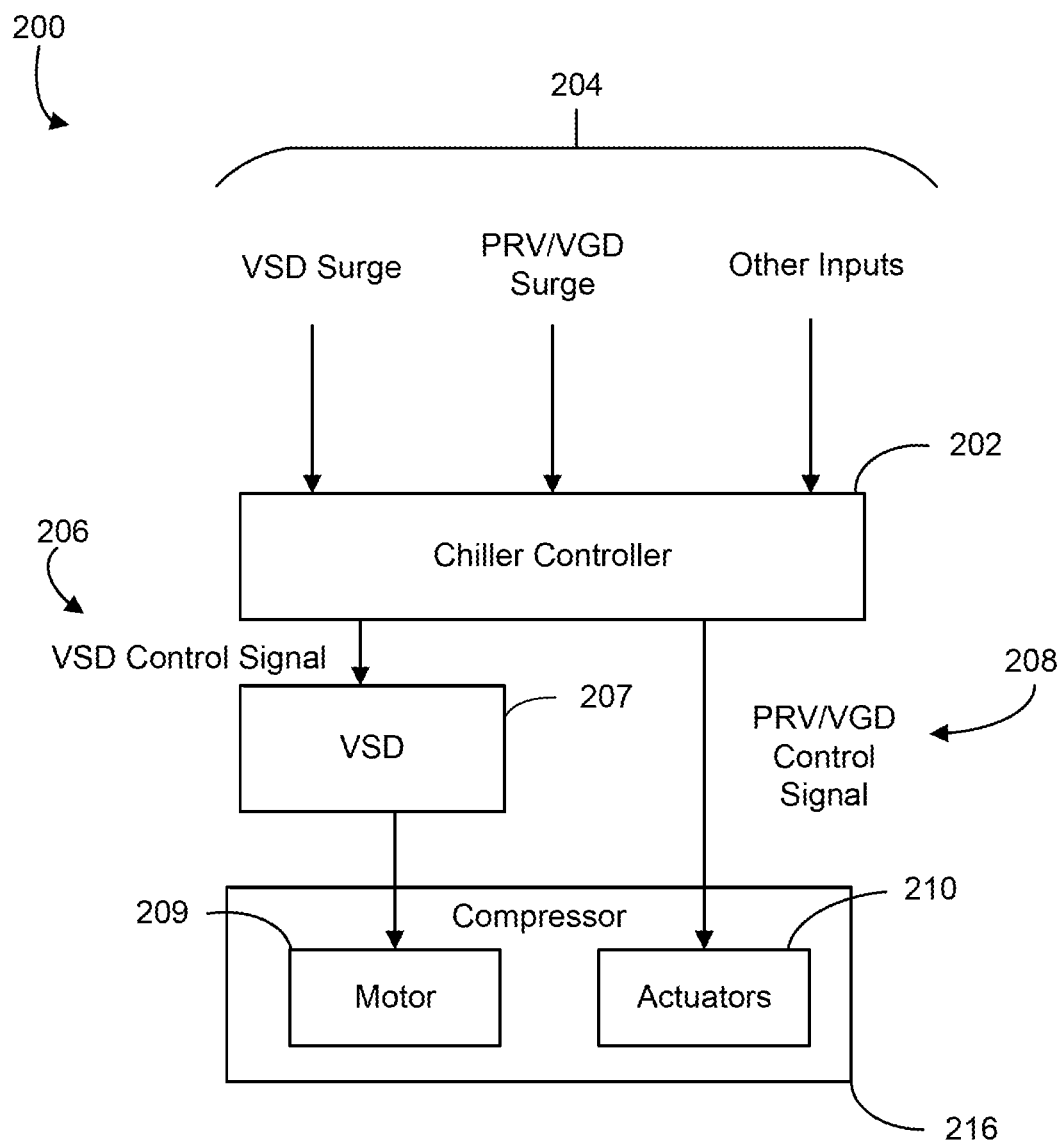
FIG. 2 is a block diagram of a model-based chiller control system, according to some embodiments.

Referring now to FIG. 2, a block diagram of a model-based chiller control system 200 is shown, according to some embodiments. Chiller control system 200 is shown to include a chiller controller 202, a VSD 207, a motor 209, actuators 210, and a compressor 216. Compressor 216 may operate within a chiller such as chiller 100. Chiller controller 202 may receive inputs 204 from various sensors of the chiller that indicate instances when the chiller is operating close to a surge state and/or when the chiller is operating in a surge state. The inputs may include VSD frequency, pre-rotation vane (PRV) position/variable geometry diffuser (VGD) position, and/or values of various other characteristics associated with the operation of the chiller such as a difference pressure between a condenser and an evaporator of the chiller (e.g., a difference in the pressures between an inlet and an outlet of compressor 216). The PRV position may be a valve position at an inlet of compressor 216. The VGD position may be a valve position at an outlet of compressor 216. Chiller controller 202 may receive these inputs and generate a VSD control signal 206 to control motor 209 which drives compressor 216 and/or a PRV/VGD control signal 208 to control actuators 210 to control an outlet and/or an inlet of compressor 216 of the chiller to avoid a surge in the future or a surge that is currently occurring.

To generate control signals 206 and 208 to control actuators 210, chiller controller 202 may use a mapping technique that maps motor speeds, PRV positions and/or VGD positions, and/or the difference pressure between the condenser and the evaporator to predetermined values indicating whether the chiller is in a surge state or if a surge is imminent. For example, chiller controller 202 may maintain a database including a surge map to which chiller controller 202 may compare each of the values described above to determine if the chiller is operating in a surge state or if a surge is imminent. The surge map may include hardcoded values of variables of the chiller that indicate when the chiller is experiencing a surge. The surge map may include control signals that correspond to the values of the variables and that should bring the chiller out of the surge state based on the values. If chiller controller 202 determines that the chiller is operating in a surge state or that a surge is imminent, chiller controller 202 may identify predetermined control signals from the surge map to send to actuators 210 to control compressor 216 to avoid or stop the surge.

Actuators 210 may receive the signals and adjust operation of compressor 216 to avoid or stop any surges. Actuators 210 may include actuators that control the PRV position and/or the VGD position of compressor 216 (e.g., control valves at the inlet and/or the outlet of compressor 216). Actuators 210 may operate based on power and control signals that they receive from chiller controller 202. Motor 209 may receive a voltage from VSD 207. Chiller controller 202 may control the voltage that motor 209 receives from VSD 207 by adjusting a frequency of a VSD control signal 206 that chiller controller 202 sends to VSD 207. Motor 209 may operate compressor 216. Similarly, chiller controller 202 may send PRV/VGD control signals 208 to actuators 210 indicating a PRV position and/or a VGD position to control the valve positions at the inlet and outlet of compressor 216. Actuators 210 may set PRV/VGD positions 214 based on control signals 208.

In some embodiments, the mapping technique that chiller controller 202 uses to generate VSD, PRV, and/or VGD control signals 206 and 208 is a static process and must be manually updated by administrators to adjust for any changes in operation of compressor 216. Chiller controller 202 may not be able to adjust the control signals based on chiller operation conditions that change with time. The mapping technique may be human-implemented based on prior knowledge and/or testing. Chiller controller 202 may not be able to consider various other parameters of the chiller that could be important indicators of whether a surge is imminent or if a surge is occurring. Consequently, chiller controller 202 may rely on limited parameters, require extensive testing, and may not be able to accurately predict surges over time as conditions of the chiller change.

Figure 3:
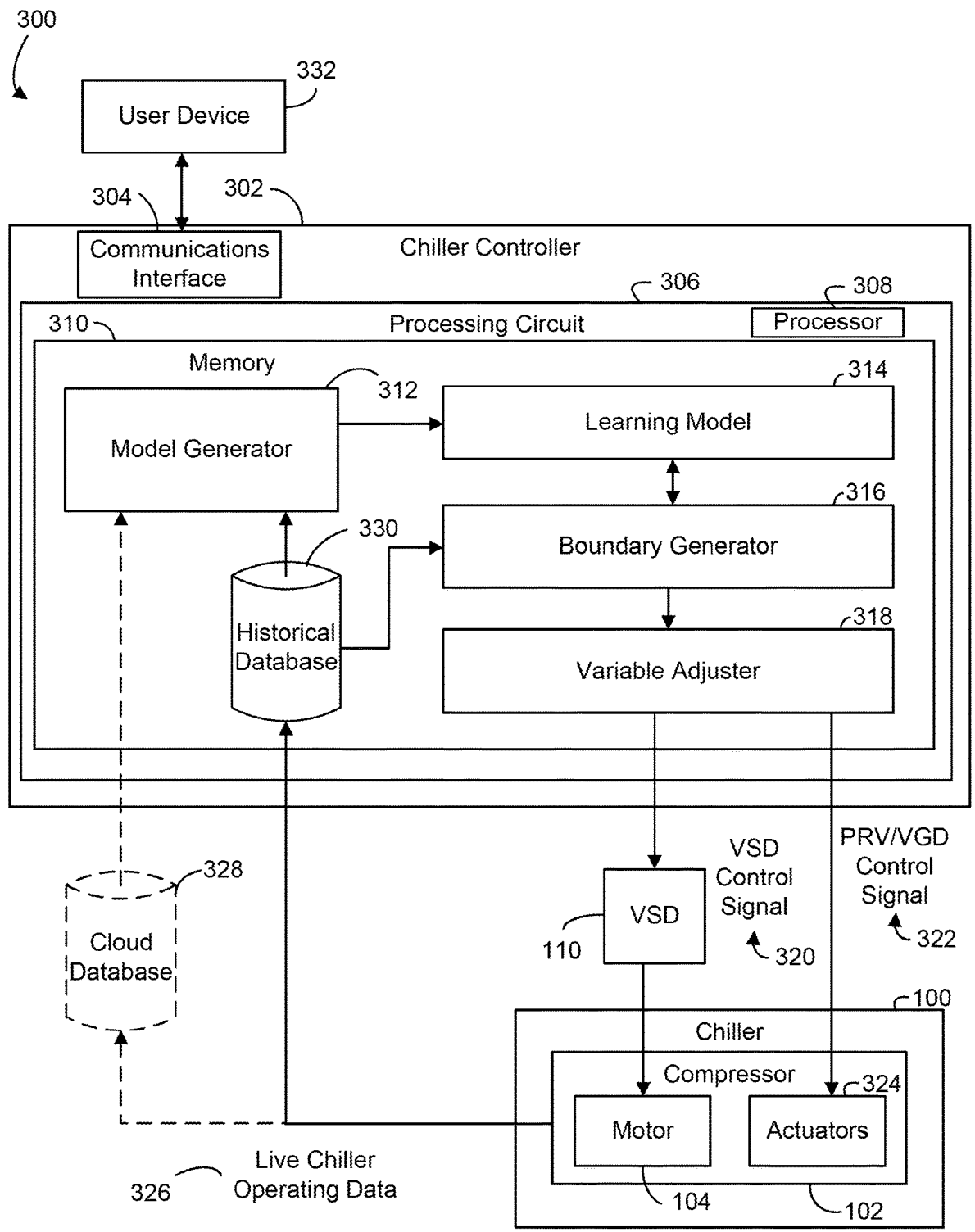
FIG. 3 is a block diagram of an example chiller control system including a chiller controller associated with the chiller of FIG. 1, according to some embodiments.

Referring now to FIG. 3, a block diagram of a system 300 for predicting surges in chiller 100, shown and described with reference to FIG. 1, is shown, according to some embodiments. System 300 is shown to include a chiller controller 302, chiller 100, VSD 110, a cloud database 328, and a user device 332. Chiller controller 302 is shown to include a model generator 312, a machine learning model 314, a cloud database 328, and a historical database 330. Chiller controller 302 may manage chiller operating data associated with chiller 100 and other building equipment of a building management system. In brief overview, model generator 312 may receive or obtain chiller operating data from cloud database 328, historical database 330, and/or from chiller 100 (not shown) to train one or more machine learning models of machine learning model 314 to predict a surge probability of chiller 100 at various operating points. Machine learning model 314 may be implemented as a machine learning model that can dynamically predict surge probabilities for operating points of chiller 100 and send the predictions to boundary generator 316. Boundary generator 316 can use the predicted surge probabilities to determine boundaries of operation for chiller 100. In some cases, boundary generator 316 generates boundaries that are predicted to keep the probability of a surge occurring at or below a surge probability threshold. As described herein, a surge probability threshold may be provided by a user, retrieved from memory, or obtained from any other data source. For example, the surge probability threshold may indicate a surge probability with which an administrator is comfortable. Variable adjuster 318 can use the boundaries to adjust values for controllable chiller variables to ensure that chiller 100 operates within the boundaries.

Chiller controller 302 may generally be implemented using one or more servers associated with a building management system (BMS) (not shown). Chiller controller 302 may include remote servers (cloud), local servers (on-premises), or any combination thereof. Chiller controller 302 may be implemented as a local controller installed on-site with chiller 100 and variable adjuster 318. In some embodiments, Chiller controller 302 is a part of chiller 100 itself. For example, chiller 100 may be a smart chiller that includes its own controller. Chiller controller 302 may be a part of the controller or implemented separately as a part of chiller 100.

Chiller controller 302 is shown to include a communications interface 304 and a processing circuit 306 that includes a processor 308 and a memory 310. Memory 310 can include instructions which, when executed by processor 308, cause processor 308 to perform the one or more functions described herein. Processor 308 as described herein may be implemented using one or more processors or processing devices such as a tensor processing unit (TPU) designed for using machine learning techniques to determine probabilities for whether a surge will occur based on a set operating point of chiller 100, probabilities for boundaries of operation of chiller 100, or the boundaries of operation themselves.

Memory 310 can be configured to store instructions executable by control circuitry and/or other data (e.g., data pertaining to communication, configuration and/or address data of nodes, etc.). Processing circuit 306 can be configured to implement any of the methods described herein and/or to cause such methods to be performed by a processor (e.g., processor 305). Memory 310 is shown to include model generator 312, machine learning model 314, boundary generator 316, and historical database 330. Memory 310 also includes cloud database 328, in some embodiments. Memory 310 can include any number of components and/or modules. Processing circuit 306 can implement any of components 312, 316, 318, and/or 330 to process chiller operating data 326, train machine learning model 314 to generate probabilities that a surge will occur based on set chiller operating points, generate boundaries, and operate chiller 100. It may be considered that processing circuit 306 includes or may be connected or connectable to memory 310, which may be configured to be accessible for reading and/or writing by processing circuit 306.

Communications interface 304 can be configured to facilitate communication with any device. Furthermore, communications interface 304 can be configured to securely communicate with all of the devices and systems of a BMS such as chiller 100 and sensors (not shown) that collect chiller operating data of chiller 100. In various embodiments, communications via communications interface 304 can be direct (e.g., local wired or wireless communications) or via a communications network (e.g., a WAN, the Internet, a cellular network, etc.).

Model generator 312 may receive chiller operating data from cloud database 328 and/or historical database 330. Each of cloud database 328 and/or historical database 330 can be a graph database, MySQL, Oracle, Microsoft SQL, PostgreSql, DB2, document store, search engine, device identifier-value store, etc. Cloud database 328 and/or historical database 330 can be configured to hold chiller operating data including any amount of values. Cloud database 328 may be a cloud database associated with chiller operating data including data associated with instances that surges occurred in chiller 100 and/or chiller operating data from other chillers that provide chiller operating data to cloud database 328 (e.g., from connected chillers of a building and/or from chillers of other buildings). Cloud database 328 may be a part of chiller controller 302 if chiller controller 302 is or includes a cloud server or a separate database from chiller controller 302 if chiller controller 302 does not include a cloud server. If cloud database 328 is separate from chiller controller 302, cloud database 328 may provide chiller operating data inputs to chiller controller 302 from the cloud. Historical database 330 may be a dedicated database for collecting and storing chiller operating data of chiller 100. Historical database 330 may be a cloud database or a database stored locally respective to chiller 100 at chiller controller 302. Examples of chiller operating data that may be stored in cloud database 328 and/or historical database 330 include, but are not limited to, discharge pressure, suction pressure, stall voltage, bearing position, input current, coolant type, etc. Such values may be associated with times with which they were collected or generated and/or identifications identifying devices or timeseries with which the values are associated.

Chiller operating data 326 can be communicated to each of cloud database 328 and historical database 330 from the sensors that generate the data. For example, the sensors may detect information associated with the operation of the chiller and generate chiller operating data 326 to send to a local gateway (not shown) within the same building as chiller 100. The local gateway may collect, aggregate, and format the chiller operating data into a machine-readable format and send the chiller operating data to cloud database 328 or historical database 330 for storage. Multiple building management systems may be in communication with cloud database 328 to similarly send chiller operating data local to the building management system for storage in cloud database 328. Chiller operating data 326 may be manually uploaded to databases 328 and/or 330 by a technician, transmitted to databases 328 and/or 330 by another controller (not shown), sent to databases 328 and/or 330 by sensors with an internet connection, etc.

Model generator 312 may train machine learning model 314 with training datasets including chiller operating data that is associated with a surge boundary. The surge boundary may be a threshold between samples of operating data that indicate the chiller is operating in a surge state and samples of chiller operating data that indicate the chiller is operating in a normal or non-surge state. The training dataset may include chiller operating data values when chiller 100 entered a surge state (e.g., data values when chiller 100 is at the chiller boundary) and chiller operating data that is otherwise associated with the surge boundary. Model generator 312 may generate and apply training datasets that only includes such values to machine learning model 314 until machine learning model 314 can accurately (e.g., accurate to a threshold) predict surge probabilities based on chiller operating data. Advantageously, by only using data that are associated with the surge boundary to train model generator 312, model generator 312 may train machine learning model 314 to predict probabilities for whether chiller 100 will enter a surge state instead of probabilities for whether chiller 100 will be well within the surge state. The training dataset may include any type of training data, however.

In some embodiments, to generate training data, model generator 312 may identify chiller operating data in which chiller 100 started to operate in a surge state. Model generator 312 may identify the chiller operating data that is associated with the time in which chiller 100 started to operate in the surge state as chiller surge data. Model generator 312 may use the chiller surge data to train machine learning model 314 to predict surge probabilities.

Model generator 312 may also use chiller operating data that is associated with the surge boundary to train machine learning model 314. In some embodiments, model generator 312 may use controllable chiller variable ranges to identify such chiller operating data. Each or a portion of the controllable chiller variables may be associated with a specific range. The specific ranges may be set by an administrator. The ranges may include any number of values or be within any percentage. When model generator 312 detects values of chiller operating data that are at the surge boundary, model generator 312 may identify other values of the chiller controllable chiller variables that are within the specific ranges for each controllable chiller variable as being associated with the surge boundary. Model generator 312 may use the surge boundary data and chiller operating data that is associated with the surge boundary to train machine learning model 314.

For example, model generator 312 may detect that chiller 100 entered a surge state with an operating point of a VSD frequency of 49 Hz, a PRV position of 25% of open, and a VGD position of 25% of open. The VSD frequency may be associated with a range of 2 HZ; the PRV position may be associated with a range of 5%; and the VGD position may be associated with a range of 5%. Model generator 312 may identify the values and generate a training dataset including values for VSD frequency ranging between 47 Hz and 51 Hz, values for PRV position ranging from 20% to 30%, and values for VGD position ranging from 20% to 30%. The ranges for each chiller variable may be for any value or percentage. Values of other chiller operating data may remain constant for each values. Model generator 312 may use these values and the other chiller operating data to generate a training dataset to train machine learning model 314.

In some embodiments, model generator 312 may detect a time in which chiller 100 entered a surge state and use chiller operating data that is associated with times up to, during, and/or after the surge occurred to train chiller 100. Model generator 312 may use ranges of times to determine which chiller operating data to include in the training dataset. For example, model generator 312 may obtain an indication that chiller 100 experienced a surge for five seconds at 1:00 PM on October 2. Model generator 312 may obtain a timeseries including values associated with times at one second increments between 12:59 PM and 1:01 PM. Model generator 312 may be configured to train machine learning model 314 with training data including chiller operating data associated with five seconds before chiller 100 entered the surge state until chiller 100 left the surge state. Accordingly, model generator 312 may generate a training dataset with data associated with values five seconds before 1:00 PM until five seconds after 1:00 PM (five seconds before the chiller entered the surge state and the time in which the chiller was in the surge state). Model generator 312 may input the training dataset into machine learning model 314 for training. Model generator may use chiller operating data in any time ranges including, in some embodiments, time ranges for data that is associated with times after chiller 100 left the surge state.

In some embodiments, model generator 312 may generate the training dataset by formatting the chiller surge data into a feature vector including input-output pairs. The input may be the chiller operating data and the output may be whether the chiller operating data is associated with a surge. The training data may include chiller operating data that is labeled with an output indicating that the input is associated with a surge and chiller operating data that is labeled with an output indicating that the input is not associated with a surge. The training data may be input into machine learning model 314. Machine learning model 314 may output a predicted surge probability based on the input. The output may be compared with the output of the input-pairs of the training data. Machine learning model 314 may adjust its internal weights based on the difference between the labeled output and the output that machine learning model 314 predicted. Model generator 312 may perform similar processes using historical data stored in cloud database 328 and/or historical database 330. Consequently, model generator 312 may train machine learning model 314 to generate surge probabilities.

In some instances, model generator 312 may receive chiller operating data 326 in real-time from chiller 100 and train machine learning model 314 using the real-time chiller operating data. For example, model generator 312 may receive sensor-generated chiller operating data from a local gateway. Model generator 312 may generate a training dataset using the generated chiller operating data. In some cases, model generator 312 may do so responsive to detecting that a surge occurred in chiller 100. In some instances, to generate the training dataset, model generator 312 may determine whether the received chiller operating data is at or within a threshold of the surge boundary and label the training dataset according to the determination. Model generator 312 may input the labeled training dataset into machine learning model 314 for training. Consequently, model generator 312 may train machine learning model 314 to predict values and/or surge probabilities based on samples of data that are generated when chiller 100 entered the surge state.

Model generator 312 may train machine learning model 314 in real-time and/or prior to implementation of machine learning model 314. For example, model generator 312 may train machine learning model 314 to predict surge probabilities. Administrators may input thousands of real-world training datasets made of data that were generated from chiller 100 or from other chillers of a similar type, in some instances. For example, an administrator may input datasets including, in some cases, timeseries data. Machine learning model 314 may use the data and predict probabilities that surges will occur based on the data. For any predictions that turn out to be correct (e.g., machine learning model 314 predicted a high probability that a surge would occur and a surge occurred), model generator 312 may create a labeled training dataset indicating that the surge prediction was correct and feed the labeled training dataset back into machine learning model 314 so machine learning model 314 may adjust its internal weights/parameters accordingly. This process may be repeated for any number of iterations until model generator 312 determines machine learning model 314 is accurate to a threshold. Once such a determination is made, machine learning model 314 may be implemented to make similar predictions using live data and be continuously trained based on any correct predictions. In some cases, machine learning model 314 may be trained using data from incorrect predictions. Model generator 312 may identify a prediction as incorrect, label data associated with the prediction with the correct prediction, and feed the labeled training data through machine learning model 314 for training. Similar processes may be performed to train machine learning models of machine learning model 314 to predict thresholds for PRV/VGD positions or VSD frequencies to avoid exceeding or going below. Consequently, machine learning model 314 may be generated to predict surge probabilities and/or thresholds for VSD frequencies and/or PRV/VGD positions.

In some embodiments, chiller controller 302 receives chiller operating data from chillers located in different buildings and/or at different building sites. The chiller operating data can be organized based on chiller type (e.g., chiller model, chiller size, etc.). The chiller operating data can be used to train and/or generate machine learning models associated with a specific chiller type. For example, chiller operating data from centrifugal chillers at various building sites may be used to train a machine learning model of machine learning model 314 to generate surge predictions and/or various control signal boundaries for centrifugal chillers. Similarly, in another example, chiller operating data from screw driven chillers at various building sites may be used to train another machine learning model of machine learning model 314 to generate surge predictions and/or various control signal boundaries for screw driven chillers. Any number of machine learning models can be generated (e.g., one for each different chiller type) and stored in chiller controller 302 and used as needed.

Chiller controller 302 can automatically select which machine learning model to use based on the type of chiller that is providing real-time values to chiller controller 302. For example, chiller 100 may send its model number to chiller controller 302. Chiller controller 302 may select the machine learning model associated with the model number and use the selected machine learning model to predict surges in the chiller or generate control signals to avoid a surge.

Machine learning model 314 may include one or more machine learning models such as, but not limited to, a neural network, random forest, a support vector machine, etc., that is configured to automatically determine a probability for whether a surge will occur (e.g., in a binary classification system) and/or VSD frequency and/or PRV/VGD position boundaries that are associated with a surge probability threshold. A surge probability threshold may be determined based on an administrator input from user device 332 or otherwise obtained as described above. For example, one machine learning model of machine learning model 314 may receive chiller operating point inputs and determine a probability for whether a surge will occur based on the chiller operating point. Depending on the embodiment, one or more other machine learning model of machine learning model 314 may receive the same or similar inputs along with a surge probability threshold and determine boundary VSD frequencies and/or PRV/VGD positions for values of controllable chiller variables to avoid exceeding or decreasing below when chiller controller 302 operates chiller 100 (e.g., via variable adjuster 318). Machine learning model 314 may transmit its outputs (e.g., probability of a surge or surge boundaries) to variable adjuster 318.

For example, machine learning model 314 may be trained to predict surge probabilities for chiller 100 based on various operating points. Machine learning model 314 may receive a dataset including a chiller operating point including values for a current refrigerant type, discharge pressure, suction pressure, stall voltage, input current, bearing position, variable speed drive frequency, current pre-rotational vane position, and/or current variable geometry diffuser position. Machine learning model 314 may use internal weights and/or parameters to determine a probability that a surge would occur based on the received dataset and transmit the probability to boundary generator 316. For instance, machine learning model 314 may receive a dataset including a chiller operating point and determine that there is a 75% probability that a surge would occur based on the dataset. Machine learning model 314 may transmit the probability to boundary generator 316 for further processing.

In another example, machine learning model 314 may be trained to automatically predict a boundary for a controllable chiller variable such as VSD frequency and/or VGD or PRV position. Machine learning model 314 may predict boundaries for any controllable chiller variable. Machine learning model 314 may receive a dataset similar to the above and use internal weights and/or parameters to determine the boundary. In some embodiments, machine learning model 314 generates the boundary based further on a surge probability threshold. An administrator may input the surge probability threshold and machine learning model 314 may be trained to use the surge probability as an input to predict the boundary. In some embodiments, machine learning model 314 may be trained to use a dataset that does not include a value for the controllable chiller variable with which it is predicting the boundary. For example, if machine learning model 314 is trained to predict a VSD frequency based on a chiller operating point and an input probability of a surge, machine learning model 314 may be trained to make such a prediction without using a value for VSD frequency as an input. Machine learning model 314 may be trained to predict boundaries for any controllable chiller variable and/or based on any surge probability threshold.

As chiller 100 operates, machine learning model 314 may adapt, via continuous training, to changes in operation of chiller 100 (e.g., based on wear and tear of components of chiller 100). Consequently, machine learning model 314 may provide updated feedback as to probabilities that a surge will occur based on a given chiller operating point or controllable chiller variable boundaries that variable adjuster 318 may implement to operate chiller 100 at an operating point associated with a surge probability threshold.

Boundary generator 316 may be configured to generate boundaries for controllable chiller variables based on a surge probability threshold. Boundary generator 316 may obtain a surge probability threshold. The surge probability threshold may range from 0% to 100%. Boundary generator 316 may identify and use the surge probability to determine boundaries for controllable chiller variables that variable adjuster 318 may use to avoid causing chiller 100 to operate at an operating point with a surge probability that exceeds the surge probability threshold. Boundary generator 316 may do so by obtaining chiller operating data and generating a dataset (e.g., a feature vector) to input into machine learning model 314. Depending on how machine learning model 314 is configured, boundary generator 316 may generate the dataset to include chiller operating data including values for controllable chiller variables and/or the surge probability of the surge probability threshold. Boundary generator 316 may input the dataset into machine learning model 314, receive an output, and determine one or more controllable chiller variable boundaries based on the output.

As will be described in greater detail below, in some cases, boundary generator 316 may generate datasets to input into machine learning model 314 until boundary generator 316 can generate controllable chiller variable boundaries that satisfy the surge probability threshold. For example, boundary generator 316 may receive a surge probability threshold from user device 332 and compare the surge probability threshold with a surge probability that machine learning model 314 output. Boundary generator 316 may determine if the surge probability is the same or is within a threshold of the surge probability threshold and, if it is, transmit control signals that were used as input to machine learning model 314 as the control signal boundaries. However, if boundary generator 316 determines the probability is not within the threshold, boundary generator 316 may adjust one or more control signals that are used as input to machine learning model 314, apply the adjusted control signals to machine learning model 314, and determine if the probability output of machine learning model 314 is within the threshold of the surge probability threshold. Boundary generator 316 may repeat this process until it identifies one or more control signal boundaries that satisfy the surge probability threshold.

Variable adjuster 318 may be configured to operate chiller 100 and/or various other building equipment of a building. Variable adjuster 318 may be configured to receive signals from boundary generator 316 such as VSD frequency and/or PRV/VGD position boundaries. Based on the boundaries, variable adjuster 318 may generate a VSD control signal 320 and/or a PRV/VGD control signal 322 to operate chiller 100. For example, variable adjuster 318 may receive an output from machine learning model 314 indicating that a minimum VSD frequency threshold is 51 Hz. In another example, variable adjuster 318 may receive a control signal threshold indicating that the PRV position should not exceed 80% of fully opening. Variable adjuster 318 may use such predictions to ensure that it does not output a VSD frequency that is below 51 Hz or a PRV position that causes the PRV from opening more than 80% of its maximum. Thus, variable adjuster 318 may control the capacity of compressor 102 to avoid increasing the probability of a surge increasing above a surge probability threshold.

In some embodiments, variable adjuster 318 may control chiller 100 by adjusting a first value of a first controllable chiller variable to affect a cooling capacity of chiller 100 until either a desired cooling capacity is reached or the first value of the first controllable chiller variable reaches a boundary or threshold as determined above. If the first value of the first controllable chiller variable reaches the threshold before the desired cooling capacity is reached, variable adjuster 318 may adjust a second value of a second controllable chiller variable until the desired cooling capacity is reached. For example, an upper boundary for a PRV/VGD position may be determined to be 70% of fully open. To operate chiller 100, variable adjuster 318 may adjust the value for the PRV/VGD position control signal to be 70% of fully open. If the chiller still cannot handle a new cooling load, variable adjuster 318 may increase the VSD frequency until either the desired cooling load is reached or the VSD frequency reaches a boundary determined as described above. If variable adjuster 318 cannot operate chiller 100 to handle a new cooling load, variable adjuster 318 may transmit a message to user device 332 indicating that the desired cooling capacity could not be reached.

Advantageously, by controlling chiller 100 in the manner described above, chiller 100 may operate more efficiently. In some embodiments, for example, increasing the PRV/VGD position may be more efficient than increasing the VSD frequency when attempting to increase the cooling capacity of chiller 100. Accordingly, by determining and using upper PRV/VGD position control boundaries to control chiller 100 before adjusting the VSD frequency, variable adjuster 318 may cause chiller 100 to operate more efficiently. Similarly, when attempting to decrease the cooling capacity of chiller 100, determining and using a lower VSD frequency boundary to operate chiller 100 first may cause chiller 100 to operate more efficiently than lowering the PRV/VGD position first.

Actuators 324 may be actuators that operate compressor 102 of chiller 100. Actuators 324 may be similar to actuators 210, shown and described with reference to FIG. 2. Actuators 324 may operate a PRV position and/or a VGD position of compressor 102 based on control signals they receive from variable adjuster 318. Actuators 324 may control a flow of liquid (e.g., coolant) into and out of compressor 102 by opening or closing valves at each end of compressor 102.

Motor 104 may drive compressor 102 as described above. Motor 104 may receive a voltage from VSD 110 based on a frequency of a VSD control signal 320 that variable adjuster 318 sends to VSD 110. Motor 104 may operate compressor 102 through a shaft (not shown) and based on the voltage that VSD 110 provides.

Advantageously, by controlling the VSD frequency, the PRV position, and/or VGD position based on the boundaries generated by boundary generator 316, variable adjuster 318 may proactively control a capacity of chiller 100 so compressor 102 can operate efficiently (e.g., close to a surge state) within a range of values that is associated with a surge probability threshold. Variable adjuster 318 may receive boundaries of operation from boundary generator 316. Boundary generator 316 may generate such boundaries based on a surge probability threshold. Variable adjuster 318 may generate control signals to control chiller 100 accordingly. Using machine learning model 314 to predict surge probabilities or generate controllable chiller variable boundaries to operate with a predetermined probability of a surge may enable variable adjuster 318 to preemptively avoid surges in chiller 100, improving the efficiency with which chiller 100 operates. Such predictions are advantageous over other systems that do not use the systems and methods described herein (e.g., systems and methods that use a surge map) which often require controllers to react to surges that have already occurred and determine which control signals can stop the surge if they were to be applied. Such predictions or reactions are often made using static values that are not adjusted according to changes in how the chiller operates. Consequently, such systems may become more inaccurate over time. Thus, under previous methods more surges may occur, causing an unpredictable amount of loss of operating time of the surging chiller.

Figure 4:
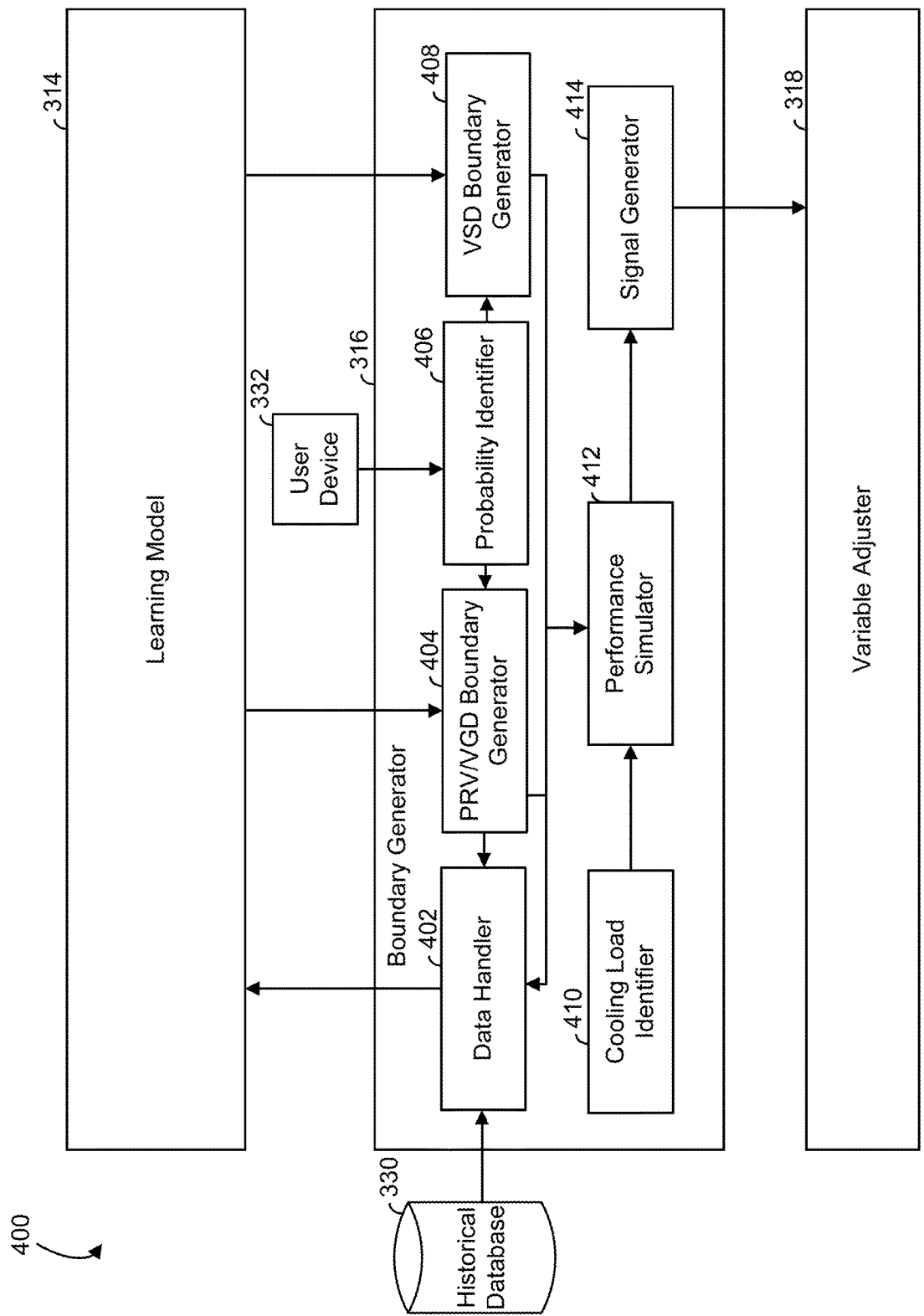
FIG. 4 is a detailed block diagram of a chiller controller environment of FIG. 3, according to some embodiments.

Referring now to FIG. 4, a detailed block diagram of chiller controller environment 400 is shown, according to some embodiments. Chiller controller environment 400 is shown to include historical database 330, machine learning model 314, boundary generator 316, variable adjuster 318, and user device 332. Boundary generator 316 is shown to include a data handler 402, a PRV/VGD boundary generator 404, a probability identifier 406, a VSD boundary generator 408, a cooling load identifier 410, a performance simulator 412 and a signal generator 414. In brief overview, data handler 402 may obtain chiller operating data from historical database 330. Data handler 402 may generate a feature vector using the chiller operating data and input the feature vector into machine learning model 314. Machine learning model 314 may determine a probability that a surge would occur based on the chiller operating data and provide the probability to PRV/VGD boundary generator 404 and/or VSD boundary generator 408. PRV/VGD boundary generator 404 and/or VSD boundary generator 408 may determine if the probability is the same or within a surge probability threshold. The surge probability threshold may be a threshold that an administrator provided to probability identifier 406 through an input to user device 332. If the probability is within the surge probability threshold, performance simulator 412 may determine if chiller 100 may satisfy a desired new cooling load (e.g., an adjusted cooling load) based on the threshold. If one of boundary generators 404 or 408 determines the probability is not within the surge probability threshold or performance simulator 412 determines that the desired cooling load may not be satisfied, data handler 402 may provide an adjusted input to machine learning model 314 to repeat the process until performance simulator 412 identifies boundaries that enable chiller 100 to satisfy a cooling load. Signal generator 414 may transmit determined boundaries to variable adjuster 318 to control chiller 100.

Data handler 402 may be configured to generate feature vectors including chiller operating data and apply the feature vectors to machine learning model 314 to determine probabilities that surges will occur based on various chiller operating data. In some cases, data handler 402 may generate the feature vectors in response to receiving an indication that there will be a new cooling load for chiller 100 to handle. For example, chiller controller 302 may receive an indication to handle a higher cooling load and data handler 402 may generate a feature vector with the current chiller operating data of chiller 100 to determine boundaries for chiller 100 to operate within. The boundary may enable chiller 100 to avoid operating under operating conditions that cause chiller 100 to have a probability of entering a surge state that exceeds a surge probability threshold. The feature vectors may include numerical identifiers for the chiller operating data. The numerical identifiers may be the values of the chiller operating dataset. The chiller operating data may include but are not limited to, a refrigerant type, a discharge pressure value, suction pressure value, stall voltage, bearing position, input current, a VSD frequency, a PRV position, a VGD position, etc., of the chiller. Any non-numerical chiller operating data may be associated with a number in a database of chiller controller 302 (e.g., historical database). The chiller operating data may include present values (e.g., the present values of characteristics of the chiller). The formatted chiller operating data may be applied to the one or more machine learning models for processing. As will be described below, data handler 402 may adjust the values for controllable chiller variables that are used as an input to machine learning model 314 to determine boundaries for such variables.

Probability identifier 406 may be configured to receive or identify a surge probability threshold to operate chiller 100 and transmit the surge probability threshold to PRV/VGD boundary generator 404 and/or VSD boundary generator 408. In some embodiments, probability identifier 406 may generate and transmit a user interface to user device 332 so an administrator may input such a surge probability threshold. The surge probability may be any value between 0% and 100%. Probability identifier 406 may receive the surge probability threshold and transmit it to PRV/VGD boundary generator 404 and/or VSD boundary generator 408 for further processing.

Machine learning model 314 may receive the feature vectors including chiller operating data and generate probabilities that a surge will occur based on the feature vectors. In some cases, machine learning model 314 may output the probabilities to PRV/VGD boundary generator 404. PRV/VGD boundary generator 404 may be configured to generate PRV/VGD boundaries with which to operate chiller 100 based on output probabilities of machine learning model 314 and the probabilities that are identified by probability identifier 406. PRV/VGD boundary generator 404 may compare the probability from machine learning model 314 with the surge probability threshold from probability identifier 406 to determine if the probability is the same or is within a set range or threshold of the surge probability threshold. The range or threshold can be any value. If PRV/VGD boundary generator 404 determines the probability and surge probability threshold are within the set range of each other, PRV/VGD boundary generator 404 may identify the PRV/VGD position values that data handler 402 used to generate the feature vector that was input into machine learning model 314 to generate the probability. PRV/VGD boundary generator 404 may identify such position values as the boundaries for the PRV/VGD positions.

For example, PRV/VGD boundary generator 404 may receive a surge probability of 60% from machine learning model 314 based on a feature vector that includes PRV/VGD position values of 25% of completely open. PRV/VGD boundary generator 404 may also receive a surge probability threshold of 55% from probability identifier 406. PRV/VGD boundary generator 404 may be configured to determine that any surge probability that is within 5% of the surge probability threshold is associated with a valid variable boundary. PRV/VGD boundary generator 404 may compare the predicted probability with the threshold and determine that the predicted surge probability from machine learning model 314 is within the acceptable range of the surge probability threshold and generate PRV/VGD position boundaries with values of 25% of completely open. PRV/VGD boundary generator 404 may output the determined position boundaries to performance simulator 412 to determine if the generated boundaries enable chiller 100 to have enough capacity for the new cooling load.

If PRV/VGD boundary generator 404 determines that the predicted probability from machine learning model 314 is not within a threshold of the surge probability threshold, PRV/VGD boundary generator 404 may transmit a signal to data handler 402 indicating that a boundary could not be generated. Data handler 402 may receive the signal and generate a new feature vector including new PRV/VGD position values. Data handler 402 may generate new PRV/VGD position values for the feature vector based on whether the predicted surge probability was higher or lower than the surge probability threshold. For example, in some embodiments, data handler 402 may increase the PRV/VGD position values from the values in the previous feature vector to have higher values. Higher PRV/VGD position values may enable the valves to open to allow more liquid to flow through compressor 102. On the other hand, if the predicted surge probability was too low, data handler 402 may decrease the PRV/VGD position values to increase the predicted surge probability. Because the closer chiller 100 operates to a surge boundary, the more efficient chiller 100 may operate, by increasing the probability of a surge, PRV/VGD boundary generator 404 may enable chiller 100 to operate more efficiently while operating within administrator set parameters. Data handler 402 and PRV/VGD boundary generator 404 may adjust PRV/VGD values until PRV/VGD boundary generator 404 can generate a PRV/VGD boundary that is associated with a predicted surge probability that is within the surge probability threshold.

Cooling load identifier 410 may be configured to identify changes in required cooling that chiller 100 must provide. Cooling load identifier 410 may identify desired cooling loads based on changes in configurations of building equipment or based on changes in setpoints (e.g., a zone air temperature setpoint) of a building. In some instances, such changes may be performed automatically based on a preset schedule or based on identified conditions of a building. In some instances, such changes may be required based on administrator inputs such as a manual change in a thermostat. Changes may be associated with increases or decreases in cooling loads. Cooling load identifier 410 may identify the changes and determine new cooling loads that are required to implement such changes. Cooling load identifier 410 may transmit the changes including new cooling load requirements to performance simulator 412 to determine if the boundaries that are generated by PRV/VGD boundary generator 404 and/or VSD boundary generator 408 enable chiller 100 to have enough capacity to handle the new cooling loads.

Performance simulator 412 may be configured to receive the new cooling loads from cooling load identifier 410 and boundaries that are generated by PRV/VGD boundary generator 404 and/or VSD boundary generator 408 (described below). Performance simulator 412 may simulate how chiller 100 would operate with the boundaries that PRV/VGD boundary generator 404 and/or VSD boundary generator 408 generated to determine if the boundaries would enable chiller 100 to have enough cooling capacity to handle the new cooling load that is identified by cooling load identifier 410. Performance simulator 412 may make such a determination based on the current operating conditions of the chiller and the boundaries of the control signals for either or both of the PRV/VGD boundary or the VSD boundary. For example, in some embodiments, performance simulator 412 may make determine that higher VSD frequencies and/or PRV/VGD positions may result in higher cooling capacities. Performance simulator 412 may use a linear function where higher VSD frequencies and/or PRV/VGD positions equate to higher cooling capacities in chiller 100. Performance simulator 412 may determine the cooling capacity based on the VSD frequencies and the PRV/VGD positions, however.

In some cases, performance simulator 412 may use the same values to determine the max cooling capacity of the chiller for a set of operating conditions that data handler 402 uses to generate the feature vector. For example, performance simulator 412 may use the current chiller operating values of a current refrigerant type, discharge pressure, suction pressure, stall voltage, input current, and bearing position along with boundary values for any variable speed drive frequency, current pre-rotational vane position, and/or current variable geometry diffuser position to determine what the cooling load would be if the boundary values were implemented as control values to control chiller 100. Such values may have been used in the feature vector that data handler 402 inputs into machine learning model 314 or they may have been collected from historical database 330 or chiller 100. In some embodiments, performance simulator 412 may also use characteristics of chiller 100 to determine the cooling load such as the size of chiller 100 and/or compressor 102. Performance simulator 412 may simulate how chiller 100 would operate based on these inputs and determine if chiller 100 could handle the cooling load identified by cooling load identifier 410 (e.g., determine if chiller 100 would have a cooling capacity that exceeds the cooling load identified by cooling load identifier 410). If performance simulator 412 determines the inputs can handle the identified cooling load, signal generator 414 may generate and transmit a signal to variable adjuster 318 including the boundary values that were generated by PRV/VGD boundary generator 404 and/or VSD boundary generator 408. If performance simulator 412 determines that chiller 100 could not handle the identified cooling load using the determined boundaries, however, performance simulator 412 may transmit a signal to data handler 402 to indicate that new boundaries need to be generated.

Data handler 402 may receive such a signal and generate a new feature vector including adjusted values of a different controllable chiller variable from the controllable chiller variable that was used to generate the previous boundary. For example, if performance simulator 412 determines that a generated boundary for PRV/VGD positions does not enable chiller 100 to provide enough cooling capacity to handle a new cooling load, data handler 402 may increase the VSD frequency of a previous feature in a new feature vector. Data handler 402 may generate the new feature vector with the increased VSD frequency and input it into machine learning model 314. Machine learning model 314 may generate a predicted surge probability based on the new feature vector and transmit the predicted surge probability to VSD boundary generator 408.

VSD boundary generator 408 may receive the predicted surge probability along with the surge probability threshold from probability identifier 406 and compare the two probabilities similar to how PRV/VGD boundary generator 404 compared the predicted surge probability with the surge probability threshold. VSD boundary generator 408 may determine if the predicted surge probability is within a threshold or range of the surge probability threshold. If VSD boundary generator 408 determines that the probability is within a threshold of the surge probability threshold, VSD boundary generator 408 may generate a VSD frequency boundary with the VSD frequency that was used in the feature vector that resulted in the predicted surge probability. VSD boundary generator 408 may transmit the generated boundary to performance simulator 412 to determine if the VSD frequency boundary enables chiller 100 to have a chiller capacity that satisfies a new cooling load similar to the above. On the other hand, if VSD boundary generator 408 determines the probability is not within a threshold of the surge probability threshold, data handler 402 may further adjust the VSD frequency in a new feature vector to apply to machine learning model 314. Data handler 402 may generate feature vectors with new VSD frequencies until VSD boundary generator 408 generates a boundary that is associated with a predicted surge probability that is within a predetermined range of the surge probability threshold.

Performance simulator 412 may receive the boundary generated by VSD boundary generator 408 determine whether chiller 100 could operate with a high enough cooling capacity to satisfy the new cooling load. Performance simulator 412 may make such a determination similar to how performance simulator 412 determined the max cooling capacity based on the PRV/VGD boundary that was generated by PRV/VGD boundary generator 404. If performance simulator 412 determines chiller 100 could provide enough cooling capacity to satisfy the new cooling load, signal generator 414 may generate and/or transmit a signal to variable adjuster 318 with the generated VSD boundary and/or PRV/VGD boundary. In some embodiments, if performance simulator 412 determines that chiller 100 would not have a high enough cooling capacity to satisfy a cooling load based on the generated boundaries, performance simulator 412 may generate and transmit an alert to user device 332 indicating that the chiller 100 could not satisfy a cooling load based on the surge probability threshold.

In some embodiments, instead of simulating whether the generated boundaries would enable a chiller to handle a given cooling load, boundary generator 316 transmits the boundaries to variable adjuster 318 and variable adjuster 318 sends control signals at the generated boundaries to chiller 100. Variable adjuster 318 determines the cooling capacity of chiller 100 based on the control signals and determines if a desired cooling capacity is met. If variable adjuster 318 determines the desired cooling is not met, variable adjuster 318 may transmit an indication to data handler 402 indicating that new boundaries are needed similar to performance simulator 412. Otherwise, variable adjuster 318 may operate chiller 100 based on the generated boundaries.

Boundary generator 316 may generate control variable boundaries in different orders based on whether the change in cooling load is an increase or a decrease. For example, when the chiller cooling load needs to increase, the boundary generator 316 may generate an upper boundary for the PRV/VGD position. If boundary generator 316 determines that the chiller cooling load is not at the desired amount when the PRV/VGD position reaches its upper threshold, the boundary generator 316 may generate an upper boundary for the VSD frequency. On the other hand, when the chiller load needs to decrease, boundary generator 316 may first generate a lower boundary for the VSD frequency. If boundary generator 316 determines that the chiller cooling load is not at the desired amount when the VSD frequency reaches the lower boundary, boundary generator 316 may generate a lower boundary for the PRV/VGD position. The upper boundaries may define how far a particular variable can be increased and the lower boundaries may define how far a particular variable can be decreased before the probability of a surge becomes too high.

Advantageously, by implementing the systems and methods described herein, an administrator can input a surge probability threshold and a chiller controller can automatically determine boundaries of operation to implement based on input the surge probability threshold. The chiller can operate to avoid entering a surge state and consequently operate more efficiently.

Figure 5:
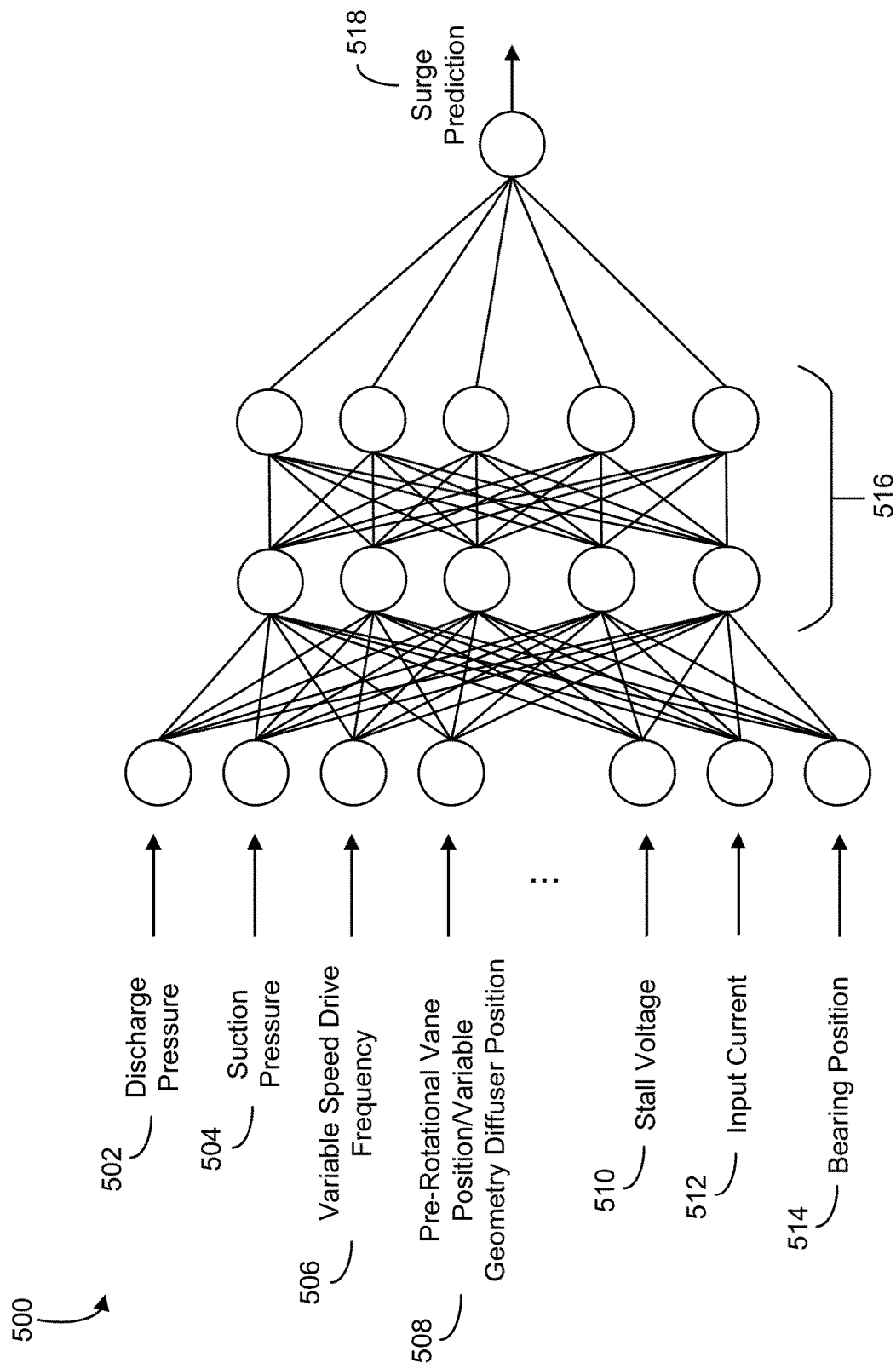
FIG. 5 is a drawing of an example neural network for generating a surge probability, according to some embodiments.

Referring now to FIG. 5, a drawing of an example neural network 500 for generating a surge probability is shown, according to some embodiments. Neural network 500 may be an example embodiment of machine learning model 314, shown and described with reference to FIG. 3. Neural network 500 is shown to include inputs associated with characteristics of chiller 100. The inputs may include, for example, a discharge pressure 502 (e.g., a pressure at an outlet of compressor 102), a suction pressure 504 (e.g., a pressure at an inlet of compressor 102), a VSD frequency 506, a PRV/VGD position 508, a stall voltage 510, an input current 512, a refrigerant type (not shown), and a bearing position 514. In some embodiments, neural network 500 is trained to generate surge predictions using each of inputs 502-514 except for either one of VSD frequency 506 or PRV/VGD position 508. The inputs may include any type of input related to operation of a chiller. For example, the inputs may also include current control signals that a controller implements to operate chiller 100. Inputs 502-514 may be input nodes that provide outputs to nodes of hidden layers 516. Nodes of hidden layers 516 may perform various functions on the inputs and provide an output (e.g., weighted signal outputs) to output layer 518. Output layer 518 may include one or more output nodes and indicate a probability that a surge will occur. Neural network 500 can include any number of components (e.g., any number of hidden layers, input nodes, output nodes, etc.).

The outputs of each of input nodes 502-514 and the nodes of hidden layers 516 may be signals or combinations of signals of neural network 500. Each of the signals or combinations of signals may be associated with a weight.

For example, an input signal associated with discharge pressure 502 may have a weight of 0.2 while an input signal associated with bearing position 514 may have a weight of 0.7. The weights may indicate an importance of a particular input compared to other inputs. For example, inputs related to stall voltage 510 may have a higher weight than inputs related to input current 512. Other inputs that may be associated with a higher weight may include discharge pressure 502 and suction pressure 504. In some embodiments, an input related to a differential between discharge pressure 502 and suction pressure 504 may have a higher weight than other weights. The signals of each input may have any weights. The weights may be tuned via training as described below. Further, as described below, nodes of hidden layers 516 may perform one or more operations on the signals and then output weighted signals to output layer 518.

Inputs 502-514 may be values associated with operation of chiller 100. Inputs 502-514 may be fed into neural network 500 as chiller 100 continues operating so neural network 500 may determine probabilities for whether a surge will occur in real-time. Inputs 502-514 may be constantly fed into neural network 500 or fed into neural network 500 as periodically-spaced samples (e.g., as time-series data). The data of inputs 502-514 may be associated with timestamps indicating when the chiller operating data was generated and/or an identifier (e.g., a device identifier, a timeseries identifier, a MAC address, an IP address, etc.) associated with chiller 100 or a timeseries of the chiller operating data. For example, neural network 500 may receive a timeseries of chiller operating data every minute. The timeseries may include values for inputs 502-514 at spaced intervals, such as every five milliseconds, 10 milliseconds, 20 milliseconds, etc. Each value may be associated with a timestamp indicating when it was generated by an associated sensor, when it was collected by a gateway that transferred it to a building management system server, or when chiller controller 302 received it. The values may also be associated with identifiers indicating with which chiller the values are associated and/or which device (e.g., sensor) generated the chiller operating data. The timestamps and the identifiers may be included as inputs into neural network 500.

The input nodes associated with inputs 502-514 may be a first layer of neural network 500 that represents the input layer of neural network 500. Each input can be a node of the input layer that sends a weighted signal to one or more nodes of hidden layers 516. Inputs 502-514 can be values that were converted from their collected values, by the server or processor associated with neural network 500, into numerical values, binary code, matrices, vectors, etc. For example, the refrigerant type may be converted into a numerical value based on a correlated number in a database of the server (not shown). The server can then normalize the numbers into values between −1 and 1 using any technique so operations can be performed on the numbers by the nodes of hidden layers 516. The server can normalize the numbers into any value ranges. After the server normalizes the numbers to values between −1 and 1, neural network 500 can transmit the values to nodes of hidden layers 516 as weighted signals.

Hidden layers 516 may be one or more layers of nodes that receive input signals or combinations of input signals from inputs 502-514. The nodes of hidden layers 516 may perform one or more operations on the input signals or combinations of signals and provide signals or combinations of signals to output layer 518. While two hidden layers are shown, there may be any number of hidden layers. The nodes of each hidden layer may provide output signals to nodes of other hidden layers or to output layer 518. In some embodiments, the number of nodes or layers of hidden layers 516 are correlated with the number of input nodes and/or the number of output nodes of neural network 500. Neural network 500 can perform operations, such as multiplication, a linear operation, sigmoid, hyperbolic tangent, or any other activation function, at each layer of hidden layers 516 based on the values associated with input nodes 502-514 and the weights associated with signals or combinations of signals transmitted between input nodes 502-514 and the nodes of hidden layers 516. Weighted signals or combinations of signals from hidden layers 516 can be sent to output layer 518.

Output layer 518 may be a layer of neural network 500 that is dedicated to providing a probability that a surge will occur in a binary classification system. In such a binary classification system, output layer 518 is shown to include a node that represents a probability that a surge will occur. The probability may be determined by neural network 500 based on inputs 502-514. If inputs 502-514 indicate that a surge will likely occur, the node of output layer 518 may be associated with a high probability (a probability over 50%, for example). If inputs 502-514 indicate that a surge will not likely occur, the node of output layer 518 may be associated with a low probability (a probability under 50%, for example). As described above, neural network 500 can send determined probabilities to PRV/VGD boundary generator 404 and/or VSD boundary generator 408 to generate chiller control signal boundaries.

The weights associated with signals or combinations of signals that travel between inputs 502-514 and hidden layers 516 and then between hidden layers 516 and output layer 518 can be automatically determined based on training data provided by an administrator. The training data can include chiller operating data collected from a cloud database (e.g., cloud database 328). The data may include input data labeled with the actual output (e.g., chiller characteristic values and a label indicating whether a surge had occurred). Neural network 500 can initially have randomized weights associated with each of its signals or combinations of signals, but after a sufficient amount of training data has been input into neural network 500, weights can be determined to a degree of certainty that an administrator may identify as sufficient.

Figure 6:
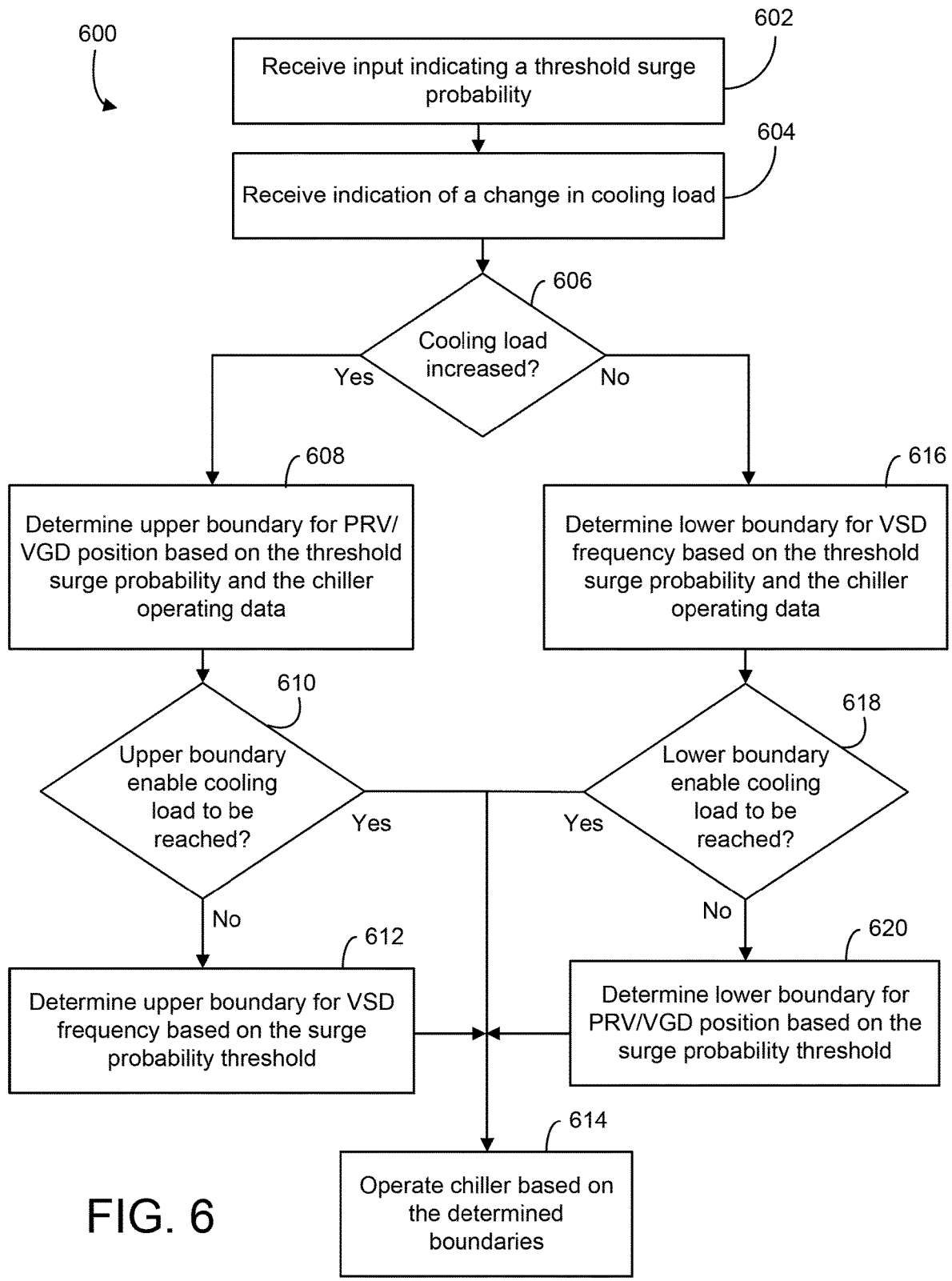
FIG. 6 is a flow diagram of an example process for generating and using boundaries for controllable chiller variables to operate a chiller, according to some embodiments.

Referring now to FIG. 6, a flow diagram of an example process for generating and using boundaries for controllable chiller variables to operate a chiller is shown, according to some embodiments. Process 600 can be performed by any controller or processor of a building management system. For example, process 600 may be performed by one or more data processing systems (e.g., chiller controller 302). Process 600 may enable a chiller (e.g., chiller 100) including a compressor (e.g., compressor 102) to operate in different conditions over time within boundaries generated based on a surge probability threshold. A surge probability threshold and an indication of a change in cooling load may be received. Controllable chiller variable boundaries may be generated based on the surge probability threshold and the indication of the change in cooling load. Consequently, the chiller may operate to avoid surges within a surge probability threshold. Process 600 can include any number of steps and the steps can be performed in any order.

Process 600 is shown to include receiving an input indicating a surge probability threshold and chiller operating data (step 602). For example, step 602 may be performed by boundary generator 316. An interface may be generated at a user device. The interface may include a field for an administrator to input a surge probability threshold. The administrator may input a surge probability between 0% and 100% for the surge probability threshold. In some embodiments, the input may be received automatically from another controller or processor of a BMS. Additionally, chiller operating data may be received. The chiller operating data may include values for refrigerant type, discharge pressure, suction pressure, stall voltage, input current, bearing position, current variable speed drive frequency, current pre-rotational vane position, or current variable geometry diffuser position. The chiller operating data may be current chiller operating data (e.g., values associated with how the chiller is currently operating).

Process 600 is shown to include receiving an indication of a change in cooling load (step 604). For example, step 604 may be performed by boundary generator 316. The indication of a change in cooling load may be received based on a change in setpoint of a BMS. The cooling load may be the required cooling load for the chiller. For example, an occupant of the BMS may manually change a zone air temperature setpoint of a building via a thermostat. Accordingly, the thermostat may send an indication to the BMS or to a processor within the BMS (e.g., chiller controller 302) indicating the change in the zone air temperature setpoint. The change may be identified and a new cooling load may be determined based on the change in the zone air temperature set point. In another example, the building may host an event that hosts a large amount of people. Sensors of the building sense the temperature increasing as a result of the high occupancy and send an indication of the rising temperature to a processor of the BMS. A change in cooling load may be identified based on the high occupancy. In yet another example, there may be a scheduled change in cooling load based on a scheduled event that occurs. A processor may determine when the scheduled event occurs and determine that there is a change in cooling load for the chiller. For example, a planned increase in cooling load may be associated with an event that will entail a large number of occupants.

Process 600 is shown to include determining if the required cooling load increased (step 606). For example, step 606 may be performed by boundary generator 316. The indication of the change in cooling load may be identified. The required cooling load may increase if the chiller is required to provide a higher cooling capacity while the cooling load may decrease if the chiller is required to provide a lower cooling capacity. Examples of instances in which the chiller may be required to provide a higher cooling capacity include, but are not limited to, events that a large number of occupants may attend, a sudden decrease in the zone air temperature setpoint, connection of a new control system that induces heat while operating, etc. Examples of instances in which the required cooling load decreases include, but are not limited to, times when there is a sudden drop in people of the building or space, scheduled downturns in the operation of building equipment, increases in the setpoint of the zone air temperature, etc.

If at step 606 it is determined that the required cooling load increased, process 600 is shown to include determining the upper boundary for the PRV/VGD position based on the surge probability threshold and the chiller operating data (step 608). For example, step 608 may be performed by boundary generator 316. Feature vectors including chiller operating data may be generated. The feature vectors may be applied to a machine learning model to determine a probability that a surge will occur based on various chiller operating data. In some cases, the feature vectors may be generated in response to reception of an indication that there will be an increase in cooling load for the chiller to handle. For example, an indication that the chiller needs to handle an increased cooling load may be received. A feature vector including current chiller operating data of the chiller including a value for a PRV/VGD position may be generated and applied to a machine learning model.

The machine learning model may receive the feature vector including the chiller operating data and generate a predicted probability that a surge will occur based on the feature vector. The predicted surge probability may be compared to the surge probability threshold. It may be determined if the predicted probability and surge probability threshold are within a threshold or range of each other. If it is determined that the predicted surge probability and the surge probability threshold are within the threshold or range of each other, PRV/VGD position values may be identified from the feature vector that was input into the machine learning model. The PRV/VGD position values may be generated as boundaries or candidate boundaries with which to control the chiller.

For example, a feature vector may be generated and input into the machine learning model including chiller operating data and a value for a PRV/VGD position. The machine learning model may generate a predicted surge probability based on the feature vector. The predicted surge probability may be compared to surge probability threshold to determine if the probabilities are within a threshold of each other. If the probabilities are not within a threshold of each other, a new feature vector may be generated with a new PRV/VGD position value depending on if the predicted surge probability is higher or lower than the surge probability threshold. For instance, in some embodiments, if the predicted surge probability is higher, the new feature vector may include a higher PRV/VGD position value. If the predicted surge probability is lower, however, the new feature vector may include a lower PRV/VGD position value. New feature vectors may be generated until the machine learning model generates a predicted surge probability that is within the threshold of the surge probability threshold.

Process 600 is shown to include determining if the upper boundary enables the chiller to reach the new required cooling (step 610). For example, step 606 may be performed by boundary generator 316. Operation of the chiller may be simulated based on the generated upper PRV/VGD position boundary to determine if the boundary enables the chiller to provide enough cooling capacity for the new cooling load. The determination may be made based on the current operating conditions of the chiller and the PRV/VGD position boundary. In some cases, the same or similar values may be used to determine the max cooling capacity of the chiller for the same set of operating conditions that were used to generate the feature vector that resulted in the predicted surge probability. For example, the current chiller operating values for current refrigerant type, discharge pressure, suction pressure, stall voltage, input current, and bearing position along with boundary values for the PRV/VGD position may be used to determine what the cooling load would be if the PRV/VGD position boundary values were implemented as control values to control the chiller. Such values may have been used in the feature vector that were input into the machine learning model or that may have been collected from a database or the chiller. In some embodiments, characteristics of the chiller may be used to determine the cooling load such as the size of the chiller or the compressor of the chiller. Operation of the chiller may be simulated based on these inputs and it may be determined if the chiller could handle the new cooling load. If it is determined that the chiller can handle the identified cooling load based on the upper PRV/VGD boundary, at step 614, the upper PRV/VGD position boundary may be generated to be used to control the chiller. If it is determined that the chiller could not handle the new cooling load based on control signals that are below the generated upper PRV/VGD boundary, however, at step 612, an upper boundary for the VSD frequency may be determined based on the same surge probability threshold.

For example, step 612 may be performed by boundary generator 316. A new feature vector may be generated that includes a new value for the VSD frequency control signal. For example, if it is determined that a generated boundary for the PRV/VGD position does not enable the chiller to provide enough cooling capacity to handle the new cooling load, the new feature vector may include a value for the VSD frequency that is higher than the VSD frequency value of the previous feature vector. The new feature vector including the higher VSD frequency may be generated and used as an input into the machine learning model. The machine learning model may generate a new predicted surge probability based on the new feature vector. The new predicted surge probability and the new feature vector may be used to generate an upper boundary for the VSD frequency based on the surge probability threshold.

The upper boundary for the VSD frequency may be determined similar to how the upper boundary for the PRV/VGD position was generated. For example, the machine learning model may generate a predicted surge probability based on the increased VSD frequency. The predicted surge may be compared to the surge probability threshold. It may be determined if the two probabilities are within a threshold of each other. If it is determined that the two probabilities are within a threshold of each other, an upper VSD frequency boundary may be generated with the same VSD frequency value that was used in the feature vector that was used to generate the predicted surge probability. At step 614, the upper PRV/VGD position boundary may be used to control the chiller.

In some embodiments, it may be determined if the VSD frequency boundary and, in some cases, the generated PRV/VGD position boundary, enable the chiller to have a chiller capacity that satisfies the new cooling load. Such a determination may be made using the VSD frequency boundary and PRV/VGD position boundary and other chiller operating conditions to simulate how the chiller would perform if a VSD frequency at the VSD frequency boundary were to be applied to the chiller. In some embodiments, the VSD frequency boundary and the PRV/VGD position boundary may be used to simulate whether the use of each boundary would enable the chiller to provide enough cooling capacity to satisfy a change in the cooling load. If it is determined that signals at both the VSD frequency boundary and the PRV/VGD position boundary would not enable the chiller to provide enough cooling capacity to handle the change in the cooling load, a signal may be sent to a user device indicating that the chiller cannot operate within the surge probability threshold. On the other hand, if it is determined that the boundaries enable the chiller to provide the required cooling capacity, the chiller may be controlled with control signals within the specified boundaries.

If at step 606 it is determined that the required cooling load decreased, process 600 may include determining the lower boundary for the VSD frequency based on the surge probability threshold and the chiller operating data (step 616). For example, step 616 may be performed by boundary generator 316. The lower boundary for the VSD frequency may be determined similar to how the upper boundary for the PRV/VGD position was determined in step 608. For example, a feature vector may be input into a machine learning model including chiller operating data and a value for VSD frequency. The machine learning model may generate a predicted surge probability based on the feature vector. The predicted surge probability may be compared to the surge probability threshold to determine if the probabilities are within a threshold of each other. If the probabilities are not within a threshold of each other, a new feature vector may be generated with a new VSD frequency that may vary depending on if the predicted surge probability is higher than the surge probability threshold or lower. For instance, in some embodiments, if the predicted surge probability is higher, the new feature vector may include a higher VSD frequency. It the predicted surge probability is lower, however, the new feature vector may include a lower VSD frequency. New feature vectors may be generated and applied to the machine learning model until the machine learning model generates a predicted surge probability that is within the threshold of the surge probability threshold.

Process 600 may include determining whether the predicted VSD frequency lower boundary would enable the cooling load to be reached (step 618). For example, step 618 may be performed by boundary generator 316. Step 618 may be performed similar to how step 610 is performed. For example, operation of the chiller may be simulated based on the generated lower VSD frequency to determine if the boundary enables the chiller to provide enough cooling capacity for the new cooling load. The determination may be made based on the current operating conditions of the chiller and the VSD frequency value. In some cases, the same or similar values may be used to determine the max cooling capacity of the chiller for the same set of operating conditions that were used to generate the feature vector that resulted in the predicted surge probability. For example, the current chiller operating values for current refrigerant type, discharge pressure, suction pressure, stall voltage, input current, and bearing position along with boundary values for the VSD frequency may be used to determine what the cooling load would be if the lower VSD frequency boundary values were implemented as control values to control the chiller. Such values may have been used in the feature vector that were input into the machine learning model or that may have been collected from a database or the chiller. In some embodiments, characteristics of the chiller may be used to determine the cooling capacity such as the size of the chiller or the compressor of the chiller. Operation of the chiller may be simulated based on these inputs and it may be determined if the chiller could handle the new cooling load. If it is determined that the chiller can handle the identified cooling load based on the lower VSD frequency boundary, at step 614, the lower VSD frequency boundary may be generated to be used to control the chiller. If it is determined that the chiller could not handle the new cooling load based on control signals that are above the generated lower VSD frequency boundary, however, at step 620, a lower PRV/VGD position boundary may be determined based on the same surge probability threshold.

For example, step 620 may be performed by boundary generator 316. A new feature vector may be generated that includes a new value for the PRV/VGD position control signal. For example, if it is determined that a generated boundary for the VSD frequency value does not enable the chiller to provide enough cooling capacity to handle the new cooling load, the new feature vector may include a value for the PRV/VGD position control that is lower than the PRV/VGD position value of the previous feature vector. The new feature vector including the lower PRV/VGD position value may be generated and used as an input into the machine learning model. The machine learning model may generate a new predicted surge probability based on the new feature vector. The new predicted surge probability and the new feature vector may be used to generate a lower boundary for the PRV/VGD position based on the surge probability threshold.

The lower boundary for the PRV/VGD position may be determined similar to how the lower boundary for the VSD frequency was generated. For example, the machine learning model may generate a predicted surge probability based on the decreased PRV/VGD position. The predicted surge may be compared to the surge probability threshold. It may be determined if the two probabilities are within a threshold of each other. If it is determined that the two probabilities are within a threshold of each other, a lower PRV/VGD position boundary may be generated with the same PRV/VGD position value that was used in the feature vector that was used to generate the predicted surge probability. At step 614, the upper PRV/VGD position boundary may be used to control the chiller.

In some embodiments, it may be determined if the generated lower PRV/VGD position boundary enables the chiller to have a chiller capacity that satisfies the new cooling load. Such a determination may be made using the lower PRV/VGD position boundary and other chiller operating conditions to simulate how the chiller would perform if the lower PRV/VGD position boundary were to be applied to the chiller. In some embodiments, the lower PRV/VGD position boundary may be used to simulate whether the use of boundary would enable the chiller to provide enough cooling capacity to satisfy a change in the cooling load. If it is determined that signals at the lower PRV/VGD position boundary would not enable the chiller to provide enough cooling capacity to handle the change in the cooling load, a signal may be sent to a user device indicating that the chiller cannot operate within the surge probability threshold. On the other hand, if it is determined that the lower PRV/VGD position boundary enables the chiller to provide the required cooling capacity, the chiller may be controlled with control signals within the specified boundary.

In some embodiments, the chiller may be controlled by adjusting a first value of a first controllable chiller variable to affect a cooling capacity of the chiller until either a desired cooling capacity is reached or the first value of the first controllable chiller variable reaches a boundary or threshold as generated above. If the first value of the first controllable chiller variable reaches the threshold before the desired cooling capacity is reached, a second value of a second controllable chiller variable may be adjusted until the desired cooling capacity is reached. For example, an upper boundary for a PRV/VGD position may be determined to be 70% of fully open. To operate the chiller, the value for the PRV/VGD position control signal may be adjusted to be 70% of fully open. If the chiller still cannot handle a new cooling load, the VSD frequency may be increased until either the desired cooling load is reached or the VSD frequency reaches a boundary determined as described above. If it is determined that the chiller cannot be operated to handle a new cooling load based on the surge probability threshold, a message may be transmitted to a user device indicating that the desired cooling capacity could not be reached.

Figure 7:
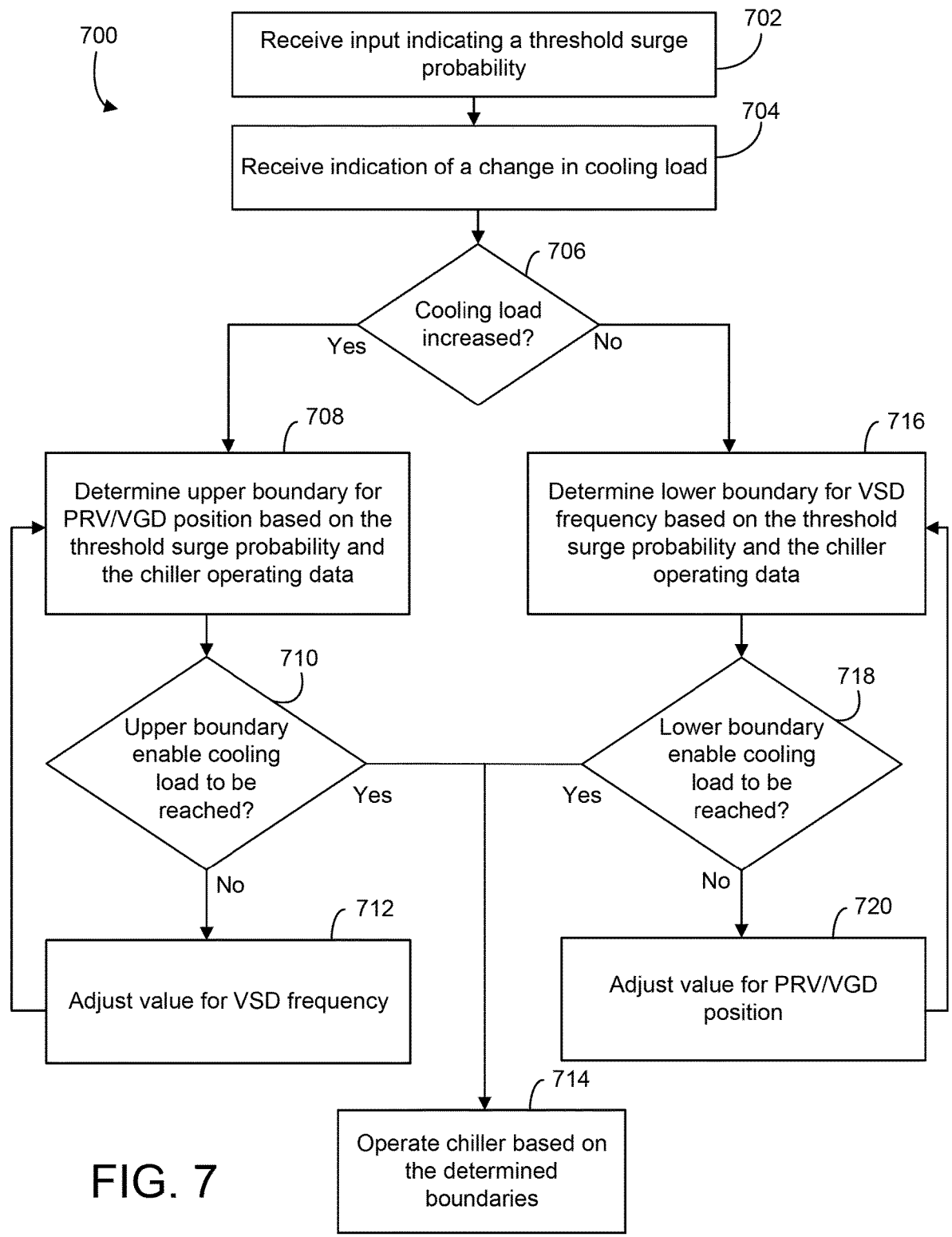
FIG. 7 is a flow diagram of an example process for generating and using boundaries for controllable chiller variables to operate a chiller, according to some embodiments.

Referring now to FIG. 7, a flow diagram of an example process 700 for generating and using boundaries for controllable chiller variables to operate a chiller is shown, according to some embodiments. For example, process 700 may be performed by one or more data processing systems (e.g., chiller controller 302). Process 700 may enable a chiller (e.g., chiller 100) including a compressor (e.g., compressor 102) to operate in different conditions over time within boundaries generated based on the surge probability threshold. A surge probability threshold (e.g., an acceptable probability for a surge to occur) and an indication of a change in cooling load may be received. Controllable chiller variable boundaries may be generated based on the surge probability threshold and the indication of the change in cooling load. Different values of controllable chiller variables may affect the surge probability. Process 700 accounts for such changes by incrementally adjusting controllable chiller variable values until a boundary for another controllable chiller variable that enables the cooling load to be reached is identified. Consequently, by implementing process 700, the effect that changing controllable chiller variables may have when determining boundaries for such variables may be identified. Process 700 can include any number of steps and the steps can be performed in any order.

Process 700 is shown to include receiving an input indicating a surge probability threshold and chiller operating data (step 702), receiving an indication of a change in cooling load (step 704), determining if the cooling load increased (step 706), determining an upper boundary for a PRV/VGD position based on the surge probability threshold and the chiller operating data (step 708), and determining whether the upper boundary for the PRV/VGD position enables the cooling load to be reached (step 710). Each of steps 702-710 may be performed by boundary generator 316 similar to steps 602-610, shown and described with reference to FIG. 6.

Process 700 is shown to include adjusting a value for the VSD frequency if the PRV/VGD upper boundary does not enable the cooling load to be reached (step 712). For example, step 712 may be performed by boundary generator 316. Responsive to a PRV/VGD upper boundary being determined to not enable the chiller to provide enough cooling capacity to handle a new cooling load, a value for the VSD frequency may be adjusted. The value for the VSD frequency may be adjusted in a new feature vector from the value of the VSD frequency of the previous feature vector that was used to generate the PRV/VGD upper boundary. The VSD frequency value may be increased or decreased from the previous VSD frequency value. For example, it may be determined at step 710 that a PRV/VGD upper boundary would not enable the chiller to have the cooling capacity to provide a new cooling load. A new feature vector may be generated that includes a VSD frequency is higher than the VSD frequency that was used to generate the PRV/VGD upper boundary. At step 708, the new feature vector may be applied to the machine learning model to determine a new PRV/VGD upper boundary. Accordingly, steps 708-712 may be iteratively performed until a PRV/VGD upper boundary is generated that is determined to be able to provide enough cooling capacity to satisfy the new cooling load. Once the PRV/VGD upper boundary is generated, the PRV/VGD upper boundary may be implemented along with the VSD frequency that was used to generate the PRV/VGD upper boundary to control the chiller.

In some embodiments, steps 708-712 may be performed until the value for the VSD frequency reaches a threshold set by an administrator. For example, an administrator may set a VSD frequency threshold to be 60 Hz. If steps 708-712 are performed until a feature vector is generated and/or used to generate a PRV/VGD upper boundary based on a VSD frequency value of 60 Hz and it is determined that the chiller still cannot operate based on the PRV/VGD upper boundary, a signal may be generated and transmitted to the administrator indicating that the chiller cannot provide enough cooling capacity to satisfy a cooling load based on the surge probability threshold.

Process 700 is shown to include determining a lower boundary for the VSD frequency based on the surge probability threshold and the chiller operating data (step 716) and determining if the lower boundary enables the new cooling load to be reached (step 718). Each of steps 716 and 718 may be performed if it is determined that the cooling load did not increase at step 706. Steps 716 and 718 may be performed by boundary generator 316. Steps 716 and 718 may be performed similar to steps 616 and 618, shown and described with reference to FIG. 6.

Process 700 is shown to include adjusting a value for the PRV/VGD position (step 720). In some embodiments, step 720 may be performed by boundary generator 316. The value for the PRV/VGD position may be adjusted similar to how the value for the VSD frequency was adjusted in step 712. For example, step 720 may be performed by boundary generator 316 or variable adjuster 318. Responsive to a lower VSD boundary being determined to not enable the chiller to provide enough cooling capacity to handle a new cooling load, a value for the PRV/VGD position may be adjusted. The value for the PRV/VGD position may be adjusted in a new feature vector from the value of the PRV/VGD position of the previous feature vector that was used to generate the lower VSD frequency boundary. The PRV/VGD position value may be increased or decreased from the previous PRV/VGD position value. For example, it may be determined at step 718 that a lower VSD frequency boundary would not enable the chiller to have the cooling capacity to provide a new cooling load. A new feature vector may be generated that includes a PRV/VGD position is higher than the PRV/VGD position that was used to generate the lower VSD frequency boundary. At step 716, the new feature vector may be applied to the machine learning model to determine a new lower VSD frequency boundary. Accordingly, steps 716-720 may be iteratively performed until a lower VSD frequency boundary is generated that is determined to be able to provide enough cooling capacity to satisfy the new cooling load. Once the lower VSD frequency boundary is generated, the lower VSD frequency boundary may be implemented along with the PRV/VGD position that was used to generate the lower VSD frequency boundary to control the chiller.

In some embodiments, steps 716-720 may be performed until the value for the PRV/VGD position reaches a threshold set by an administrator. For example, an administrator may set a PRV/VGD position threshold to be 80% of open. If steps 716-720 are performed until a feature vector is generated and used to generate a lower VSD frequency boundary based on a PRV/VGD position value of 80% of open and it is determined that the chiller still cannot operate based on the lower VSD frequency boundary, a signal may be generated and transmitted to the administrator indicating that the chiller cannot provide enough cooling capacity to satisfy a cooling load based on the surge probability threshold.

Figure 8:
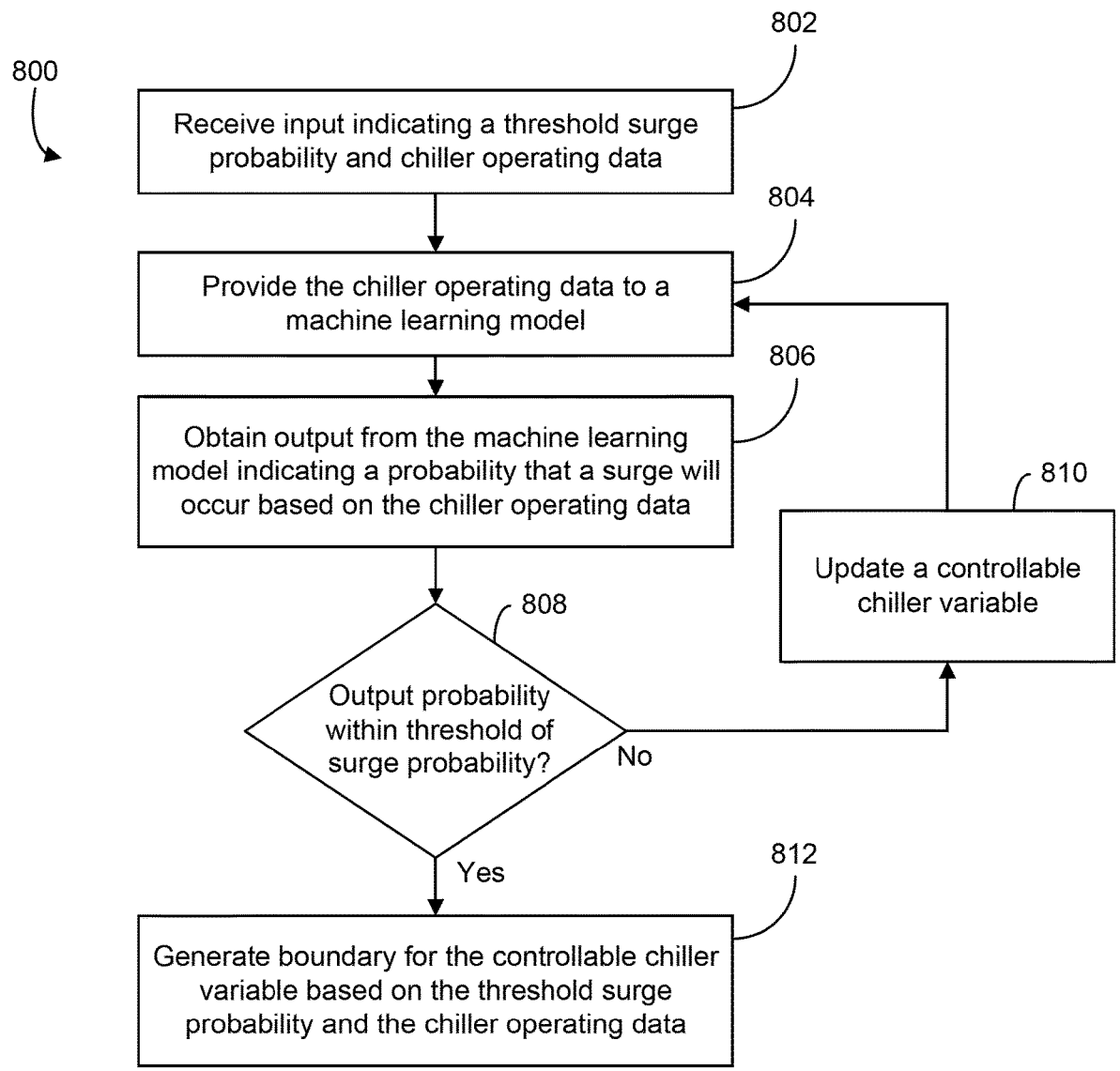
FIG. 8 is a flow diagram of an example process for generating a boundary for a controllable chiller variable, according to some embodiments.

Referring now to FIG. 8, a flow diagram of an example process 800 for generating a boundary for a controllable chiller variable is shown, according to some embodiments. For example, process 800 may be performed by one or more data processing systems (e.g., chiller controller 302). Process 800 may be an example process detailing how a boundary for a controllable chiller variable may be generated in any of steps 608, 612, 616, 620, 708, and/or 716. Process 800 may also detail how a boundary for a controllable chiller variable may be generated in any of steps 1210, 1214, 1218, and/or 1222. Advantageously, process 800 may be performed to automatically generate a boundary for a controllable chiller variable based on a surge probability threshold. Consequently, surges may be avoided in a chiller while the chiller may operate close to the surge state, improving the chiller's efficiency. Process 800 can include any number of steps and the steps can be performed in any order.

Process 800 is shown to include receiving an input indicating a surge probability threshold and chiller operating data (step 802). For example, step 802 may be performed by boundary generator 316. Step 802 may be performed similar to how step 602 or 702 is performed. For example, an input may be received at a user interface indicating a surge probability threshold. The input probability may be any value between 0% and 100%. The input may be received at a user device and transmitted to the one or more data processing systems. The chiller operating data may be received or obtained from a database or from sensors of the chiller. The database may be a cloud database or a database that is local to the one or more processors. The chiller operating data may include values for refrigerant type, discharge pressure, suction pressure, stall voltage, input current, bearing position, current variable speed drive frequency, current pre-rotational vane position, or current variable geometry diffuser position. The chiller operating data may be current chiller operating data (e.g., values associated with how the chiller is currently operating).

Process 800 is shown to include providing the chiller operating data to one or more machine learning models (step 804). For example, step 804 may be performed by boundary generator 316. The chiller operating data may be formatted into a feature vector. The feature vector may include numerical values for the chiller operating data. For any chiller operating data that is associated with a word, a corresponding value for the word may be obtained from a database. For example, different types of coolant may each be associated with a particular value. In some embodiments, the values may be normalized into values between −1 and 1 when they are used in the feature vector. Once the feature vector is generated, the feature vector may be applied to the one or more machine learning models.

The one or more machine learning models may each be any of a neural network, a support vector machine, random forest, or any other type of machine learning model. Each of the machine learning models may be trained to predict a probability of a surge occurring based on feature vectors including chiller operating data. In some embodiments, the one or more machine learning models may output the probability of the surge to one output node. In some embodiments, the one or more machine learning models may output the probability of the surge to two output nodes in a binary classification system. For example, the one or more machine learning models may output a probability that a surge will occur based on the chiller operating data and a probability that a surge will not occur based on the same chiller operating data. Each of the probabilities may be between 0% and 100%. For example, the machine learning model may output a probability that a surge will occur of 60% and a probability that a surge will not occur of 40%. The probabilities may or may not aggregate to 100%.

Process 800 is shown to include obtaining an output from the machine learning model indicating a probability that a surge will occur based on the chiller operating data (step 806). For example, step 806 may be performed by boundary generator 316. An output may be obtained from the machine learning model based on the feature vector including the chiller operating data. The output may include a probability that a surge will occur. In some embodiments, the output may also include a probability that a surge will not occur.

Process 800 is shown to include determining if the output probability is within a threshold of the surge probability threshold (step 808). For example, step 806 may be performed by boundary generator 316. The output probability may be compared to the surge probability threshold that was obtained in step 802. A difference between the two probabilities may be determined. The difference may be compared to a threshold. The threshold may be a predetermined threshold as set by an administrator. For example, the threshold may be 7%. The threshold may be any value.

Process 800 is shown to include updating a controllable chiller variable (step 810). For example, step 810 may be performed by boundary generator 316. If it is determined that the difference between the two probabilities is higher than the threshold, at step 810, a controllable chiller variable of the chiller may be updated. The controllable chiller variable that is updated may be the controllable chiller variable for which a boundary (upper or lower) is being determined or generated. Examples of controllable chiller variables include VSD frequency, PRV/VGD positions, or any other controllable chiller variable that may be adjusted to control the chiller. In some embodiments, the PRV position or the VGD position may be separate controllable chiller variables (and consequently controlled separately). The controllable chiller variable may be adjusted by adjusting its value for a new feature vector from its value in the previous feature vector that was provided to the machine learning model at step 804. The controllable chiller variable may be adjusted to have a higher or lower value than its previous value. For example, the controllable chiller variable may be adjusted to have a higher value if the difference between the probabilities was too high and adjusted to have a lower value if the difference between the probabilities was too low. Once the controllable chiller variable has been adjusted in a new feature vector, at step 804, the new feature vector including otherwise the same values may be provided to the machine learning model.

Process 800 is shown to include generating a boundary for the controllable chiller variable based on the surge probability threshold and the chiller operating data (step 812). For example, step 812 may be performed by boundary generator 316. If it is determined that the difference between the two probabilities is lower than the threshold, at step 812, a boundary for controllable chiller variable may be generated. The boundary may be an upper boundary or a lower boundary for any controllable chiller variable. For example, the boundary may be an upper boundary or a lower boundary for the VSD frequency or the PRV/VGD position. The boundary may be used to operate the chiller. As described above, the boundary may only be used if it is determined that the boundary enables the chiller to provide enough cooling capacity to satisfy a new cooling capacity.

Figure 9:
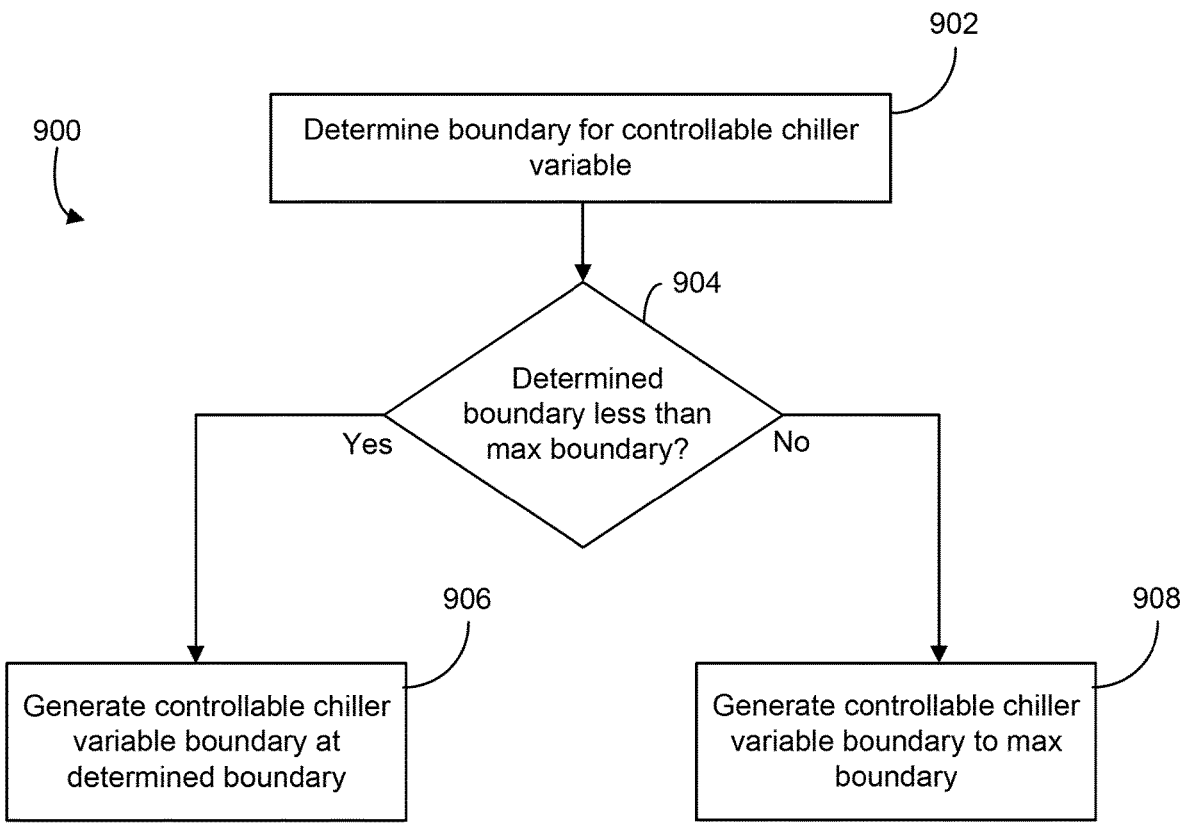
FIG. 9 is a flow diagram of an example process for generating a boundary for a controllable chiller variable, according to some embodiments.

Referring now to FIG. 9, a flow diagram of an example process 900 for generating a boundary for a controllable chiller variable is shown, according to some embodiments. For example, process 900 may be performed by one or more data processing systems (e.g., chiller controller 302). Process 900 may be an example process detailing how a boundary for a controllable chiller variable may be generated in any of steps 608, 616, 708, and/or 716. Advantageously, process 900 may enable the one or more data processing systems to avoid generating a boundary that is outside of a chillers operation. Process 900 can include any number of steps and the steps can be performed in any order.

Process 900 is shown to include determining a boundary for a controllable chiller variable (step 902). For example, step 902 may be performed by boundary generator 902. Step 902 may be performed using the steps provided in process 800. Process 900 is shown to include determining if a boundary is less than a max boundary (step 904). Step 904 may be performed by boundary generator 316. A max boundary may be received as an administrator input. The max boundary may indicate the limits with which the chiller may operate or the limits with which the chiller can operate. The max boundary may be the lowest value that a controllable chiller variable boundary may be or the highest value that the controllable chiller variable boundary may be. For example, the max boundary may be the lowest that a lower VSD frequency boundary may be or the highest that an upper VSD frequency boundary may be. In some instances, max boundaries may be input for both the lowest a controllable chiller variable boundary may be and the highest a controllable chiller variable boundary may be. Max boundaries may be set for any number of controllable chiller variables. In some embodiments, the max boundary may indicate 80% of the limits with which the chiller may operate. The boundary that was determined in step 902 may be compared with the max boundary. If, at step 904, it is determined that the determined boundary is less than the max boundary, at step 906 a controllable chiller variable boundary may be generated at the determined boundary. On the other hand, if, at step 904, it is determined that the determined boundary is greater than the max boundary, at step 908, a controllable chiller variable boundary may be generated at the max boundary. Consequently, in some embodiments, a controllable chiller variable boundary may never be generated outside of the possible operation bounds of the chiller or the bounds set by an administrator.

Figure 10:
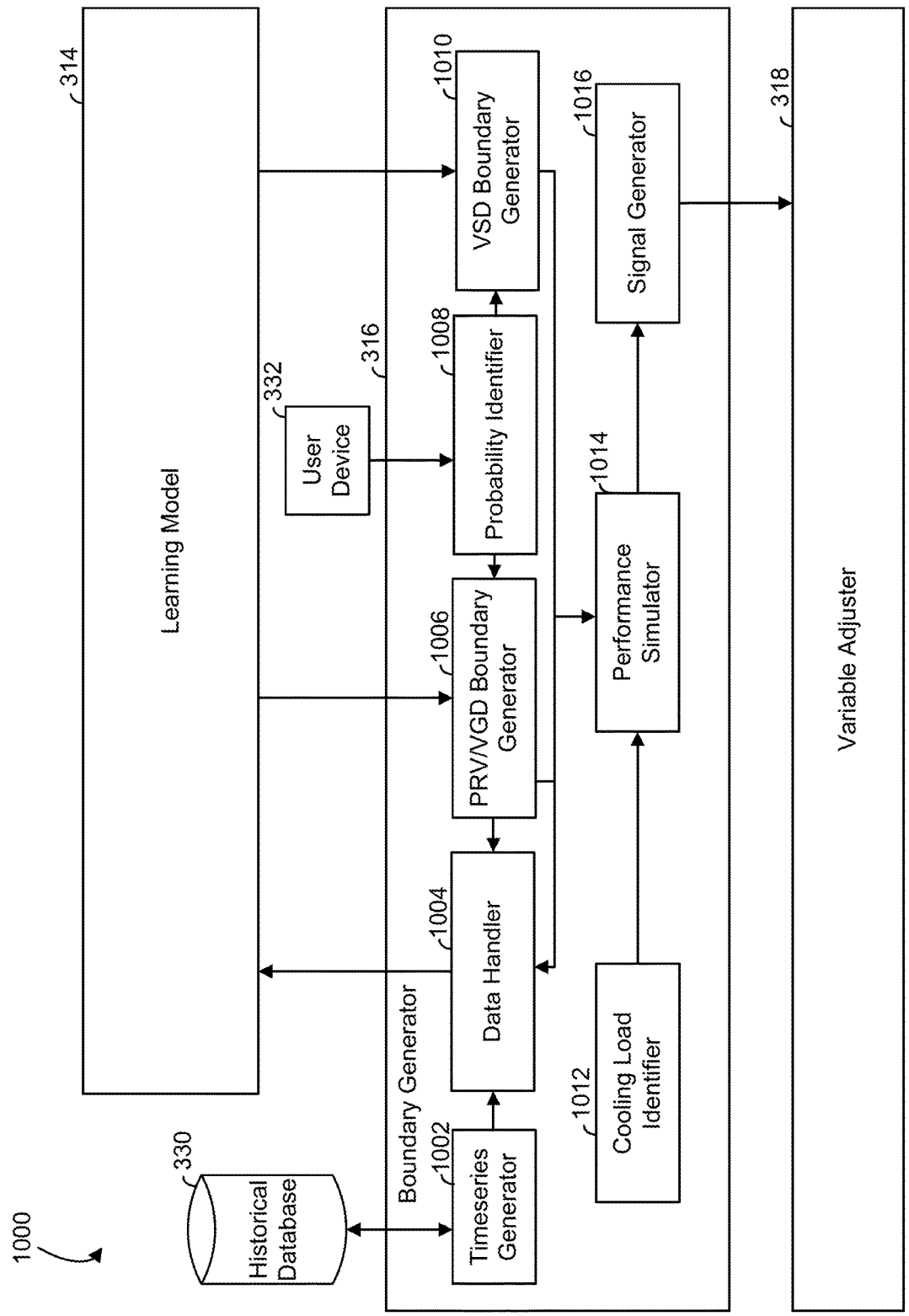
FIG. 10 is a detailed block diagram of a chiller controller environment of FIG. 3, according to some embodiments.

Referring now to FIG. 10, a detailed block diagram a chiller controller environment 1000 is shown, according to some embodiments. Chiller controller environment 1000 may include historical database 330, machine learning model 314, boundary generator 316, variable adjuster 318, and user device 332. Boundary generator 316 is shown to include a timeseries generator 1002, data handler 1004, a PRV/VGD boundary generator 1006, a probability identifier 1008, a VSD boundary generator 1010, a cooling load identifier 1012, a performance simulator 1014 and a signal generator 1016. Each of components 1004-1016 may be similar to components 402-414, shown and described with reference to FIG. 4. Chiller controller environment 1000 may include more or less components, depending on its configuration.

Timeseries generator 1002 may be configured to obtain chiller data, such as chiller data from historical database 330 and format the data into timeseries. Timeseries generator 1002 may transmit the timeseries to historical database 330 for storage and/or to data handler 1004. Timeseries can be a collection of values for a particular point (e.g., a discharge air temperature point of an air handling unit, a discharge air temperature, a supply fan status, a zone air temperature, a humidity, a pressure, etc.) or values for chiller operating data as described herein generated at different times (e.g., at periodic intervals). The values may include or be associated with identifiers of the building devices with which the points are associated (e.g., an air handler, a VAV box, a controller, a chiller, a boiler, vents, dampers, etc.). Each timeseries can include a series of values for the same point or chiller operating data and a timestamp for each of the data values. For example, a timeseries for a point provided by a temperature sensor (e.g., provided through local gateways) can include a series of temperature values measured by the temperature sensor and the corresponding times at which the temperature values were measured. Timeseries may be generated by data handler 1004. An example of a timeseries which can be generated by data handler 1004 is as follows:

[<key, timestamp$_1$, value$_1$>, <key, timestamp$_2$, value$_2$>, <key, timestamp$_3$, value$_3$>]

where key is an identifier of the source of the raw data samples (e.g., timeseries ID, sensor ID, device ID, etc.), timestamp$_i$ may identify the time at which the ith sample was collected, and value$_i$ may indicate the value of the ith sample.

Data handler 1004 may receive and use the timeseries to generate a feature vector to input into machine learning model 314. As will be described in greater detail below, machine learning model 314 may be trained to predict surge probabilities based on the timeseries data of the feature vector that it receives as an input. Machine learning model 314 may receive any feature vector that includes the timeseries and output such a surge probability to PRV/VGD boundary generator 1006 or VSD boundary generator 1010, depending on the boundary that boundary generator 316 is generating.

Advantageously, by using timeseries data and training machine learning model 314 to use to timeseries data to determine the probability of a surge based on a chiller operating data, more data may be used to make such a prediction. Timeseries can include a series of values that machine learning model 314 can use instead of just one value for each input of the chiller operating data. Because the timeseries may include more data, machine learning model 314 may have more data at its disposal to more accurately predict the surge probability.

Figure 11:
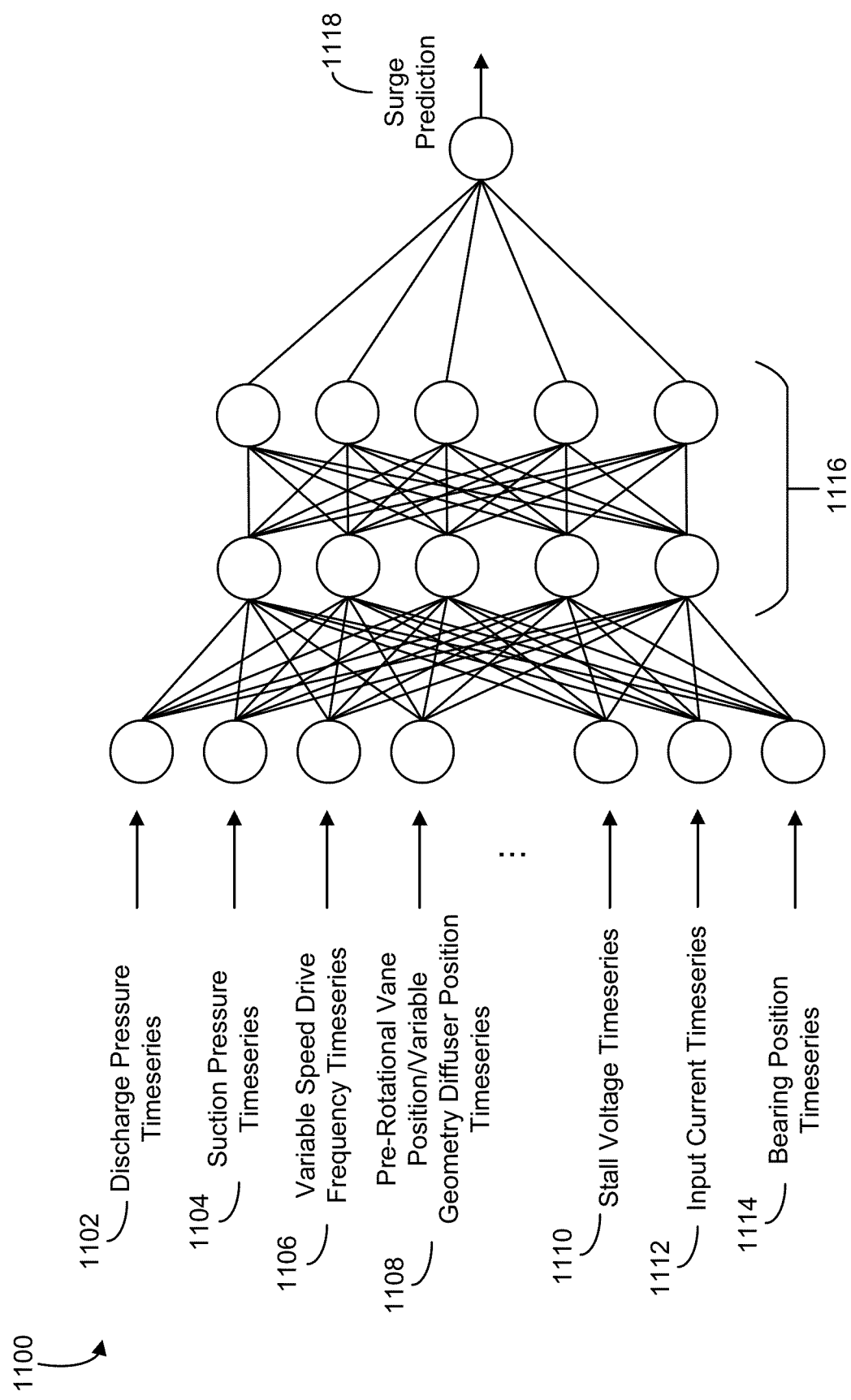
FIG. 11 is a drawing of an example neural network for generating a surge probability using timeseries data, according to some embodiments.

Referring now to FIG. 11, a drawing of an example neural network 1100 for generating a surge probability using timeseries data is shown, according to some embodiments. Neural network 1100 may be similar to neural network 500, shown and described with reference to FIG. 5, except for values of timeseries are used as inputs instead of single values for each input of the chiller operating data. For example, instead of using a current value for discharge pressure as an input into the neural network, a timeseries including multiple values before the current value and, in some cases, the current value of the discharge pressure, may be used as an input into neural network 1100. Neural network 1100 may include a discharge pressure timeseries 1102, a suction pressure timeseries 1104, a variable speed drive frequency timeseries 1106, a pre-rotational vane position/variable geometry diffuser position timeseries 1108, a stall voltage timeseries 1110, an input current timeseries 1112, and a bearing position timeseries 1114. The timeseries inputs 1102-1114 may represent multiple values for each input. Each value may be a value of the respective timeseries and be input in a separate input node. In some embodiments, the times may also be used as an input into neural network 1100. Each of components 1102-1114 may represent inputs into neural network 1100. Neural network 1100 is further shown to include hidden layer 1116 and output layer 1118. Inputs 1102-1114 may be converted into weighted signals or combinations of signals and passed to hidden layer 1116. Nodes of hidden layer 1116 may perform various operations on the weighted signals, similar to the nodes of hidden layers 516, shown and described with reference to FIG. 5. Output layer 1118 may provide a node that indicates a probability that a surge will occur based on inputs 1102-1114.

In some embodiments, the values of each timeseries of timeseries inputs 1102-1114 may be weighted according to how close in time they are to the current value. For example, if suction pressure timeseries 1104 includes 10 values, each value being one second apart up until a current value, the current suction pressure value may be associated with the highest weight of the 10 values and the weights associated with each value may decline as the values get further in time away from the current suction pressure value. A similar weighting system be implemented across all of the timeseries inputs 1102-1114. Each value may be weighted in any manner according to the training of neural network 1100.

For example, neural network 1100 may be trained similar to how neural network 500, shown and described with reference to FIG. 5, was trained. For example, labeled feature vectors including timeseries data may be fed into neural network 1100. The feature vectors may be labeled with a label indicating whether they are associated with a surge. In some embodiments, to avoid any errors in the training, any training data is associated a surge may only be associated with a chiller when it is operating at or near the surge threshold. Consequently, neural network 1100 may predict surge probabilities based on the time that the chiller may enter the surge state instead of a time the chiller is deep into the surge state.

Figure 12:
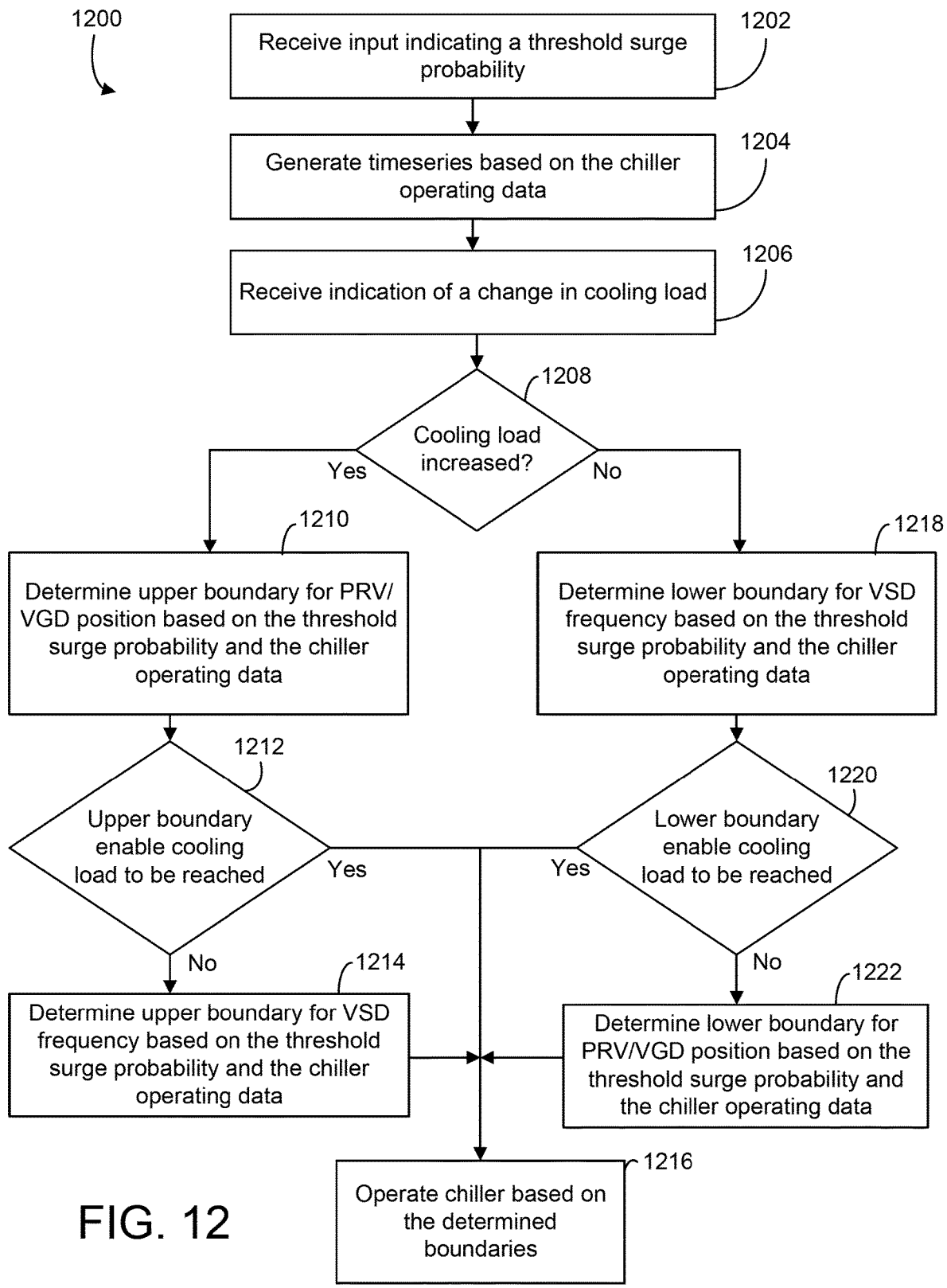
FIG. 12 is a flow diagram of an example process for generating and using boundaries for controllable chiller variables to operate a chiller, according to some embodiments.

Referring now to FIG. 12, a flow diagram of an example process 1200 for generating and using boundaries for controllable chiller variables to operate a chiller is shown, according to some embodiments. For example, process 1200 may be performed by one or more data processing systems (e.g., chiller controller 302). Process 1200 may enable a chiller (e.g., chiller 100) including a compressor (e.g., compressor 102) to operate in different conditions over time within boundaries generated based on a surge probability threshold. Process 1200 may be performed similar to process 600. Timeseries data may be generated from chiller operating data. The timeseries data may be used to generate the controllable chiller boundaries. Advantageously, by using timeseries to generate controllable chiller boundaries, any predictions that are made by the machine learning model may be more accurate as timeseries data provides more values to make such predictions. Process 600 can include any number of steps and the steps can be performed in any order.

Process 1200 is shown to include receiving an input indicating a surge probability threshold and chiller operating data (step 1202). For example, step 1202 may be performed by boundary generator 316. Step 1202 may be performed similar to how step 602, shown and described with reference to FIG. 6, is performed. Process 1200 is shown to include generating timeseries based on the chiller operating data (step 1204). Chiller data may be obtained and formatted into timeseries. The timeseries may be transmitted to a database for storage. A timeseries can be a collection of values for a particular point (e.g., a discharge air temperature point of an air handling unit, a discharge air temperature, a supply fan status, a zone air temperature, a humidity, a pressure, etc.) or values for chiller operating data as described herein generated at different times (e.g., at periodic intervals). The values may include or be associated with identifiers of the building devices with which the points are associated (e.g., an air handler, a VAV box, a controller, a chiller, a boiler, vents, dampers, etc.). Each timeseries can include a series of values for the same point or chiller operating data and a timestamp for each of the data values. For example, a timeseries for a point provided by a temperature sensor (e.g., provided through local gateways) can include a series of temperature values measured by the temperature sensor and the corresponding times at which the temperature values were measured. Timeseries may be generated. An example of a timeseries may be as follows:

[<key, timestamp$_1$, value$_1$>, <key, timestamp$_2$, value$_2$>, <key, timestamp$_3$, value$_3$>]

where key is an identifier of the source of the raw data samples (e.g., timeseries ID, sensor ID, device ID, etc.), timestamp$_i$ may identify the time at which the ith sample was collected, and value$_i$ may indicate the value of the ith sample.

The timeseries may be used to generate a feature vector to input into a machine learning model. The machine learning model may be trained to predict surge probabilities based on timeseries data of feature vectors that it receives as an input. The machine learning model may receive any feature vector that includes timeseries and output a surge probability. The surge probability may be used to generate an upper and/or lower PRV/VGD position boundary and/or an upper and/or lower VSD frequency boundary.

Process 1200 is shown to include receiving an indication of a change in cooling load (step 1206). Process 1200 is shown to include determining if the required cooling load increased (step 1208). Process 1200 is shown to include determining an upper boundary for PRV/VGD positon based on a surge probability threshold and the chiller operating data (step 1210). Process 1200 is shown to include determining if an upper boundary enables the cooling new cooling load to be reached (step 1212). Process 1200 is shown to include determining an upper boundary VSD frequency based on the surge probability threshold (step 1214). Process 1200 is shown to include determining a lower boundary for VSD frequency based on the surge probability threshold and the chiller operating data (step 1218). Process 1200 is shown to include determining if the lower boundary enables the new cooling load to be reached (step 1220). Process 1222 is shown to include determining if the lower boundary for the PRV/VGD position based on the surge probability threshold (step 1222). Each of step 1206-1214 and 1218-1222 may be performed by, for example, by boundary generator 316. Process 1200 is shown to include operating chiller based on the determined boundaries (step 1216). For example, step 1216 may be performed by variable adjuster 318. Steps 1202 and 1206-1216 may be performed similar to steps 602-614, shown and described with reference to FIG. 6, respectively.

Figure 13:
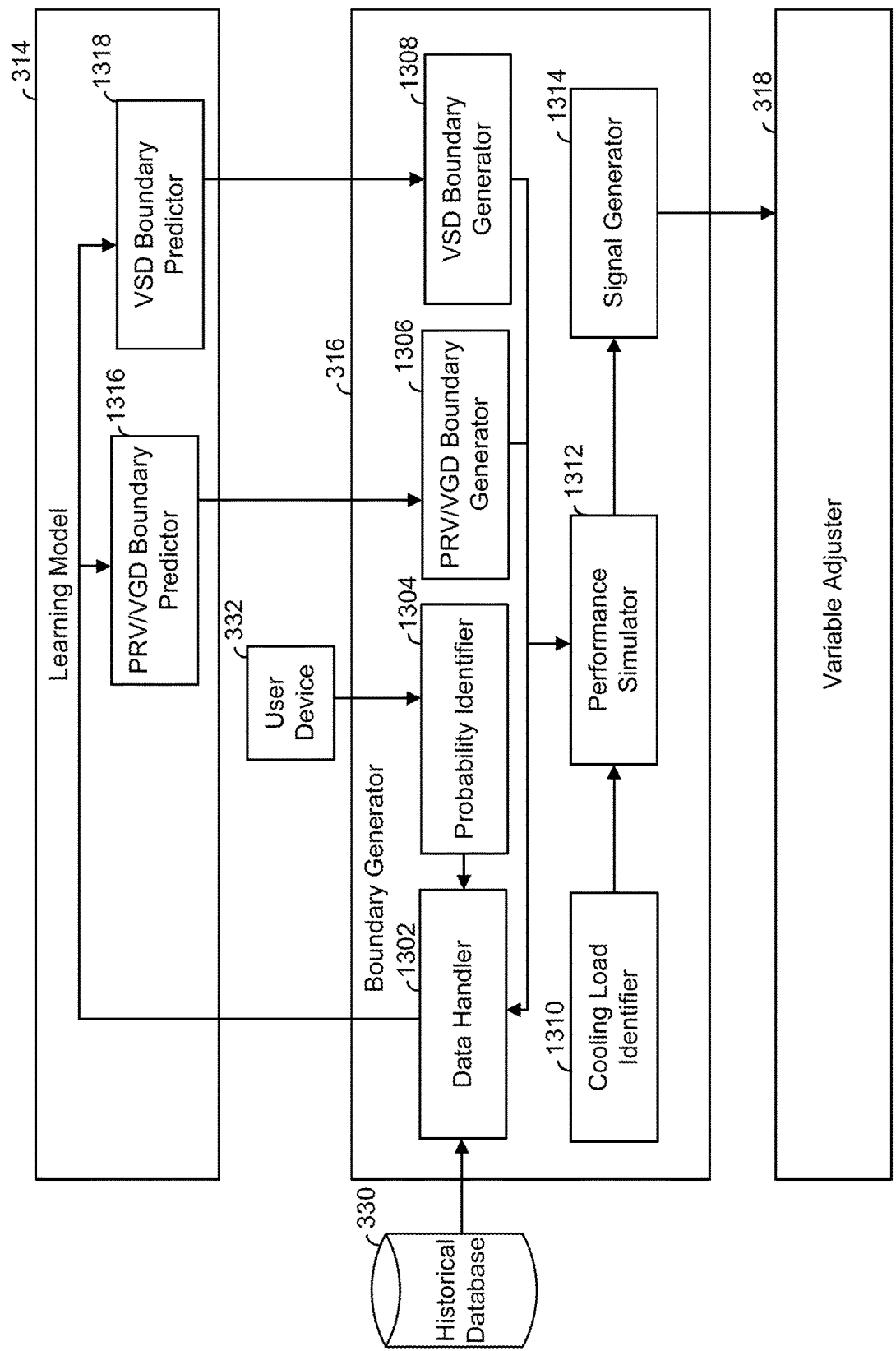
FIG. 13 is a detailed block diagram of a chiller controller environment of FIG. 3, according to some embodiments.

Referring now to FIG. 13, a detailed block diagram of a chiller controller environment 1300 is shown, according to some embodiments. Chiller controller environment 1300 may include historical database 330, machine learning model 314, boundary generator 316, variable adjuster 318, and user device 332. Boundary generator 316 is shown to include a data handler 1302, a probability identifier 1304, a PRV/VGD boundary generator 1306, a VSD boundary generator 1308, a cooling load identifier 1310, a performance simulator 1312, and a signal generator 1314. Cooling load identifier 1310, performance simulator 1312, and signal generator 1314 may be similar to, respectively, cooling load identifier 410, performance simulator 412, and signal generator 414, shown and described with reference to FIG. 4. Chiller controller environment 1300 may include more or less components, depending on its configuration.

Data handler 1302 may be configured to format and generate feature vectors to input into machine learning model 314. Data handler 1302 may format and generate the feature vectors to input into machine learning model 314 using chiller operating data from historical database and/or live chiller operating data as described herein. Data handler 1302 may format the feature vectors using numerical identifiers for each value. In some embodiments, the numerical identifiers may be normalized to values between −1 and 1. In addition to using chiller operating data to generate the feature vectors, data handler 1302 may use a surge probability threshold that an administrator input into user device 332 in the feature vector or otherwise obtained. The surge probability threshold may be between 0% and 100%. Probability identifier 1304 may identify the surge probability threshold and transmit it to data handler 1302. Data handler 1302 may receive the surge probability threshold and use it, with the chiller operating data, to generate a feature vector to input into machine learning model 314 for processing.

Machine learning model 314 may include PRV/VGD boundary predictor 1316 and VSD boundary predictor 1318. PRV/VGD boundary predictor 1316 and VSD boundary predictor 1318 may be or include machine learning models such as a neural network, a support vector machine, random forest, etc. PRV/VGD boundary predictor 1316 may be a machine learning model that is configured to predict a PRV/VGD boundary that may enable chiller 100 (not shown) to operate with a surge probability that does not exceed the surge probability threshold. PRV/VGD boundary predictor 1316 may be trained with training data that is generated from surge data (e.g., chiller operating data associated with a chiller when the chiller experienced a surge). In some embodiments, PRV/VGD boundary predictor 1316 may be trained to use the chiller operating data described herein to make predictions except for control signals including a PRV/VGD signal. In some embodiments, the training data may be associated with chiller operating data when the chiller just crossed the surge threshold (e.g., just entered the surge state). Once PRV/VGD boundary predictor 1316 is trained, PRV/VGD boundary predictor 1316 may predict PRV/VGD boundaries that enable chiller 100 operate within a surge probability threshold. For example, PRV/VGD boundary predictor 1316 may receive chiller operating data and a surge probability of 75% as an input in a feature vector. PRV/VGD boundary predictor 1316 may predict a PRV/VGD boundary of 60% of open based on the inputs. PRV/VGD boundary predictor 1316 may transmit the PRV/VGD boundary to PRV/VGD boundary generator 1306 for further processing.

Furthermore, in some embodiments, PRV/VGD boundary predictor 1316 may include two machine learning models. One machine learning model may predict an upper boundary and another machine learning model may predict a lower boundary for the PRV/VGD position. Each machine learning model may be trained with similar data except with labels that are specific to its respective boundary. The machine learning model may receive the same inputs (e.g., the same chiller operating data and surge probability) and output the upper and lower boundaries, respectively, for the PRV/VGD position. For example, each of the machine learning models may receive an input including chiller operating data and a surge probability. The machine learning models may output PRV/VGD positions of 25% of open and 60% of open as the boundaries of operation for chiller 100 to operate without having a probability of a surge that is too high. Finally, in some embodiments, PRV/VGD boundary predictor 1316 may include different machine learning models that are trained to predict PRV boundaries and VGD boundaries separately. Such machine learning models may include machine learning models that predict upper and lower boundaries for each variable or just one boundary. Such machine learning models may be trained as described above for the machine learning models that predict the PRV/VGD position boundary together.

PRV/VGD boundary predictor 1316 may transmit predicted boundaries to PRV/VGD boundary generator 1306. PRV/VGD boundary generator 1306 may generate the predicted boundaries and transmit the generated boundaries to performance simulator 1312 to determine if the generated boundaries would enable chiller 100 to provide enough cooling capacity to handle a new cooling load. If performance simulator 1312 determines that the boundary or boundaries would not enable chiller 100 to provide enough cooling capacity, data handler 1302 may generate a feature vector including similar chiller operating data and the same surge probability threshold and apply the feature vector to VSD boundary predictor 1318 to generate a VSD boundary or boundaries for variable adjuster 318 to use to control chiller 100 in addition to the generated PRV/VGD boundary. If a corresponding VSD frequency boundary has already been generated and determined to not enable chiller 100 to provide enough cooling capacity however, a message may be transmitted to user device 332 indicating chiller 100 could not provide enough cooling capacity with the surge probability threshold.

Similarly, VSD boundary predictor 1318 may be a machine learning model that is trained to predict a VSD frequency boundary based on a surge probability threshold and chiller operating data. VSD boundary predictor 1318 may be trained using a similar training method to PRV/VGD boundary predictor 1316 with chiller operating data that occurred at or near the surge threshold, in some cases. VSD boundary predictor 1318 may be trained to predict the VSD boundary based on the same or similar chiller data as PRV/VGD boundary predictor 1316 except VSD boundary predictor 1318 may use PRV/VGD control signal data as an input while excluding inputs related to VSD frequency. Consequently, any predictions that VSD boundary predictor 1318 makes may not be impacted by VSD control signals (which may not have any relevance to a predicted VSD frequency boundary). For example, VSD boundary predictor 1318 may receive an input including chiller operating data excluding a VSD frequency along with a surge probability threshold. VSD boundary predictor 1318 may output a VSD frequency that is predicted to be a boundary for variable adjuster 318 to avoid crossing when controlling chiller 100. In some embodiments, VSD boundary predictor 1318 includes a machine learning model for an upper VSD frequency boundary and a machine learning model for a lower VSD frequency boundary. For example, each of the machine learning models may receive an input including chiller operating data and a surge probability. The machine learning models may output frequencies of 45 Hz and 55 Hz as the boundaries of operation for chiller 100 to operate without having a probability of a surge that is too high. Each of these machine learning models may be trained using similar training data except with labels that are associated with its respective boundary.

VSD boundary predictor 1318 may transmit predicted boundaries to VSD boundary generator 1308. VSD boundary generator 1308 may generate the predicted boundaries and transmit the generated boundaries to performance simulator 1312 to determine if the generated boundaries would enable chiller 100 to provide enough cooling capacity to handle a new cooling load. If performance simulator 1312 determines that the boundaries would not enable chiller 100 to provide enough cooling capacity, data handler 1302 may generate a feature vector including similar chiller operating data and the same surge probability threshold and apply the feature vector to PRV/VGD boundary predictor 1316 to generate a PRV/VGD boundaries for variable adjuster 318 to use to control chiller 100 in addition to the generated VSD boundary. If a corresponding PRV/VGD position boundary has already been generated and determined to not enable chiller 100 to provide enough cooling capacity however, a message may be transmitted to user device 332 indicating chiller 100 could not provide enough cooling capacity with the surge probability threshold.

Advantageously, by predicting the boundaries using chiller operating data and surge probabilities, the controllable chiller boundaries of operation for chiller 100 may be predicted accurately. Instead of using an iterative process, the machine learning models can automatically predict such boundaries, which can speed up processing and enable variable adjuster 318 to adjust control of chiller 100 in real-time more quickly.

Figure 14:
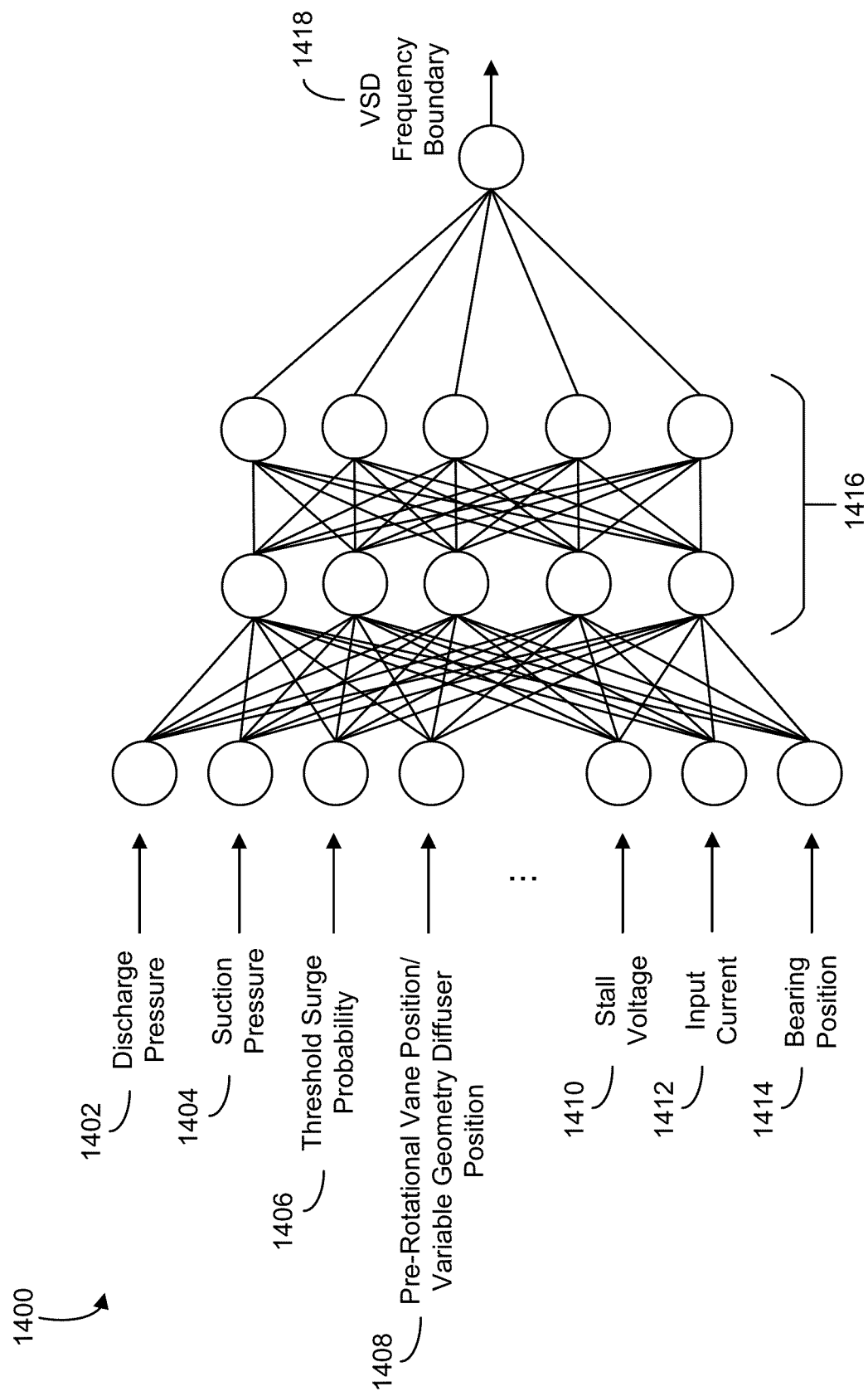
FIG. 14 is a drawing of an example neural network for generating a VSD frequency boundary, according to some embodiments.

Referring now to FIG. 14, a drawing of an example neural network 1400 for predicting a VSD frequency boundary is shown, according to some embodiments. Neural network 1400 may be similar to neural network 500, shown and described with reference to FIG. 5, except neural network 1400 uses a surge probability threshold to predict a value for a VSD frequency boundary. In some embodiments, each possible value for the VSD frequency boundary may be treated as a different class in a multi-class classification system. Neural network 1400 may be representative of other machine learning models that may receive the same or similar inputs to predict a VSD frequency boundary. Neural network 1400 may include input nodes for a discharge pressure 1402, a suction pressure 1404, a probability that a surge will occur 1406, a pre-rotational vane position/variable geometry diffuser position 1408, a stall voltage 1410, an input current 1412, and a bearing position 1414. Components 1402, 1404, 1408, 1410, 1412, and 1414 may be similar to respective components 502, 504, 508, 510, 512, and 514, shown and described with reference to FIG. 5. Each of components 1402-1414 may represent inputs into neural network 1400. Neural network 1400 is further shown to include hidden layer 1416 and output layer 1418. Inputs 1402-1414 may be converted into weighted signals or combinations of signals and passed to hidden layer 1416. Nodes of hidden layer 1416 may perform various operations on the weighted signals, similar to the nodes of hidden layers 516, shown and described with reference to FIG. 5. The nodes of hidden layer 1416 may transmit further weighted signals to output layer 1418. Output layer 1418 may include one or more nodes and/or layers that indicate a frequency boundary to implement based on inputs 1402-1414.

In some embodiments, weights of the weighted signals may be generated or determined based on training data that is provided to neural network 1400. Neural network 1400 may be trained using supervised, semi-supervised, or unsupervised methods similar to the training described above with reference to FIG. 5. For example, neural network 1400 may be trained using labeled training data that includes values for each of inputs 1402-1414. For instance, a training dataset including values for each of inputs 1402-1414 may be input to neural network 1400. The training dataset may be labeled with a correct value of 60 Hz. Neural network 1400 may output a VSD frequency boundary of 55 Hz based on the training dataset. The correct value may be fed back into neural network 1400 to adjust its internal weights and/or parameters so to make a more accurate prediction for similar datasets in the future. An accuracy percentage may be determined based on how close neural network 1400 is to predicting the labeled values over multiple training datasets. For instance, in some embodiments, the closer neural network 1400 is to predicting the correct frequency, the higher the accuracy percentage. Training datasets may be input into neural network 1400 for training until neural network 1400 is accurate to a threshold. In some embodiments, training datasets may be input until neural network 1400 is accurate to the threshold for a preset number of training datasets.

Figure 15:
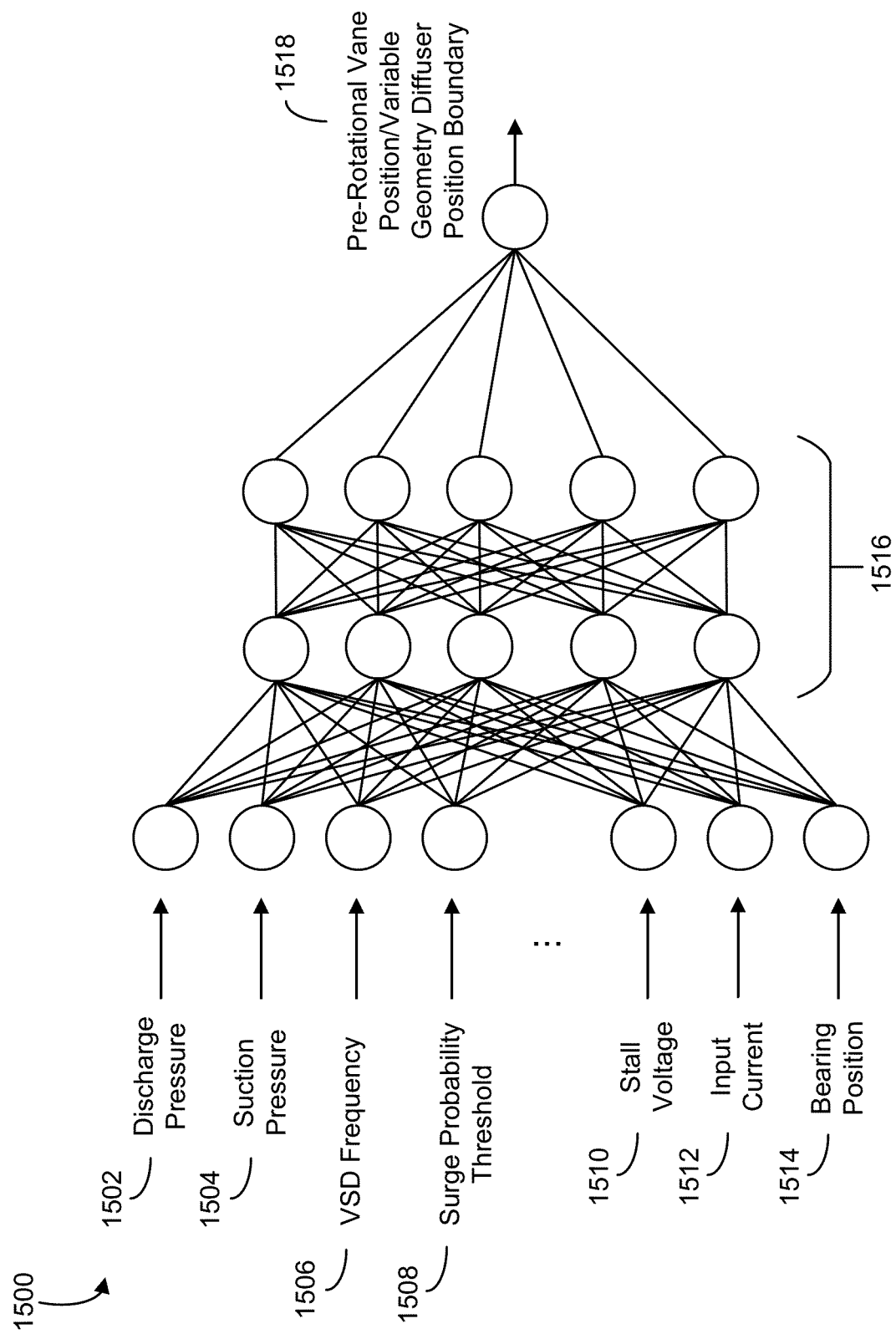
FIG. 15 is a drawing of an example neural network for generating a PRV/VGD position boundary, according to some embodiments.

Referring now to FIG. 15, is a drawing of an example neural network 1500 for generating a PRV/VGD position boundary is shown, according to some embodiments. Neural network 1500 may be similar to neural network 1400, shown and described with reference to FIG. 14, except neural network 1500 uses a VSD frequency input 1506 as an input instead of a PRV/VGD position input to predict a value for a PRV/VGD boundary. In some embodiments, each possible value for the PRV/VGD position boundary output may be treated as a different class in a multi-class classification system. Neural network 1500 may be representative of other machine learning models that may receive the same or similar inputs to predict a VSD frequency boundary. Neural network 1500 may include input nodes for a discharge pressure 1502, a suction pressure 1504, VSD frequency 1506, a probability that a surge will occur 1508, a stall voltage 1510, an input current 1512, and a bearing position 1514. Components 1502, 1504, 1506, 1510, 1512, and 1514 may be similar to respective components 1402, 1404, 1408, 1410, 1412, and 1414, shown and described with reference to FIG. 14. Each of components 1502-1514 may represent inputs into neural network 1500. Neural network 1500 is further shown to include hidden layer 1516 and output layer 1518. Inputs 1502-1514 may be converted into weighted signals or combinations of signals and passed to hidden layer 1516. Nodes of hidden layer 1516 may perform various operations on the weighted signals, similar to the nodes of hidden layer 1416, shown and described with reference to FIG. 14. The nodes of hidden layer 1516 may transmit further weighted signals to output layer 1518. Output layer 1518 may include one or more nodes and/or layers that indicate a frequency boundary to implement based on inputs 1402-1414.

In some embodiments, weights of the weighted signals may be generated or determined based on training data that is provided to neural network 1500. Neural network 1500 may be trained using supervised, semi-supervised, or unsupervised methods similar to the training described above with reference to FIG. 5. For example, neural network 1500 may be trained using labeled training data that includes values for each of inputs 1502-1514. For instance, a training dataset including values for each of inputs 1502-1514 may be input to neural network 1500. The training dataset may be labeled with a correct value of 50% of open. Neural network 1500 may output a PRV/VGD position boundary of 45% based on the training dataset. The correct value of 50% may be fed back into neural network 1500 to adjust its internal weights and/or parameters to make a more accurate prediction for similar datasets in the future. An accuracy percentage may be determined based on how close neural network 1500 is to predicting the labeled values over multiple training datasets. For instance, in some embodiments, the closer neural network 1500 is to predicting the correct PRV/VGD position for a training dataset, the higher the accuracy percentage. Training datasets may be input into neural network 1500 for training until neural network 1500 is accurate to a threshold. In some embodiments, training datasets may be input until neural network 1500 is accurate to the threshold for a preset number of training datasets.

Figure 16:
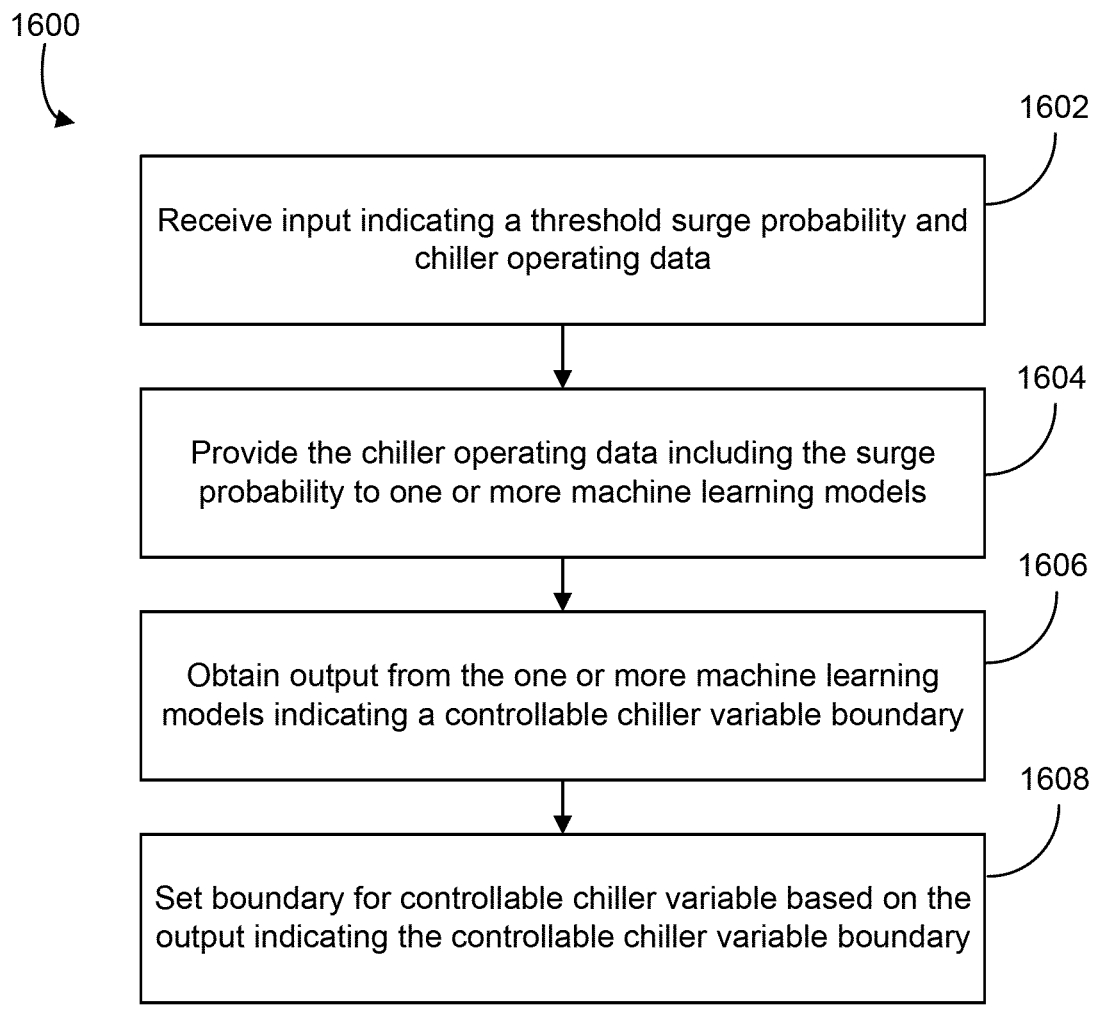
FIG. 16 is a flow diagram of an example process for generating and setting boundaries for a controllable chiller variable, according to some embodiments.

Referring now to FIG. 16, a flow diagram of an example process 1600 for generating and setting boundaries for a controllable chiller variable is shown, according to some embodiments. For example, process 1600 may be performed by one or more data processing systems (e.g., chiller controller 302). Process 1600 may be an example process detailing how a boundary for a controllable chiller variable may be generated in any of steps 608, 612, 616, 620, 708, 716, 1210, 1214, 1218, and/or 1222 of FIG. 6, 7, or 12. Advantageously, process 1600 may be performed to automatically generate a boundary for a controllable chiller variable based on a surge probability threshold. Consequently, surges may be avoided in a chiller while the chiller may operate close to the surge state, improving the chiller's efficiency. The boundaries may be determined with one input to the machine learning models instead of using an iterative process that may require multiple inputs to be used. Process 1600 can include any number of steps and the steps can be performed in any order.

Process 1600 is shown to include receiving an input indicating a surge probability threshold and chiller operating data (step 1602). For example, step 1602 may be performed by boundary generator 316. Step 1602 may be performed similar to how step 602, 702, or 802 are performed. For example, an input may be received at a user interface indicating a surge probability threshold. The input probability may be any value between 0% and 100%. The input may be received at a user device and transmitted to the one or more data processing systems. The chiller operating data may be received or obtained from a database or from sensors of the chiller. The database may be a cloud database or a database that is local to the one or more processors. The chiller operating data may include values for refrigerant type, discharge pressure, suction pressure, stall voltage, input current, bearing position, current variable speed drive frequency, current pre-rotational vane position, or current variable geometry diffuser position. The chiller operating data may be current chiller operating data (e.g., values associated with how the chiller is currently operating).

Process 1600 is shown to include providing the chiller operating data including the surge probability to one or more machine learning models (step 1604). For example, step 1604 may be performed by boundary generator 316. The chiller operating data and the surge probability may be formatted into a feature vector. The feature vector may include numerical values for the chiller operating data and the surge probability. For any chiller operating data that is associated with a word, a corresponding value for the word may be obtained from a database. For example, different types of coolant may each be associated with a particular value. In some embodiments, the values may be normalized into values between −1 and 1 when they are used in the feature vector. Once the feature vector is generated, the feature vector may be applied to the one or more machine learning models.

The one or more machine learning models may include a PRV/VGD boundary prediction model and/or a VSD boundary prediction model. The PRV/VGD boundary prediction model and the VSD boundary prediction model may be or may include machine learning models such as a neural network, a support vector machine, random forest, etc. The PRV/VGD boundary prediction model may be a machine learning model that is configured to predict a PRV/VGD boundary that may enable the chiller to operate with a surge probability that does not exceed the surge probability threshold. The PRV/VGD boundary prediction model may be trained with training data that is generated from surge data (e.g., chiller operating data associated with a chiller when the chiller experienced a surge). In some embodiments, the PRV/VGD boundary prediction model may be trained to use the chiller operating data described herein to make predictions except for control signals including a PRV/VGD signal. In some embodiments, the training data may be associated with chiller operating data when the chiller just crossed the surge threshold (e.g., just entered the surge state). Once the PRV/VGD boundary prediction model is trained, the PRV/VGD boundary prediction model may predict PRV/VGD boundaries that cause the chiller to operate with a surge probability that is lower than a threshold. For example, the PRV/VGD boundary prediction model may receive chiller operating data and a surge probability of 75% as an input in a feature vector. The PRV/VGD boundary prediction model may predict a PRV/VGD boundary of 60% of open based on the inputs.

Furthermore, in some embodiments, the PRV/VGD boundary prediction model may include two machine learning models. One machine learning model may predict an upper boundary and a machine learning model may predict a lower boundary for the PRV/VGD position. Each machine learning model may be trained with similar data except with labels that are specific to its respective boundary. The machine learning models may receive the same inputs (e.g., the same chiller operating data and surge probability) and output the upper and lower boundaries, respectively, for the PRV/VGD position. For example, each of the machine learning models may receive an input including chiller operating data and a surge probability. The machine learning models may output PRV/VGD positions of 25% of open and 60% of open as the boundaries of operation for the chiller to operate without having a surge probability that is too high. Finally, in some embodiments, the PRV/VGD boundary prediction model may include different machine learning models that are trained to predict PRV boundaries and VGD boundaries separately. Such machine learning models may include machine learning models that predict upper and lower boundaries for each variable or just one boundary. Such machine learning models may be trained as described above for the machine learning models that predict the PRV/VGD position boundary together.

Predicted boundaries for the PRV/VGD position may be generated. It may be determined if the generated boundaries would enable the chiller to provide enough cooling capacity to handle a new cooling load. If it is determined that the predicted boundaries would not enable the chiller to provide enough cooling capacity, a new feature vector may be generated that includes similar chiller operating data and the same surge probability threshold. The new feature vector may not include a value for a VSD frequency, however, and may instead include a value for a PRV/VGD position. The feature vector may be applied to the VSD boundary prediction model to generate a VSD boundary. The VSD boundary may be used to control the chiller in conjunction with the generated PRV/VGD boundary.

The VSD prediction model may be a machine learning model that is trained to predict a VSD frequency boundary based on a surge probability threshold and chiller operating data. The VSD prediction model may be trained using a similar training method to the PRV/VGD prediction model with chiller operating data that occurred at or near the surge threshold, in some cases. The VSD prediction model may be trained to predict the VSD boundary based on the same or similar chiller data as the PRV/VGD prediction model except the VSD prediction model may use PRV/VGD control signal data as an input while excluding inputs related to VSD frequency. Consequently, any predictions that the VSD prediction model makes may not be impacted by VSD control signals (which may not have any relevance to a predicted VSD frequency boundary). For example, the VSD prediction model may receive an input including chiller operating data excluding a VSD frequency along with a surge probability threshold. The VSD prediction model may output a VSD frequency that is predicted to be a boundary avoid crossing when the chiller is being controlled. In some embodiments, The VSD prediction model includes a machine learning model for an upper VSD frequency boundary and a machine learning model for a lower VSD frequency boundary. For example, each of the machine learning models may receive an input including chiller operating data and a surge probability. The machine learning models may output frequencies of 45 Hz and 55 Hz as the boundaries of operation for the chiller to operate without having a probability of a surge that is too high. Each of these machine learning models may be trained using similar training data except with labels that are associated with its respective boundary.

The predicted boundaries may be generated. It may be determined if the generated boundaries would enable the chiller to provide enough cooling capacity to handle a new cooling load. If it is determined that the boundaries would not enable the chiller to provide enough cooling capacity, a feature vector including similar chiller operating data and the same surge probability threshold may be generated and applied to the PRV/VGD boundary prediction model. PRV/VGD boundaries may be generated to control the chiller in addition, in some cases, to the generated VSD boundary. If it has already been determined, however, that there is not a PRV/VGD boundary that enables the chiller to satisfy the cooling load. A message may be transmitted to a user device indicating that the chiller could not provide the requisite cooling load based on the surge probability threshold.

Process 1600 is shown to include obtaining an output from the one or more machine learning models indicating a controllable chiller variable boundary (step 1606). For example, step 1606 may be performed boundary generator 316. An output including a value for the controllable chiller variable may be received. A boundary may be generated based on the value for the controllable chiller variable.

Process 1600 is shown to include setting a boundary for the controllable chiller variable based on the output indicating the controllable chiller variable threshold (step 1608). For example, step 1608 may be performed by boundary generator 316. The boundary may be an upper boundary and/or a lower boundary for any controllable chiller variable. For example, the boundary may be an upper boundary and/or a lower boundary for a VSD frequency or a PRV/VGD position control signal. The boundary may be used to operate the chiller. As described above, the boundary may only be used if it is determined that the boundary enables the chiller to provide enough cooling capacity to satisfy a new cooling capacity.

Figure 17:
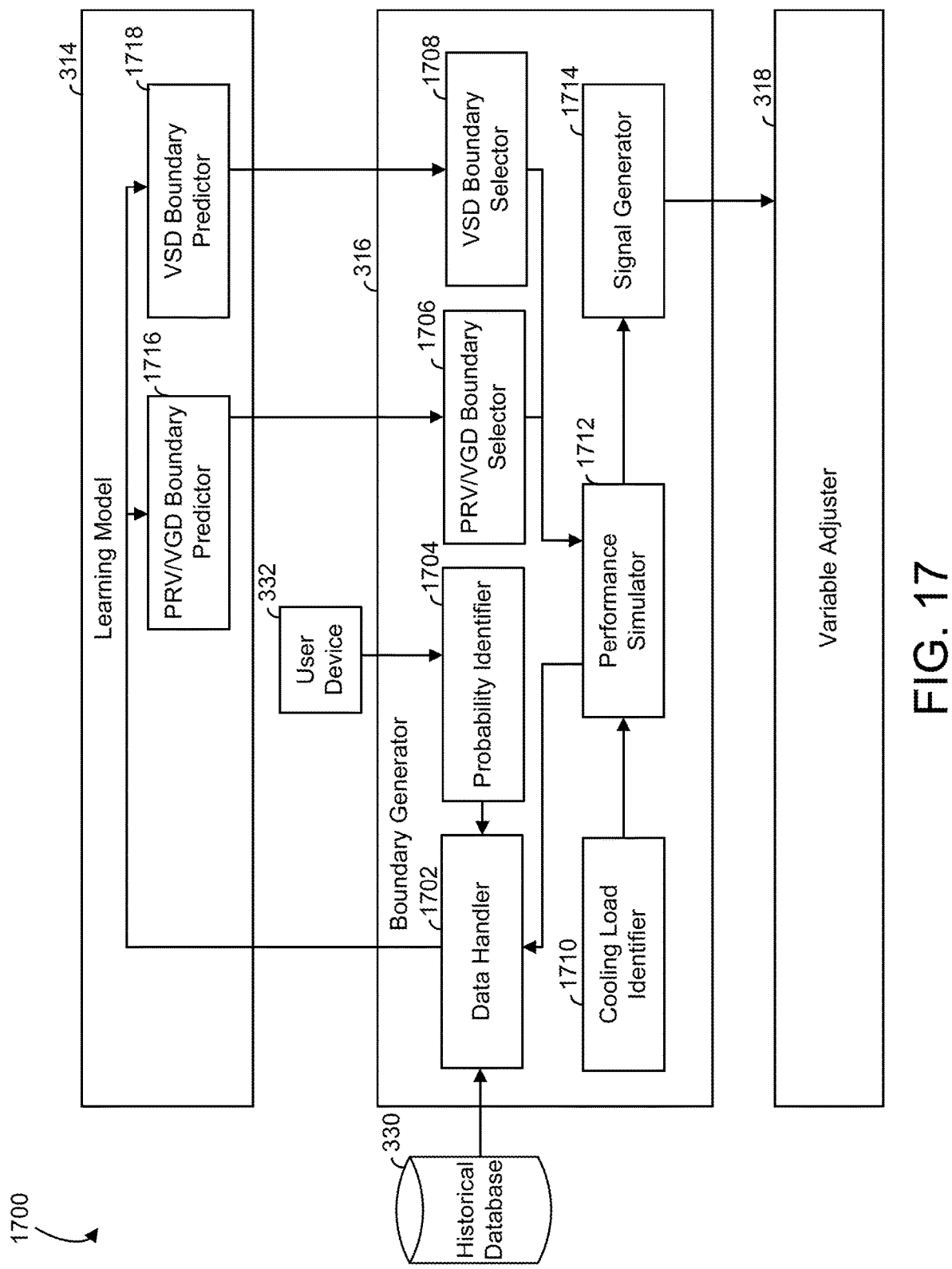
FIG. 17 is a detailed block diagram of a chiller controller environment of FIG. 3, according to some embodiments.

Referring now to FIG. 17, a detailed block diagram of a chiller controller environment of FIG. 3 is shown, according to some embodiments. Chiller controller environment 1700 may include historical database 330, machine learning model 314, boundary generator 316, variable adjuster 318, and user device 332. Boundary generator 316 is shown to include a data handler 1702, a probability identifier 1704, a PRV/VGD boundary selector 1706, a VSD boundary selector 1708, a cooling load identifier 1710, a performance simulator 1712, and a signal generator 1714. Data handler 1702, probability identifier 1704, cooling load identifier 1710, performance simulator 1712, and signal generator 1714 may be similar to, respectively, data handler 1302, probability identifier 1304, cooling load identifier 1310, performance simulator 1312, and signal generator 1314, shown and described with reference to FIG. 13. Chiller controller environment 1700 may include more or less components, depending on its configuration.

Machine learning model 314 may include PRV/VGD boundary predictor 1716 and VSD boundary predictor 1718. PRV/VGD boundary predictor 1716 and VSD boundary predictor 1718 may be or include machine learning models such as a neural network, a support vector machine, random forest, etc. PRV/VGD boundary predictor 1716 may be a machine learning model that is configured to predict probabilities for multiple PRV/VGD boundary values. The probabilities may be confidence scores indicating the likelihood that the boundary value is the correct value to generate so chiller 100 may operate with a surge probability threshold. Each node of an output layer of PRV/VGD boundary predictor 1716 may be associated with a position value. The position values may range from 0% to 100%. PRV/VGD boundary predictor 1716 may include any number of values. PRV/VGD boundary predictor 1716 may predict such probabilities based on an input feature vector that includes chiller operating data except for, in some cases, a PRV/VGD position value. The feature vector may also include a surge probability threshold. PRV/VGD boundary predictor 1716 may receive feature vectors including such data and output probabilities for any number of PRV/VGD positions.

PRV/VGD boundary predictor 1716 may be trained with training data that is generated from surge data (e.g., chiller operating data associated with a chiller when the chiller experienced a surge). In some embodiments, the training data may be associated with chiller operating data when the chiller just crossed the surge threshold (e.g., just entered the surge state). Once PRV/VGD boundary predictor 1716 is trained, PRV/VGD boundary predictor 1716 may predict probabilities for PRV/VGD position boundaries based on a surge probability threshold. For example, PRV/VGD boundary predictor 1716 may receive chiller operating data and a surge probability of 75% as an input in a feature vector. PRV/VGD boundary predictor 1716 may predict a probability of 60% for a PRV/VGD position of 25% open, a probability of 26% for a PRV/VGD position of 50% open, and a probability of 24 for a PRV/VGD position of 24% open on the inputs. PRV/VGD boundary predictor 1716 may predict any probabilities for any number of PRV/VGD positions. PRV/VGD boundary predictor 1716 may transmit the probabilities to PRV/VGD boundary selector 1706 for further processing.

Furthermore, in some embodiments, PRV/VGD boundary predictor 1716 may include two machine learning models. One machine learning model may predict probabilities for values of an upper boundary and another machine learning model may predict probabilities for values of a lower boundary for the PRV/VGD position. Each machine learning model may be trained with similar data except with labels that are specific to its respective boundary. The machine learning model may receive the same inputs (e.g., the same chiller operating data and surge probability) and output the probabilities for the upper and lower boundaries, respectively, for the PRV/VGD position.

In some embodiments, PRV/VGD boundary predictor 1716 may include different machine learning models that are trained to predict probabilities for PRV boundaries and VGD boundaries separately. Such machine learning models may include machine learning models that predict probabilities for upper and lower boundaries for each of the PRV or VGD or just one of the variables. Such machine learning models may be trained as described above for the machine learning models that predict the PRV/VGD position boundary together.

PRV/VGD boundary predictor 1716 may transmit the probabilities for the boundaries to PRV/VGD boundary selector 1706. PRV/VGD boundary selector 1706 may select the boundary that is associated with the highest probability and generate a boundary based on the selected boundary. In some embodiments, PRV/VGD boundary selector 1706 only selects the boundary that is associated with the highest probability if the boundary is associated with a probability that exceeds a threshold. PRV/VGD boundary selector 1706 may transmit the generated boundary to performance simulator 1712 to determine if the generated boundary would enable chiller 100 to provide enough cooling capacity to handle a new cooling load. If performance simulator 1712 determines that the boundaries would not enable chiller 100 to provide enough cooling capacity to handle the new cooling load, data handler 1702 may generate a feature vector including similar chiller operating data and the same surge probability threshold and apply the feature vector to VSD boundary predictor 1718 to generate a VSD boundary or boundaries for variable adjuster 318 to use to control chiller 100 in addition to the generated PRV/VGD boundary. If a corresponding VSD frequency boundary has already been generated and determined to not enable chiller 100 to provide enough cooling capacity however, a message may be transmitted to user device 332 indicating chiller 100 could not provide enough cooling capacity with the surge probability threshold.

VSD boundary predictor 1718 may be a machine learning model that is trained to predict probabilities for values of a VSD frequency boundary based on a surge probability threshold and chiller operating data. VSD boundary predictor 1718 may be trained using a similar training method to PRV/VGD boundary predictor 1716 with chiller operating data that occurred at or near the surge threshold, in some cases. VSD boundary predictor 1718 may be trained to predict the VSD boundary based on the same or similar chiller data as PRV/VGD boundary predictor 1716 except VSD boundary predictor 1718 may use PRV/VGD control signal data as an input while excluding inputs related to VSD frequency. Consequently, any predictions that VSD boundary predictor 1718 makes may not be impacted by VSD control signals (which may not have any relevance to a predicted VSD frequency boundary). For example, VSD boundary predictor 1718 may receive an input including chiller operating data excluding a VSD frequency along with a surge probability threshold. VSD boundary predictor 1718 may output a probability of 70% for a frequency of 48 Hz, a probability of 10% for a frequency of 52 HZ, and a probability of 20% for a frequency of 55 Hz. VSD boundary predictor 1718 may output any probabilities for any number of VSD frequencies. VSD boundary predictor 1718 may output the VSD frequencies to VSD boundary selector 1708 for further processing. In some embodiments, VSD boundary predictor 1718 includes a machine learning model for an upper VSD frequency boundary and a machine learning model for a lower VSD frequency boundary. Each machine learning model may similarly output frequencies for its respective VSD frequency boundary. Each of these machine learning models may be trained using similar training data except with labels that are associated with its respective boundary.

VSD boundary predictor 1718 may transmit predicted probabilities for VSD frequency values to VSD boundary selector 1708. VSD boundary selector 1708 may select the frequency value that is associated with the highest probability and generate a boundary at the selected frequency. In some embodiments, VSD boundary selector 1708 may only generate VSD frequency boundary if the probability associated with it exceeds a threshold. VSD boundary selector may transmit generated boundaries to performance simulator 1712 to determine if the generated boundaries would enable chiller 100 to provide enough cooling capacity to handle a new cooling load. If performance simulator 1712 determines that the boundaries would not enable chiller 100 to provide enough cooling capacity, data handler 1702 may generate a feature vector including similar chiller operating data and the same surge probability threshold and apply the feature vector to PRV/VGD boundary predictor 1716 to generate PRV/VGD boundaries for variable adjuster 318 to use to control chiller 100 in addition to the generated VSD boundary. If a corresponding PRV/VGD position boundary has already been generated and determined to not enable chiller 100 to provide enough cooling capacity however, a message may be transmitted to user device 332 indicating chiller 100 could not provide enough cooling capacity with the surge probability threshold.

Advantageously, by predicting the boundaries using chiller operating data and surge probabilities, the controllable chiller boundaries of operation for chiller 100 may be predicted accurately. Instead of using an iterative process, the machine learning models can automatically predict such boundaries, which can speed up processing and enable variable adjuster 318 to adjust control of chiller 100 in real-time more quickly.

Figure 18:
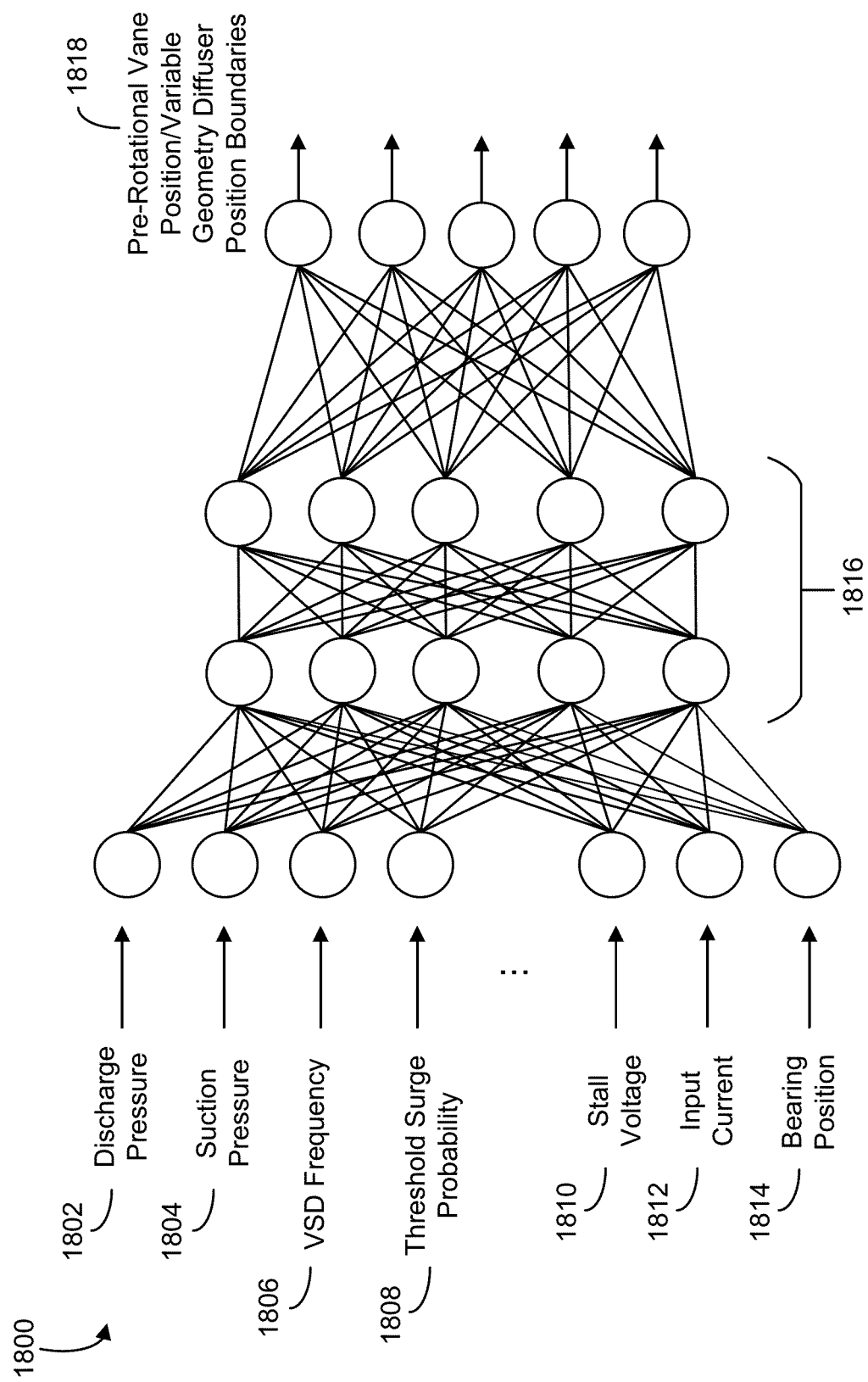
FIG. 18 is a drawing of an example neural network for generating a PRV/VGD position boundary, according to some embodiments.

Referring now to FIG. 18, a drawing of a neural network 1800 for predicting probabilities a PRV/VGD position boundary is shown, according to some embodiments. Neural network 1800 may use similar inputs to neural network 1500, shown and described with reference to FIG. 15. Neural network 1800 may include input nodes for a discharge pressure 1802, a suction pressure 1804, a VSD frequency 1806, a probability that a surge will occur 1808, a stall voltage 1810, an input current 1812, and a bearing position 1814. Components 1802, 1804, 1806, 1808, 1810, 1812, and 1814 may be similar to respective components 1502, 1504, 1506, 1508, 1510, 1512, and 1514, shown and described with reference to FIG. 15. Each of components 1802-1814 may represent inputs into neural network 1800. Neural network 1800 is further shown to include hidden layer 1816 and output layer 1818. Inputs 1802-1814 may be converted into weighted signals or combinations of signals and passed to hidden layer 1816. Nodes of hidden layer 1816 may perform various operations on the weighted signals, similar to the nodes of hidden layer 1516, shown and described with reference to FIG. 15. The nodes of hidden layer 1816 may transmit further weighted signals to output layer 1818. Output layer 1818 may include one or more nodes and/or layers that indicate probabilities for potential values of frequencies boundaries to implement based on inputs 1802-1814.

In some embodiments, weights of the weighted signals may be generated or determined based on training data that is provided to neural network 1800. Neural network 1800 may be trained using supervised, semi-supervised, or unsupervised methods similar to the training described above with reference to FIG. 15. For example, neural network 1800 may be trained using labeled training data that includes values for each of inputs 1802-1814. For instance, a training dataset including values for each of inputs 1802-1814 may be input to neural network 1800. The training dataset may be labeled with a correct value of 70% of open. Neural network 1800 may output probabilities for position values frequency values of 50% of open, 60% of open, 70% of open, and 80% of open. Neural network 1800 may adjust its internal weights and/or parameters proportional to how close each probability was to the correct value. Continuing with the example, above, neural network 1800 may adjust its internal weights so if a similar dataset was input into neural network 1800, it would predict a higher probability for 70% and lower probabilities for each of 50% of open, 60% of open, and 80% of open. An accuracy percentage may be determined based on how close neural network 1800 is to predicting the labeled values over multiple training datasets. For instance, in some embodiments, the closer neural network 1800 is to predicting the correct frequency, the higher the accuracy percentage. Training datasets may be input into neural network 1800 for training until neural network 1800 is accurate to a threshold. In some embodiments, training datasets may be input until neural network 1800 is accurate to the threshold for a preset number of training datasets.

Figure 19:
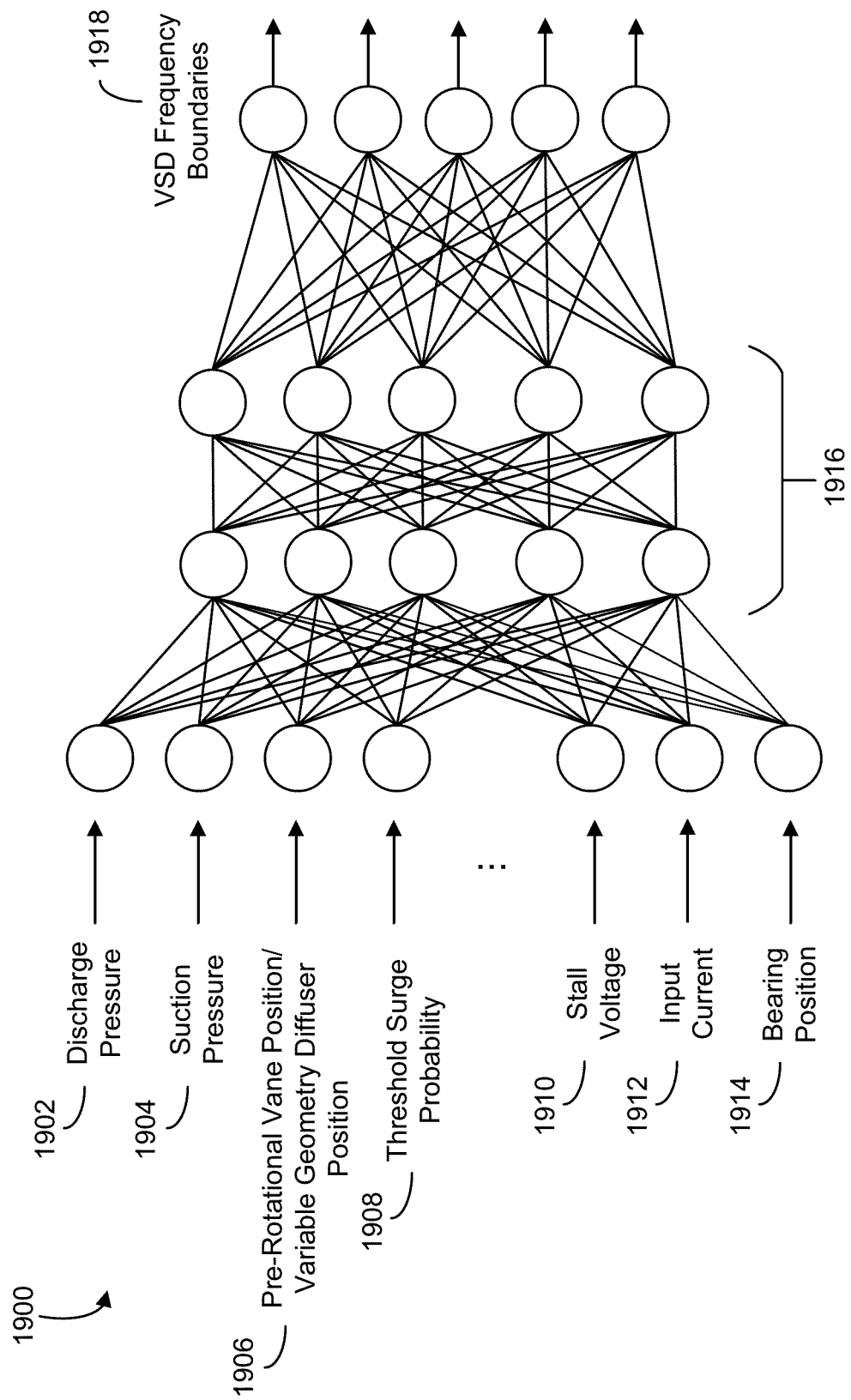
FIG. 19 is a drawing of an example neural network for generating a VSD frequency boundary, according to some embodiments.

Referring now to FIG. 19, a drawing of an example neural network 1900 for predicting probabilities for a VSD frequency boundary is shown, according to some embodiments. Neural network 1900 may use similar inputs to neural network 1400, shown and described with reference to FIG. 14. Neural network 1900 may include input nodes for a discharge pressure 1902, a suction pressure 1904, a pre-rotational vane position/variable geometry diffuser position 1906, a probability that a surge will occur 1908, a stall voltage 1910, an input current 1912, and a bearing position 1914. Components 1902, 1904, 1906, 1908, 1910, 1912, and 1914 may be similar to respective components 1402, 1404, 1406, 1408, 1410, 1412, and 1414, shown and described with reference to FIG. 14. Each of components 1902-1914 may represent inputs into neural network 1900. Neural network 1900 is further shown to include hidden layer 1916 and output layer 1918. Inputs 1902-1914 may be converted into weighted signals or combinations of signals and passed to hidden layer 1916. Nodes of hidden layer 1916 may perform various operations on the weighted signals, similar to the nodes of hidden layer 1416, shown and described with reference to FIG. 14. The nodes of hidden layer 1916 may transmit further weighted signals to output layer 1918. Output layer 1918 may include one or more nodes and/or layers that indicate probabilities for potential values of frequencies boundaries to implement based on inputs 1902-1914.

In some embodiments, weights of the weighted signals may be generated or determined based on training data that is provided to neural network 1900. Neural network 1900 may be trained using supervised, semi-supervised, or unsupervised methods similar to the training described above with reference to FIG. 14. For example, neural network 1900 may be trained using labeled training data that includes values for each of inputs 1902-1914. For instance, a training dataset including values for each of inputs 1902-1914 may be input to neural network 1900. The training dataset may be labeled with a correct value of 60 Hz. Neural network 1900 may output probabilities for frequency values of 55 Hz, 60

Hz, 65 Hz, and 70 Hz. Neural network 1900 may adjust its internal weights and/or parameters proportional to how close each probability was to the correct value. Continuing with the example, above, neural network 1900 may adjust its internal weights so if a similar dataset was input into neural network 1900, it would predict a higher probability for 60 Hz and lower probabilities for both of 55 Hz and 65 Hz. An accuracy percentage may be determined based on how close neural network 1900 is to predicting the labeled values over multiple training datasets. For instance, in some embodiments, the closer neural network 1900 is to predicting the correct frequency, the higher the accuracy percentage. Training datasets may be input into neural network 1900 for training until neural network 1900 is accurate to a threshold. In some embodiments, training datasets may be input until neural network 1900 is accurate to the threshold for a preset number of training datasets.

Figure 20:
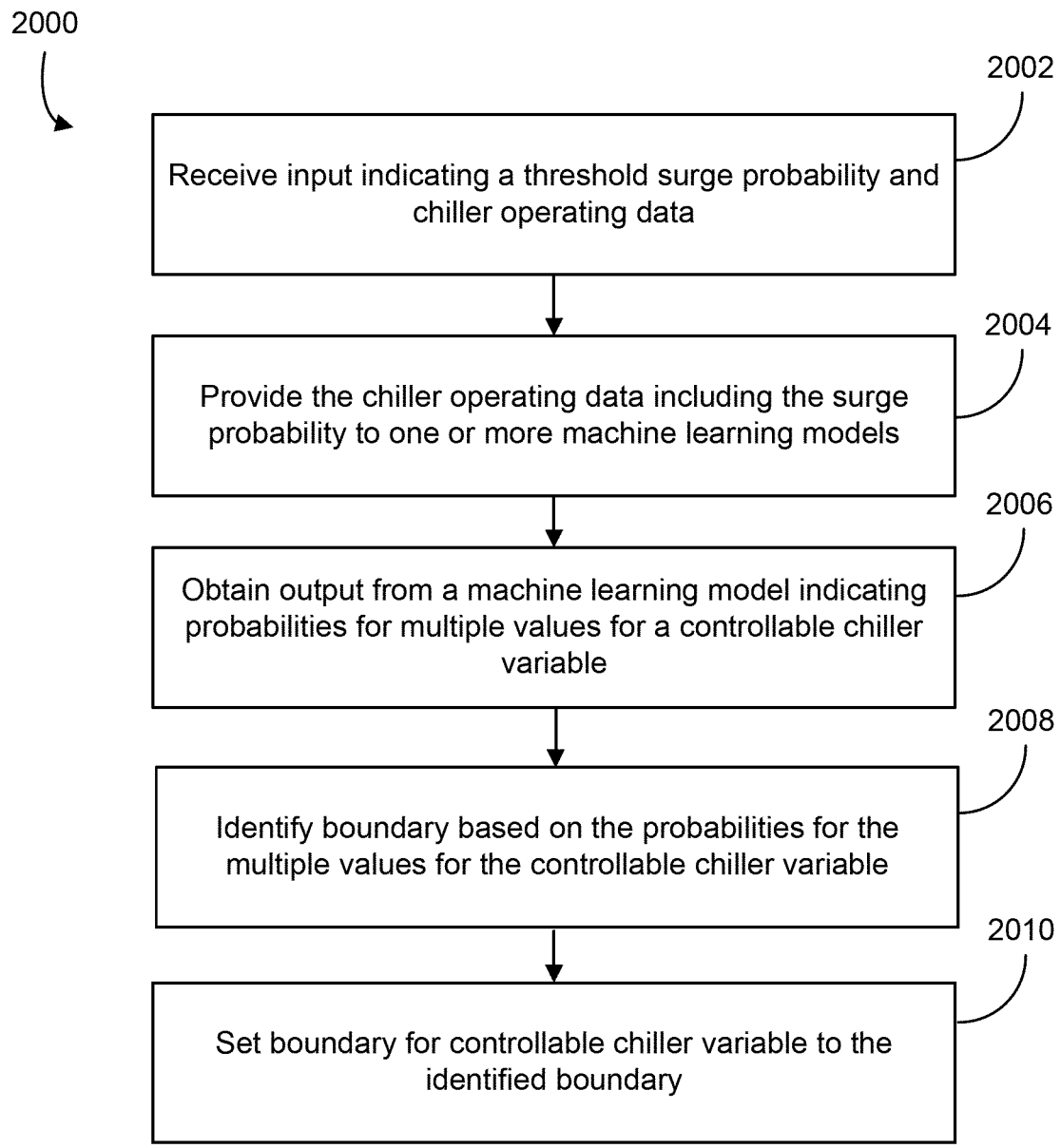
FIG. 20 is a flow diagram of an example process for generating and setting boundaries for a controllable chiller variable, according to some embodiments.

Referring now to FIG. 20, a flow diagram of an example process for generating and setting boundaries for a controllable chiller variable is shown, according to some embodiments. For example, process 2000 may be performed by one or more data processing systems (e.g., chiller controller 302). Process 2000 may be an example process detailing how a boundary for a controllable chiller variable may be generated in any of steps 608, 612, 616, 620, 708, 716, 1210, 1214, 1218, and/or 1222 of FIG. 6, 7, or 12. Advantageously, process 2000 may be performed to automatically generate a boundary for a controllable chiller variable based on a surge probability threshold. Consequently, surges may be avoided in a chiller while the chiller may operate close to the surge state, improving the chiller's efficiency. The boundaries may be determined with one input to the machine learning models instead of using an iterative process that may require multiple inputs to be used. Process 2000 can include any number of steps and the steps can be performed in any order.

Process 2000 is shown to include receiving an input indicating a surge probability threshold and chiller operating data (step 2002). For example, step 2002 may be performed by boundary generator 316. Steps 2002 may be performed similar to how step 1602 is performed. Process 2000 is also shown to include providing the chiller operating data including the surge probability to one or more machine learning models (step 2004). For example, step 2004 may be performed by boundary generator 316.

Process 2000 is shown to include obtaining an output from a machine learning model indicating probabilities for multiple values for a controllable chiller variable (step 2006). For example, step 2006 may be performed by boundary generator 316. A PRV/VGD boundary prediction model and a VSD boundary prediction model may be or include machine learning models such as a neural network, a support vector machine, random forest, etc. The PRV/VGD boundary prediction model may be a machine learning model that is configured to predict probabilities for multiple PRV/VGD boundary values. The probabilities may be confidence scores indicating the likelihood that the boundary value is the correct value to generate so the chiller may operate with a surge probability threshold. Each node of an output layer of the PRV/VGD boundary prediction model may be associated with a position value. The position values may range from 0% to 100%. The PRV/VGD boundary prediction model may include any number of values. The PRV/VGD boundary prediction model may predict such probabilities based on an input feature vector that includes chiller operating data except for, in some cases, a PRV/VGD position value. The feature vector may also include a surge probability threshold. The PRV/VGD boundary prediction model may receive feature vectors including such data and output probabilities for any number of PRV/VGD positions.

The PRV/VGD boundary prediction model may be trained with training data that is generated from surge data (e.g., chiller operating data associated with a chiller when the chiller experienced a surge). In some embodiments, the training data may be associated with chiller operating data when the chiller just crossed the surge threshold (e.g., just entered the surge state). Once the PRV/VGD boundary prediction model is trained, The PRV/VGD boundary prediction model may predict probabilities for PRV/VGD position boundaries based on a surge probability threshold. For example, the PRV/VGD boundary prediction model may receive chiller operating data and a surge probability of 75% as an input in a feature vector. The PRV/VGD boundary prediction model may predict a probability of 60% for a PRV/VGD position of 25% open, a probability of 26% for a PRV/VGD position of 50% open, and a probability of 24 for a PRV/VGD position of 24% open on the inputs. The PRV/VGD boundary prediction model may predict any probabilities for any number of PRV/VGD positions.

Furthermore, in some embodiments, the PRV/VGD boundary prediction model may include two machine learning models. One machine learning model may predict probabilities for values of an upper boundary and another machine learning model may predict probabilities for values of a lower boundary for the PRV/VGD position. Each machine learning model may be trained with similar data except with labels that are specific to its respective boundary. The machine learning model may receive the same inputs (e.g., the same chiller operating data and surge probability) and output the probabilities for the upper and lower boundaries, respectively, for the PRV/VGD position.

In some embodiments, the PRV/VGD boundary prediction model may include different machine learning models that are trained to predict probabilities for PRV boundaries and VGD boundaries separately. Such machine learning models may include machine learning models that predict probabilities for upper and lower boundaries for each of the PRV or VGD or just one of the variables. Such machine learning models may be trained as described above for the machine learning models that predict the PRV/VGD position boundary together.

The boundary that is associated with the highest probability may be selected and generated. In some embodiments, the boundary that is associated with the highest probability may only be selected if the boundary is associated with a probability that exceeds a threshold. It may be determined if the generated boundary would enable the chiller to provide enough cooling capacity to handle a new cooling load. If it is determined that the boundaries would not enable the chiller to provide enough cooling capacity to handle the new cooling load, a new feature vector may be generated including similar chiller operating and the same surge probability threshold. The new feature vector may be an input to the VSD boundary prediction model to generate a VSD boundary to control the chiller in addition to the generated PRV/VGD boundary. If a corresponding VSD frequency boundary has already been generated and determined to not enable the chiller to provide enough cooling capacity however, a message may be transmitted to a user device indicating that the chiller could not provide enough cooling capacity with the input surge probability threshold.

The VSD boundary prediction model may be a machine learning model that is trained to predict probabilities for values of a VSD frequency boundary based on a surge probability threshold and chiller operating data. The VSD boundary prediction model may be trained using a similar training method to the PRV/VGD boundary prediction model with chiller operating data that occurred at or near the surge threshold, in some cases. The VSD boundary prediction model may be trained to predict the VSD boundary based on the same or similar chiller data as the PRV/VGD boundary prediction model except the VSD boundary prediction model may use PRV/VGD control signal data as an input while excluding inputs related to VSD frequency. Consequently, any predictions that the VSD boundary prediction model makes may not be impacted by VSD control signals (which may not have any relevance to a predicted VSD frequency boundary). For example, the VSD boundary prediction model may receive an input including chiller operating data excluding a VSD frequency along with a surge probability threshold. The VSD boundary prediction model may output a probability of 70% for a frequency of 48 Hz, a probability of 10% for a frequency of 52 HZ, and a probability of 20% for a frequency of 55 Hz. The VSD boundary prediction model may output any probabilities for any number of VSD frequencies. In some embodiments, the VSD boundary prediction model includes a machine learning model for an upper VSD frequency boundary and a machine learning model for a lower VSD frequency boundary. Each machine learning model may similarly output probabilities for values of its respective VSD frequency boundary. Each of these machine learning models may be trained using similar training data except with labels that are associated with its respective boundary.

Process 2000 is shown to include identifying a boundary based on the probabilities for the multiple values for the controllable chiller variable (step 2008). For example, step 2008 may be performed by boundary generator 316. The probabilities for the values for the controllable chiller variable that were generated by the machine learning model may be obtained. The probabilities may be compared with each other. The value for the controllable chiller variable that is associated with the highest probability may be selected. For example, probabilities for values of VSD frequencies may be generated. The probabilities may be 30% for 47 Hz, 40% for 50 Hz, and 30% for 52 Hz. The 50 Hz value may be selected because it is associated with the highest probability. In some embodiments, the highest probability may be compared with a threshold. If the probability does not exceed the threshold, the value may not be selected and an error may be generated. Continuing with the example above, if the threshold probability is 50%, an error may be generated because the probability associated with 50 Hz does not exceed the threshold probability of 50%.

Process 2000 is shown to include setting a boundary for the controllable chiller variable (step 2010). For example, step 2010 may be performed by boundary generator 316. The output may include a boundary for a controllable chiller variable to avoid crossing during operation. The boundary may be an upper boundary and/or a lower boundary for any controllable chiller variable. For example, the boundary may be an upper boundary and/or a lower boundary for a VSD frequency or a PRV/VGD position control signal. The boundary may be used to operate the chiller. As described above, the boundary may only be used if it is determined that the boundary enables the chiller to provide enough cooling capacity to satisfy a new cooling capacity.

Figure 21:
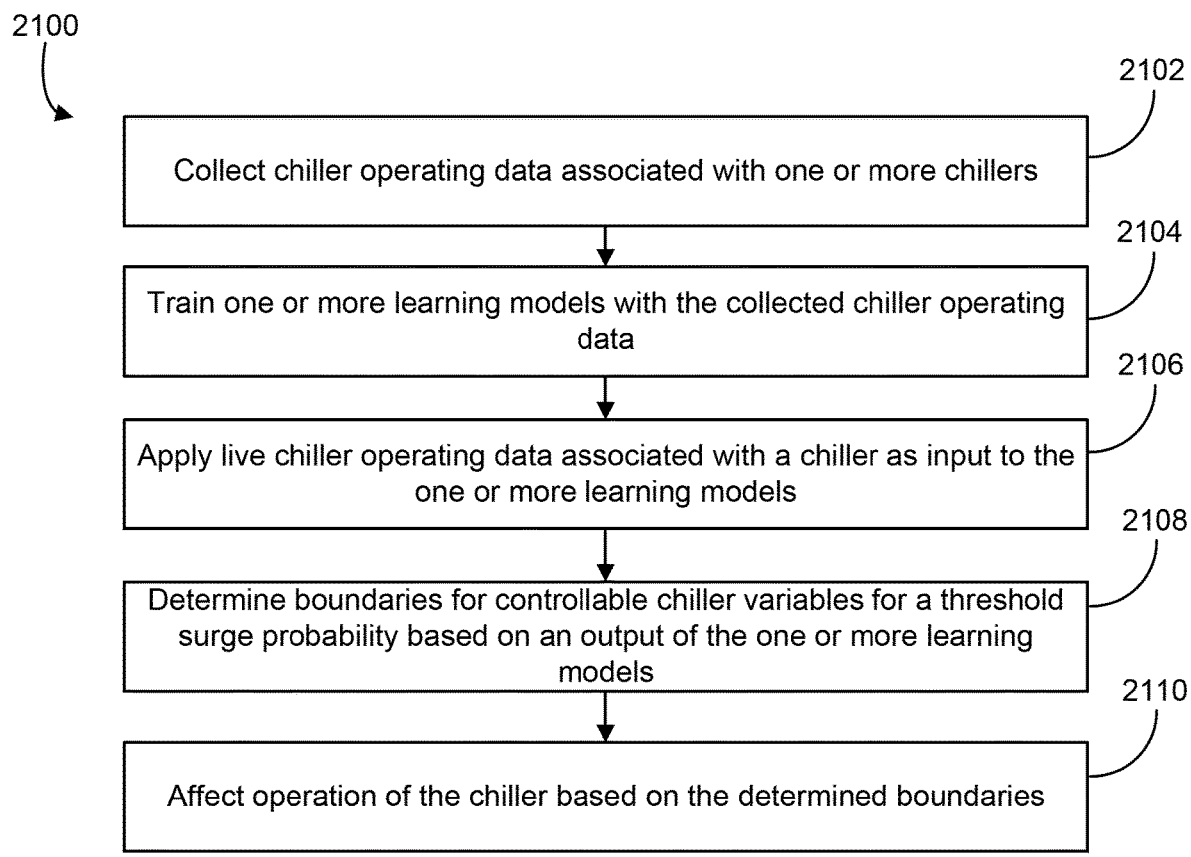
FIG. 21 is a flow diagram of an example process for generating controllable chiller variable boundaries based on an output of a machine learning model, according to some embodiments.

Referring now to FIG. 21, a flow diagram of an example process 2100 for generating controllable chiller variable boundaries based on an output of a machine learning model is shown, according to some embodiments. Process 2100 can be performed by any controller or processor of a building management system. For example, process 2100 may be performed by one or more data processing systems (e.g., chiller controller 302). Process 2100 may enable a chiller (e.g., chiller 100) including a compressor (e.g., compressor 102) to operate in different conditions over time within boundaries set based on a surge probability threshold. A machine learning model may be trained with training data generated from chiller operating data in a cloud database so the machine learning model may provide accurate predicted surge probabilities upon connecting to the chiller. The machine learning model may be trained over time as surges occur so the machine learning model may dynamically adapt and adjust to changing conditions of the chiller. In some embodiments, the machine learning model is trained to generate VSD frequencies and/or VGD and PRV position boundaries. Process 2100 can include any number of steps and the steps can be performed in any order.

Process 2100 is shown to include collecting chiller operating data associated with one or more chillers (step 2102). For example, step 2102 may be performed by chiller controller 302. Chiller operating data may be collected from a chiller associated with a first building management system or chillers associated with other building management systems. For example, a cloud database (e.g., cloud database 328) including chiller operating data that was generated by chillers of the other building management systems and/or the chiller of the first building management system may be accessed via a network. Chiller operating data may be collected from the cloud database. In some embodiments, chiller operating data in the cloud database is generated by sensors and sent via a gateway local to the chiller from which the chiller operating data was collected. The chiller operating data may include operating parameters of the chillers indicating various characteristics of each chiller when the chiller is operating correctly and/or characteristics of each chiller when the chiller is experiencing a surge. Values of the parameters may be labeled with tags indicating whether the chiller was experiencing a surge or is otherwise operating at a surge threshold (e.g., had just began or was about to begin experiencing a surge). For example, the chiller operating data may be tagged as being associated with a surge if the chiller experienced a surge within 10 milliseconds, 20 milliseconds, 50 milliseconds, 100 milliseconds, one second, etc., of when the chiller operating data was generated or collected. Any time period may be used to associate chiller operating data with a surge or the surge threshold. The chiller operating data may also be tagged as being associated with a surge or as being associated with normal operation of the chiller. The characteristics of the chiller may include refrigerant type, discharge pressure (Pd), suction pressure (Ps), stall voltage, stall current, bearing position, input current, etc., of the chiller at various points in time. The characteristics may also include a variable speed drive frequency, a pre-rotation vane (PRV) position, and/or variable geometry diffuser (VGD) position control signals that operate the compressor of the chiller and correspond to the points in times of the other characteristics. Consequently, the chiller operating data may indicate how the chiller operates under the various control signals. The chiller operating data may include timestamps indicating when the chiller operating data was generated or collected and, in some cases, identifiers indicating with which chiller, sensor, or timeseries the chiller operating data is associated.

In some embodiments, the chiller operating data may be tagged with the VSD frequency, the PRV position, and/or the VGD position control signals that were implemented and that caused the chiller to operate in a normal state, a surge state, close to a surge threshold. Further, in some embodiments, the chiller operating data may be tagged or otherwise associated with a type of refrigerant that was used and is associated with various data points. Consequently, the chiller operating data may indicate how the chiller operates under various control signals and/or while using different types of refrigerant. Such data may be used to determine minimums and/or maximums for one or multiple of the VSD frequency and/or the PRV/VGD position control signals under various operating conditions and, in some cases, optimal refrigerants to use (e.g., refrigerants that are found to be associated with the least amount of surges).

Advantageously, by collecting chiller operating data from multiple chillers from the cloud database, more information may be available for training to identify probabilities of a surge occurring and/or boundaries for various control signals to avoid crossing. While chillers may operate differently from each other, they may have some similarities in how they operate. When the chiller operating data is collected to avoid surges in a chiller to which the data processing system is newly connected or configured to operate, the chiller operating data may be used from the other chillers to train a machine learning model to predict surge probabilities in the chiller and/or control signal value (e.g., VSD frequencies, PRV positions, and/or VGD positions) thresholds to avoid crossing or risk causing a surge.

Further, chiller operating data may be collected and added to a database (e.g., historical database 330) dedicated to storing chiller operating data of a specific chiller and/or a first building management system to which the chiller is connected. Chiller operating data associated with operation of the chiller may be automatically added to the dedicated database as the chiller operates within the first building management system. The chiller operating data may be added to the database periodically at various time intervals or, in some instances, when a surge occurs. For example, an indication that a surge occurred in a chiller may be obtained (e.g., received as a signal or determined based on chiller operating data). Various sensors of the chiller may be polled in response to obtaining the identification to obtain values of characteristics of the chiller before, during, and/or after the surge occurred. The chiller operating data may be stored in the database. The values may be labeled to indicate whether the chiller operating data is associated with a surge.

Chiller operating data may be collected from the chiller in real-time. For example, the chiller and/or sensors that generate chiller operating data may be polled continuously for chiller operating data associated with the various characteristics. In another example, sensors may generate chiller operating data based on operation of the chiller and automatically send the chiller operating data via a gateway at various intervals (e.g., every five milliseconds, every 10 milliseconds, every 20 milliseconds, etc.). Consequently, fast pressure changes may be monitored. In another example, technicians may manually upload the chiller operating data. By collecting such chiller operating data, the chiller operating data may be used to generate boundaries for controllable chiller variables based on a surge probability threshold.

Process 2100 is shown to include training one or more machine learning models with the collected chiller operating data (step 2104). For example, step 2104 may be performed by model generator 312 or machine learning model 314 as described above. The one or more machine learning models may be machine learning models such as, but not limited to, a neural network, random forest, or a support vector machine. Each machine learning model may be associated with the same or different inputs and outputs. The one or more machine learning models may be trained to associate an output with a given input (e.g., one machine learning model may determine a probability that a surge will occur based on current chiller characteristics and/or one machine learning model may determine VSD frequencies and/or VGD or PRV position control signal boundaries to avoid crossing based on an input surge probability). For example, a first machine learning model may receive inputs associated with the characteristics of the chiller during operation and output a probability of whether the chiller will experience a surge and a second machine learning model may receive similar inputs to the first machine learning model except for a controllable chiller variable and additionally including a surge probability threshold and predict a boundary for the missing controllable chiller variable based on the similar inputs and the surge probability threshold.

Collected chiller operating data (e.g., historical data collected from the cloud database or the local database, live chiller operating data collected directly from sensors of the chiller, etc.) may be used to train the one or more machine learning models. For example, chiller operating data associated with multiple chillers may be retrieved from the cloud database. A training dataset may be generated with the retrieved chiller operating data including values of characteristics of the chiller during operation and timestamps associated with the values. The training dataset may be associated with values from a chiller and may include values at one point in time or at multiple points in time within a time frame as determined by an administrator. Each value may be labeled with an indication of whether the value is associated with a surge or not. For example, values generated or collected within an administrator-selected time frame or during a surge may be labeled as being associated with a surge. Otherwise, values may be labeled as not being associated with a surge. The training dataset may be fed into the one or more machine learning models and an output including a probability that a surge in a chiller is imminent based on the training dataset may be obtained. The output may be fed back into the one or machine learning models for training as described herein.

The one or more machine learning models may be trained using supervised, semi-supervised, and/or unsupervised training methods. The one or more machine learning models may be trained in a supervised system that implements feedback (e.g., back propagation in a neural network). During supervised training, the one or more machine learning models may be trained with training data having an input and output pair. The output may be a labeled correct output that the one or more machine learning models should predict based on the input of the pair. In this case, the input may be values of characteristics of a chiller at various points in time. For instance, values of multiple characteristics of a chiller may be associated with a time stamp as an input. Each value and the time stamp may be associated with an output label indicating they are associated with a surge or not. In some cases, an input may be a timeseries with values associated with multiple time stamps each labeled with an associated output indicating whether they are associated with a surge. The one or more machine learning models may internally adjust their weights or parameters based on the input and output pair. In some embodiments, after training data is used as an input and the one or more machine learning models identify probabilities of an output, the one or more machine learning models identifies an expected output from the training data and identify the difference between the actual output and the expected output and update the internal processes of the one or more machine learning models based on the difference. For example, if the one or more machine learning models include a neural network, the neural network can identify the difference as a delta and modify its internal processes to more accurately predict probabilities for surges and/or control signals for future training datasets or live data. As more and more training data is fed into the one or more machine learning models, the one or more machine learning models may become more accurate.

In a semi-supervised system, the one or more machine learning models can receive a mixture of labeled and unlabeled chiller operating data. The labeled and unlabeled data can be implemented into the one or more machine learning models for training. For example, the one or more machine learning models may be trained with chiller operating data detected and collected when the chiller is in a surge state. A portion of the chiller operating data may be labeled with a label indicating that the chiller operating data was collected when the chiller was in the surge state, another portion of the chiller operating data may be labeled with a label indicating that the chiller operating data was collected when the chiller was not in a surge state, and the rest of the chiller operating data may be unlabeled. All of the chiller operating data may be fed into the one or more machine learning models for semi-supervised training.

In an unsupervised system, unlabeled chiller operating data may be applied to the one or more machine learning models for training. In such a system, the one or more machine learning models may group training data together based on the data having similar values or other characteristics and provide an output based on the groups. For example, chiller operating data associated with surges may be grouped into one cluster while chiller operating data associated with a chiller operating properly may be grouped into another cluster. Using unsupervised learning techniques, the one or more machine learning models may group chiller operating data into either group based on the chiller operating data having common characteristics with the groups.

In some embodiments, the one or more machine learning models are trained with chiller operating data that is collected from the chiller when the chiller experiences a surge. For example, chiller operating data from a sensor of a chiller may be obtained indicating that the chiller is experiencing a surge. The chiller operating data may include chiller operating data at times before, during, and after the surge was detected. Time before (up to a threshold) and during a surge may be tagged as being associated with a surge while time after a surge ends may be associated with normal operation. In some embodiments, only the time before and right after (up to a time threshold) a surge is detected is tagged as being associated with being close to a surge threshold. It may be determined that the chiller is experiencing a surge based on values of the chiller operating data (e.g., high pressure values of a compressor of the chiller, an indication that coolant is flowing backwards through the compressor, etc.). The chiller operating data may be labeled with a label (e.g., an expected output) indicating that the chiller operating data associated with the surge (e.g., chiller operating data associated with times before and during the surge) or close to the surge threshold is surge data while data that is not associated with a surge is not surge data. The labels may be binary such as "1" for chiller operating data associated with a surge and "0" for chiller operating data not associated with a surge. The chiller operating data may be formatted into a format that the one or more machine learning models may recognize (e.g., a feature vector, as described below) and provided as supervised training to the one or more machine learning models. Similar processes may be used to label and use chiller operating data that is not associated with a surge to train the one or more machine learning models.

In some embodiments, the one or more machine learning models may predict VSD frequency and/or VGD/PRV position boundaries to avoid crossing based on a surge probability threshold. Tagged training data with the correct boundary based on a surge probability threshold and current chiller operating parameters may generated. The tagged training data may be used input into the one or more machine learning models that predict the VSD frequency and/or VGD/PRV position boundaries. Such one or more machine learning models may output an associated predicted boundary. The expected output may be compared to the actual output. The one or more machine learning models may adjust their internal weights and/or parameters proportional to the difference between the actual output and the expected output.

Advantageously, by continuously providing surge data and non-surge data to the one or more machine learning models for training, the one or more machine learning models may be continuously trained to be more accurate using chiller operating data specific to the chiller. The one or more machine learning models may automatically adapt to changes in operation of the chiller. Consequently, the one or more machine learning models may be able to accurately predict surge probabilities for the chiller controllable chiller variable boundaries over time so boundaries of operation may be identified and control signals may be generated to operate the chiller within such boundaries and avoid any unwanted surge probabilities.

Process 2100 is shown to include applying live chiller operating data associated with a chiller as input to the one or more machine learning models (step 2106). For example, step 2106 may be performed by boundary generator 316 as described above. Sensors of the chiller may be polled for chiller operating data at various intervals or the chiller operating data may be otherwise obtained from the sensors as described above. For example, the sensors may be polled every 5 seconds. The chiller operating data may be received and processed into a form that can be used as an input into the one or more machine learning models. For example, a feature vector may be generated from a chiller operating dataset. The feature vector may include numerical identifiers for the data. The numerical identifiers may be the values of the chiller operating dataset. The live chiller operating data may include but is not limited to, a refrigerant type, a discharge pressure value, suction pressure value, stall voltage, bearing position, input current, a VSD frequency, a PRV position, a VGD position, etc., of the chiller. The live chiller operating data may include present values (e.g., the present values of characteristics of the chiller). The formatted chiller operating data may be applied to the one or more machine learning models for processing.

Process 2100 is shown to include determining boundaries for controllable chiller variables for a surge probability threshold based on an output of the one or more machine learning models (step 2108). For example, step 2108 may be performed by boundary generator 316. The one or more machine learning models may generate an output indicating probabilities for whether a surge is likely to occur soon (e.g., within 10 milliseconds, 50 milliseconds, one second, one minute, five minutes, 10 minutes, 30 minutes, an hour, etc., as determined by an administrator) or otherwise a probability for whether a surge will occur. A surge probability threshold may be obtained. A probability from the one or more machine learning models may be obtained that indicates a probability that a surge will occur based on a set operating condition of the chiller. The probabilities may be compared. If the probabilities are within a threshold of each other, the controllable chiller variable values that were used as input to the machine learning model may be used to generate the boundaries of operation for the chiller. If the probabilities are not within the threshold of each other, controllable chiller variable value inputs to the one or more machine learning models may be adjusted until the one or more machine learning models generates a probability that is within a threshold of the surge probability threshold.

In some embodiments, if the probabilities of are within a threshold of each other, it is determined if the chiller could provide enough cooling capacity to satisfy a desired cooling load based on the boundaries. A simulator can simulate chiller performance based on the current operating conditions of the chiller, characteristics of the chiller itself, and the generated boundary of the controllable chiller variable. If it is determined that the chiller could provide the desired cooling load based on such inputs, the boundaries may be generated and used to control the chiller. Otherwise, new boundaries may be generated based on other controllable chiller variables (e.g., the other of the PRV/VGD position or the VSD frequency) until boundaries are generated that enable the chiller to provide the desired cooling load. If boundaries are determined for each controllable variable for a given surge probability threshold and it is determined the chiller cannot provide the desirable cooling load based on the surge probability threshold, an alert may be transmitted to a user device indicating that the desired cooling load could not be met based on the surge probability threshold.

In some embodiments, the one or more machine learning models may generate an output indicating boundaries for VSD frequency and/or VGD/PRV position control signals to avoid crossing based on a surge probability threshold. The one or more machine learning models may generate the boundaries. Examples of VSD frequency control signal thresholds include, in some embodiments, 40 Hz, 45 Hz, 50 Hz, 55 Hz, 60 Hz, etc. Depending on how the one or more machine learning models are configured, they may predict boundaries to avoid exceeding or going below. For example, in one configuration, the one or more machine learning models may predict that the VSD frequency control signal should not go below 50 Hz. In another configuration, the one or more learning may predict that the VSD frequency control signal should not exceed 60 Hz. The one or more machine learning models may predict any boundary for either configuration. Further, examples of VGD/PRV position control signal boundaries include, in some embodiments, 20% of fully open, 40% of fully open, 60% of fully open, 70% of fully open, 90% of fully open, etc. The positions may be percentages of any valve position at the inlet and/or the outlet of the compressor. Similar to the VSD frequency, depending on the configuration of the one or more machine learning models, the one or more machine learning models may predict boundaries for PRV and/or VGD positions to avoid exceeding or going below. The one or more machine learning models may predict any boundaries for the valve position control signals and/or the VSD frequency.

In some embodiments, the one or more machine learning models generate a probability distribution including probabilities for multiple boundaries based on an input including live chiller characteristics. For example, the one or more machine learning models may generate a probability distribution including probabilities for a VGD position boundary to avoid exceeding or risk causing a surge in the chiller. The probability distribution may include probabilities such as 10% for 60% of fully open, 20% for 70% of fully open, and 70% for 80% of fully open. The one or more machine learning models may predict any probability for any control signal boundaries. The predicted probabilities may be compared with each other and/or a threshold. If a probability is the highest and/or exceeds the threshold, then the control signal boundary associated with the probability may be identified and used as a boundary to control the chiller. Consequently, the outputs of the machine learning models may be used to create a bound of values within which the chiller should operate to avoid a surge and, in some cases, operate efficiently.

Process 2100 is shown to include affecting operation of the chiller based on the output of the determined boundaries (step 2110). For example, step 2110 may be performed by variable adjuster 318 as described above. For example, boundaries may be determined based on the surge probability generated by the machine learning model and a surge probability threshold. Using the boundaries, new control signals can be generated to apply to the compressor to operate at the surge probability threshold. Control signals may be generated and transmitted to the chiller based on the boundaries. For example, because operating close to the surge state may cause chillers to operate more efficiently, control signals may be generated that are at the controllable chiller variable boundaries. For example, it may be determined that increasing the valve positions of the inlet and the outlet of the compressor may be performed according to newly generated PRV and VGD boundaries. Accordingly, control signals that control the actuators that reposition the valves at the inlet and the outlet may be generated to open each of the valves. The control signals may be generated so the probability of a surge occurring is still within a surge probability threshold. In another example, it may be determined that increasing the VSD frequency may be performed based on a new cooling load according to a newly generated VSD frequency boundary. Accordingly, a control signal that controls the VSD that controls the motor of the compressor may be generated with a higher frequency to the determined boundary so the VSD will increase the voltage to control the motor. The control signals may be generated so the probability of a surge probability threshold.

Advantageously, by implementing one or more machine learning models to accurately identify a probability for whether a surge will occur or boundaries that satisfy a surge probability threshold, the systems and methods described herein may enable a server and/or a controller to operate a chiller at a high efficiency without causing the chiller to enter into a surge state. The machine learning models may be continuously trained as the chiller experiences surges so the machine learning models can continue to generate probabilities indicating whether a surge will occur or boundaries for control signals to avoid crossing. The probabilities may become more accurate as training data is applied to the machine learning models. The server and/or the controller may identify when the chiller may soon experience a surge or bounds of control signals to avoid crossing and, consequently, the controller may adjust the control signals that are being used to drive the motor and the actuators that operate the chiller. By predicting accurate surge probabilities, using the machine learning models may enable the chiller to operate near a surge boundary without entering a surge state. Because operating near the surge boundary enables the chiller to operate more efficiently. Consequently, using the processes described herein may enable the chiller to operate more efficiently. Further, because the machine learning models may be continuously trained, the machine learning models may automatically adapt to changes in the operation of the chiller to determine or generate boundaries for control signals to avoid crossing.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of operating a chiller to avoid future surge events, the method comprising:
    applying chiller operating data associated with the chiller as an input to one or more machine learning models, wherein the input comprises a value of a controllable chiller variable;
    generating a boundary for the controllable chiller variable to prevent a future chiller surge event from occurring based on an output of the one or more machine learning models, wherein the output comprises a probability that the future chiller surge event will occur if the value of the controllable chiller variable is used to operate the chiller, wherein generating the boundary for the controllable chiller variable comprises:
        receiving a user input comprising a probability threshold;
        comparing the probability that the future chiller surge event will occur with the probability threshold; and
        setting the value of the controllable chiller variable as the boundary for the controllable chiller variable in response to determining that the probability that the future chiller surge event will occur does not violate the probability threshold; and
    affecting operation of the chiller based on the boundary to prevent the future chiller surge event from occurring.

2. The method of claim 1, further comprising generating the one or more machine learning models by:
    creating a set of training data by:
        detecting a past surge event in historical chiller operating data; and
        labeling a portion of the historical chiller operating data as surge chiller operating data associated with the past surge event; and
    training the one or more machine learning models with the set of training data.

3. The method of claim 2, wherein the surge chiller operating data comprise a timeseries including values of one or more variables of the historical chiller operating data associated with times before and during the past surge event.

4. The method of claim 1, wherein affecting operation of the chiller comprises determining, based on the output of the one or more machine learning models, values of one or more controllable chiller variables that are predicted to prevent the future chiller surge event, the one or more controllable chiller variables comprising at least one of:
    a variable speed drive frequency;
    a pre-rotational vane position; or
    a variable geometry diffuser position.

5. The method of claim 1, wherein the controllable chiller variable is a first controllable chiller variable and affecting operation of the chiller further comprises:
    adjusting the first controllable chiller variable to affect a cooling capacity of the chiller until either:
        the cooling capacity of the chiller reaches a desired cooling capacity; or
        the first controllable chiller variable reaches the boundary; and
    in response to the first controllable chiller variable reaching the boundary before the cooling capacity of the chiller reaches the desired cooling capacity, adjusting a second controllable chiller variable until the cooling capacity of the chiller reaches the desired cooling capacity.

6. The method of claim 1, wherein the chiller operating data comprises at least one of a refrigerant type, a discharge pressure, a suction pressure, a stall voltage, an input current, a bearing position, a current variable speed drive frequency, a current pre-rotational vane position, or a current variable geometry diffuser position.

7. The method of claim 1, wherein the one or more machine learning models comprise at least one of a neural network, a random forest, or a support vector machine.

8. The method of claim 1, wherein the output of the one or more machine learning models comprises probabilities for a plurality of values for the controllable chiller variable, and wherein generating the boundary for the controllable chiller variable comprises selecting one of the plurality of values for the controllable chiller variable based on the probabilities for the plurality of values for the controllable chiller variable.

9. A system, comprising:
one or more processors; and
one or more memory devices storing instructions thereon that, when executed by the one or more processors, cause the one or more processors to:
provide chiller operating data associated with a chiller as an input to one or more machine learning models, wherein the input comprises a value of a controllable chiller variable;
receive a user input comprising a probability threshold; and
determine an upper boundary, a lower boundary, or both for the controllable chiller variable to prevent a future chiller surge event from occurring based on an output of the one or more machine learning models, wherein the output comprises a probability that the future chiller surge event will occur if the value of the controllable chiller variable is used to operate the chiller, by:
comparing the probability that the future chiller surge event will occur with the probability threshold; and
setting the value of the controllable chiller variable as the upper boundary or the lower boundary for the controllable chiller variable in response to determining that the probability that the future chiller surge event will occur does not violate the probability threshold.

10. The system of claim 9, wherein the instructions cause the one or more processors to generate the one or more machine learning models by:
creating a set of training data by:
detecting a past surge event in historical chiller operating data; and
labeling a portion of the historical chiller operating data as surge chiller operating data associated with the past surge event; and
training the one or more machine learning models with the set of training data.

11. The system of claim 9, wherein the instructions cause the one or more processors to affect operation of the chiller to avoid applying a control signal with an additional value of the controllable chiller variable that exceeds the upper boundary or the lower boundary.

12. The system of claim 11, wherein the controllable chiller variable is a first controllable chiller variable and wherein the instructions cause the one or more processors to affect operation of the chiller by:
adjusting the first controllable chiller variable to affect a cooling capacity of the chiller until either:
the cooling capacity of the chiller reaches a desired cooling capacity; or
the first controllable chiller variable reaches the upper boundary or the lower boundary; and
in response to the first controllable chiller variable reaching the upper boundary or the lower boundary before the cooling capacity of the chiller reaches the desired cooling capacity, adjusting a second controllable chiller variable until the cooling capacity of the chiller reaches the desired cooling capacity.

13. The system of claim 9, wherein the one or more machine learning models comprise at least one of a neural network, a random forest, or a support vector machine.

14. A method of operating a chiller, the method comprising:
generating a first boundary for a first controllable chiller variable based on a first output of one or more machine learning models, wherein the first output comprises a first probability of a future chiller surge event occurring based on a first input comprising a first value of the first controllable chiller variable, and wherein the one or more machine learning models comprises at least one of a neural network, a random forest, or a support vector machine, wherein generating the first boundary comprises:
comparing the first probability of the future chiller surge event occurring based on the first input with a probability threshold; and
setting the first value of the first controllable chiller variable as the first boundary in response to determining that the first probability of the future chiller surge event occurring based on the first input does not violate the probability threshold;
determining whether the chiller can satisfy a cooling capacity based on the first boundary for the first controllable chiller variable;
based on determining that the chiller would not be able to satisfy the cooling capacity based on the first boundary for the first controllable chiller variable, generating a second boundary for a second controllable chiller variable based on a second output of the one or more machine learning models, wherein the second output comprises a second probability of the future chiller surge event occurring based on a second input comprising a second value of the second controllable chiller variable, wherein generating the second boundary comprises:
comparing the second probability of the future chiller surge event occurring based on the second input with the probability threshold; and
setting the second value of the second controllable chiller variable as the second boundary in response to determining that the second probability of the future chiller surge event based on the second input does not violate the probability threshold; and
affecting operation of the chiller based on the first boundary and the second boundary.

15. The method of claim 14, wherein the first controllable chiller variable is a pre-rotational vane position or a variable geometry diffuser position and the first boundary is a first upper boundary corresponding to the first probability of the future chiller surge event occurring based on the first input, and wherein the second controllable chiller variable is a variable speed drive frequency and the second boundary is a second upper boundary corresponding to the second probability of the future chiller surge event occurring based on the second input.

16. The method of claim 14, wherein the first controllable chiller variable is a variable speed drive frequency and the first boundary is a first lower boundary corresponding to the first probability of the future chiller surge event occurring based on the first input, and wherein the second controllable chiller variable is a pre-rotational vane position or a variable geometry diffuser position and the second boundary is a second lower boundary corresponding to the second probability of the future chiller surge event occurring based on the second input.

17. The method of claim 14, wherein generating the first boundary for the first controllable chiller variable corresponding to the first probability of the future chiller surge event occurring comprises:
   based on a first difference between the first probability and the probability threshold exceeding a threshold amount, updating the first value for the first controllable chiller variable of initial chiller operating data to an updated value to obtain updated chiller operating data;
   providing the updated chiller operating data to the one or more machine learning models to obtain a third probability; and
   based on a second difference between the third probability and the probability threshold being less than the threshold amount, generating the first boundary for the first controllable chiller variable based on the updated value.

18. The method of claim 14, wherein affecting operation of the chiller further comprises:
   adjusting the first controllable chiller variable to affect the cooling capacity of the chiller until either:
     the cooling capacity of the chiller reaches a desired cooling capacity; or
     the first controllable chiller variable reaches the first boundary; and
   in response to the first controllable chiller variable reaching the first boundary before the cooling capacity of the chiller reaches the desired cooling capacity, adjusting the second controllable chiller variable until the cooling capacity of the chiller reaches the desired cooling capacity.

19. The method of claim 14, comprising affecting operation of the chiller to avoid applying a first control signal comprising a first additional value of the first controllable chiller variable that exceeds the first boundary and to avoid applying a second control signal comprising a second additional value of the second controllable chiller variable that exceeds the second boundary.

20. The method of claim 17, comprising receiving the probability threshold via a user device.

* * * * *